(12) United States Patent
Jordan et al.

(10) Patent No.: US 11,535,069 B2
(45) Date of Patent: *Dec. 27, 2022

(54) PRESSURE MEASURING DEVICE FOR A BICYCLE

(71) Applicant: SRAM, LLC, Chicago, IL (US)

(72) Inventors: Brian Jordan, Highland Park, IL (US); Trevor Krugman, Spearfish, SD (US); Geoff Nichols, San Luis Obispo, CA (US); Benjamin Rothschild, Chicago, IL (US); David Jonathan Huft, Spearfish, SD (US)

(73) Assignee: SRAM, LLC, Chicago, IL (US)

( * ) Notice: Subject to any disclaimer, the term of this patent is extended or adjusted under 35 U.S.C. 154(b) by 35 days.

This patent is subject to a terminal disclaimer.

(21) Appl. No.: 16/892,023

(22) Filed: Jun. 3, 2020

(65) Prior Publication Data
US 2020/0361254 A1   Nov. 19, 2020

Related U.S. Application Data

(63) Continuation of application No. 15/954,229, filed on Apr. 16, 2018, now Pat. No. 10,703,146, which is a (Continued)

(51) Int. Cl.
*B60C 23/04* (2006.01)
*B60C 23/00* (2006.01)

(52) U.S. Cl.
CPC ........ *B60C 23/0457* (2013.01); *B60C 23/006* (2013.01); *B60C 23/04* (2013.01);
(Continued)

(58) Field of Classification Search
CPC ............ B60C 23/0408; B60C 23/0496; B60C 23/061; B60C 23/0494; B60C 23/0416; B60C 23/0433; B60C 23/0493; B60C 19/00; B60C 23/04; B60C 23/041; B60C 23/0411; B60C 23/20; B60C 23/0444; B60C 23/0462; B60C 11/24;
(Continued)

(56) References Cited

U.S. PATENT DOCUMENTS

| | | |
|---|---|---|
| 5,040,562 A | 8/1991 | Achterholt |
| 6,055,855 A | 5/2000 | Straub |

(Continued)

FOREIGN PATENT DOCUMENTS

| | | |
|---|---|---|
| CN | 1872573 A | 12/2006 |
| CN | 202138167 | 2/2012 |

(Continued)

OTHER PUBLICATIONS

Gigazine, "BTPS system which real-time understands the pressure of the tire of the bicycle via iPhone etc", Jan. 10, 2013, 7 pages.

*Primary Examiner* — Andre J Allen

(57) ABSTRACT

A pressure measuring device for a bicycle has a housing that includes a pressure chamber. The pressure chamber has a valve disposed in a first opening and a second opening into or out of a tire assembly volume of a tire assembly. A sense element is in pressure communication with the pressure chamber along a flow path between the first and second openings.

20 Claims, 39 Drawing Sheets

Related U.S. Application Data continuation-in-part of application No. 15/635,974, filed on Jun. 28, 2017, now Pat. No. 10,919,346.

(52) U.S. Cl.
CPC ...... *B60C 23/0408* (2013.01); *B60C 23/0496* (2013.01); *B60C 2200/12* (2013.01)

(58) Field of Classification Search
CPC . B60C 23/064; B60C 23/007; B60C 23/0479; B60C 23/062; B60C 23/0401; B60C 23/0413; B60C 23/0488; B60C 23/043; B60C 23/06; B60C 23/0452; B60C 23/0467; B60C 11/246; B60C 23/0498; B60C 23/02; B60C 99/006; B60C 23/0428; B60C 23/0442; B60C 23/009; B60C 23/0425; B60C 2019/004; B60C 23/004; B60C 11/243; B60C 23/00354; B60C 23/045; B60C 23/0464; B60C 23/003; B60C 23/00318; B60C 23/0472; B60C 23/066; B60C 23/00372; B60C 23/0403; B60C 23/0406; B60C 29/02; B60C 11/00; B60C 23/006; B60C 23/044; B60C 23/00; B60C 23/0455; B60C 23/008; B60C 23/0454; B60C 23/0461; B60C 23/0415; B60C 23/0474; B60C 23/0489; B60C 23/0491; B60C 25/002; B60C 29/064; B60C 23/00363; B60C 23/0483; B60C 11/0318; B60C 23/0459; B60C 23/0471; B60C 23/0481; B60C 23/042; B60C 2019/005; B60C 23/002; B60C 23/0422; B60C 23/0423; B60C 23/0466; B60C 2200/02; B60C 23/0405; B60C 23/0477; B60C 29/06; B60C 13/001; B60C 23/0476; B60C 25/132; B60C 23/0437; B60C 23/0447; B60C 23/0427; B60C 23/0449; B60C 25/00; B60C 9/18; B60C 13/00; B60C 19/003; B60C 23/065; B60C 23/00336; B60C 23/0484; B60C 23/0486; B60C 23/08; B60C 17/00; B60C 2019/006; B60C 23/001; B60C 25/142; B60C 17/02; B60C 23/00345; B60C 23/0445; B60C 5/004; B60C 11/0083; B60C 25/145; B60C 29/00; B60C 9/02; B60C 11/0332; B60C 23/0418; B60C 23/0457; B60C 23/12; B60C 25/18; B60C 11/13; B60C 23/0469; B60C 23/04985; B60C 29/066; B60C 23/068; B60C 25/005; B60C 25/138; B60C 11/03; B60C 23/005; B60C 23/0432; B60C 3/00; B60C 5/14; B60C 99/00; B60C 11/11; B60C 17/04; B60C 17/06; B60C 23/063; B60C 23/10; B60C 25/007; B60C 25/0554; B60C 25/14; B60C 29/062; B60C 99/003; B60C 11/032; B60C 11/12; B60C 13/003; B60C 19/001; B60C 23/0435; B60C 23/127; B60C 23/16; B60C 29/068; B60C 3/04; B60C 9/20; B60C 11/01; B60C 11/0302; B60C 13/02; B60C 23/126; B60C 25/056; B60C 29/005; B60C 29/04; B60C 5/142; B60C 11/0304; B60C 11/0306; B60C 15/06; B60C 2009/2038; B60C 2011/0374; B60C 2011/0388; B60C 2011/1213; B60C 2011/1231; B60C 2011/1245; B60C 2200/065; B60C 23/00305; B60C 23/067; B60C 23/135; B60C 23/137; B60C 23/18; B60C 25/02; B60C 7/12; B60C 11/02; B60C 17/0009; B60C 19/002; B60C 19/08; B60C 19/12; B60C 2019/007; B60C 23/00347; B60C 23/131; B60C 25/05; B60C 5/001; B60C 5/22; B60C 1/0008; B60C 1/0016; B60C 11/0058; B60C 11/0311; B60C 11/033; B60C 11/1218; B60C 11/124; B60C 11/1384; B60C 13/04; B60C 15/0036; B60C 15/024; B60C 17/041; B60C 17/066; B60C 2007/005; B60C 2009/0071; B60C 2009/2022; B60C 2011/0358; B60C 2011/1254; B60C 2017/068; B60C 2200/06; B60C 2200/12; B60C 2200/14; B60C 23/121; B60C 23/123; B60C 23/133; B60C 25/0503; B60C 25/0515; B60C 25/0521; B60C 25/0551; B60C 25/15; B60C 25/16; B60C 29/007; B60C 3/06; B60C 5/002; B60C 5/02; B60C 5/20; B60C 7/00; B60C 7/105; B60C 9/005; B60C 9/1807; B60C 9/28; B60C 2011/0033; B60C 23/085; B60C 25/0548; B60C 25/185; B60C 7/107; B60C 9/22
USPC .................................. 73/146–146.8
See application file for complete search history.

(56) References Cited

U.S. PATENT DOCUMENTS

| | | | |
|---|---|---|---|
| 7,458,256 | B1 | 12/2008 | Lin |
| 7,667,583 | B2 | 2/2010 | Petrucelli |
| 8,146,413 | B1 | 4/2012 | Grace |
| 8,373,551 | B2 | 2/2013 | Laird et al. |
| 9,321,314 | B2 | 4/2016 | Peng |
| 2003/0112137 | A1 | 6/2003 | Saheki |
| 2003/0128109 | A1 | 7/2003 | Andou et al. |
| 2004/0031316 | A1 | 2/2004 | Lundqvist |
| 2004/0055641 | A1 | 3/2004 | Ostrowiecki |
| 2005/0115327 | A1 | 6/2005 | Kroll et al. |
| 2005/0217363 | A1 | 10/2005 | Cousineau |
| 2005/0274442 | A1 | 12/2005 | Huang et al. |
| 2007/0193349 | A1 | 8/2007 | Petrucelli |
| 2008/0074249 | A1 | 3/2008 | Cheng et al. |
| 2008/0110267 | A1 | 5/2008 | Sheikh-Bahaie et al. |
| 2008/0141766 | A1 | 6/2008 | Roth et al. |
| 2008/0314488 | A1 | 12/2008 | Achterholt |
| 2011/0012722 | A1 | 1/2011 | Petrucelli et al. |
| 2011/0106464 | A1 | 5/2011 | Petrucelli |
| 2012/0176233 | A1 | 7/2012 | Petrucelli et al. |
| 2015/0007920 | A1 | 1/2015 | Tanno |
| 2015/0091719 | A1* | 4/2015 | Huang .............. G06F 8/65 340/442 |
| 2015/0110645 | A1 | 4/2015 | Wu |
| 2015/0217606 | A1 | 8/2015 | Peng |
| 2016/0023523 | A1 | 1/2016 | Palacios |
| 2016/0214444 | A1 | 7/2016 | Taki |
| 2016/0236522 | A1 | 8/2016 | Taki |
| 2017/0043633 | A1 | 2/2017 | Li |
| 2017/0136834 | A1 | 5/2017 | Chong et al. |
| 2017/0368894 | A1 | 12/2017 | Kordes et al. |
| 2019/0054780 | A1 | 2/2019 | Nichols |
| 2019/0061441 | A1* | 2/2019 | Boutru .............. B62J 43/30 |
| 2019/0160893 | A1* | 5/2019 | Kisker ............. B60C 29/06 |
| 2020/0298633 | A1* | 9/2020 | Quenzer ........... B60C 23/006 |

FOREIGN PATENT DOCUMENTS

| | | |
|---|---|---|
| CN | 203078240 U | 7/2013 |
| CN | 103264621 A | 8/2013 |
| CN | 105270110 A | 1/2016 |

(56) References Cited

FOREIGN PATENT DOCUMENTS

| | | | |
|---|---|---|---|
| CN | 205395673 | 7/2016 | |
| CN | 105882327 A | 8/2016 | |
| DE | 3930480 C2 | 4/1992 | |
| DE | 202014105743 | 12/2014 | |
| DE | 102014220945 | 4/2015 | |
| DE | 10 2014 203 142 A1 | 8/2015 | |
| EP | 0417704 | 3/1991 | |
| EP | 3254873 | 12/2017 | |
| FR | 2225300 A1 | 11/1974 | |
| FR | 3070313 A1 * | 3/2019 | ............ B60B 21/00 |
| JP | 2007038993 | 2/2007 | |
| JP | 200858284 | 3/2008 | |
| KR | 1020100109735 | 10/2010 | |
| TW | M401561 | 4/2011 | |
| TW | M479863 | 6/2014 | |
| TW | M454940 | 6/2016 | |
| WO | 19966036861 | 11/1996 | |
| WO | 20020200287 | 3/2002 | |
| WO | 2011053809 | 5/2011 | |
| WO | 2013013325 | 1/2013 | |
| WO | 2016072831 | 5/2016 | |
| WO | 2017020854 | 2/2017 | |
| WO | WO-2021110839 A1 * | 6/2021 | ............ B60C 29/04 |

* cited by examiner

US 11,535,069 B2

PRESSURE MEASURING DEVICE FOR A BICYCLE

This application is a continuation of U.S. patent application Ser. No. 15/954,229, filed Apr. 16, 2018, which is a continuation-in-part of U.S. patent application Ser. No. 15/635,974, filed Jun. 28, 2017, the content of which is herein incorporated in its entirety.

BACKGROUND OF THE INVENTION

A bicycle may be equipped with pneumatic tires. Characteristics of these pneumatic tires are dependent on the pressure contained within the tires. An optimal pressure for modern bicycle tires can range from slightly above to many times greater than atmospheric pressure. Variables including tire size, tire type, bicycle and rider weight, surface conditions, and riding style all affect an optimal tire pressure for a bicycle pneumatic tire. Size, weight, and packaging constraints on certain bicycle tires and tire assemblies can dictate significant pressure loss rates, making regular pressure measurement important even to maintain a fixed optimal pressure. Defects in, or damage to, tires or tire assemblies can cause slow pressure leaks that regular pressure measurement may identify before these leaks become problematic. Additionally, frequent pressure adjustments due to changing variables mean that a rider will benefit from convenient and accurate pressure measurement.

Traditionally the pressure within bicycle tires is measured using an external pressure gauge such as may be found on a floor-based tire pump. Such a gauge must be connected to the tire assembly to measure pressure and cannot measure the tire pressure while the bicycle is in use and the tire assembly is rotating. The use of such a gauge for the identification of leaks is not ideal as many of these leaks may begin from damage incurred while the bicycle is being ridden and thus when such an external device cannot detect them. The requirement of a separate or external pressure gauge, not designed to be a permanent or semi-permanent component of the bicycle, limits when a rider can make accurate pressure adjustments. For instance, a tire pressure may commonly be increased with a tire inflating device such as a pressurized cartridge inflator or a portable tire pump without a pressure gauge and may be decreased by selectively opening a tire valve. However, without a device for accurately measuring the tire pressure, there is limited utility to these pressure adjustment techniques in achieving an optimal tire pressure.

SUMMARY

An embodiment provides a pressure measuring device for a bicycle, the pressure measuring device having a housing, the having a housing alignment feature; a pressure chamber disposed in the housing; and a valve device passing through the housing and in pressure communication with the pressure chamber and with a tire assembly. The valve device has a valve device alignment feature configured to interact with the housing alignment feature to fix a rotational position of the housing relative to the valve device about an alignment axis.

Another embodiment provides a pressure measuring device for a bicycle, the pressure measuring device having a pressure chamber in fluid communication with a tire assembly; a sense element configured to measure a pressure of the pressure chamber; a wireless communicator configured to transmit a pressure signal indicative of the pressure of the pressure chamber; and an indication device affixed to the tire assembly configured to provide a perceptible indication of the pressure of the pressure chamber; operate in a first display mode if the pressure of the pressure chamber is within a first predetermined pressure range; and operate in a second display mode if the pressure of the pressure chamber is outside of the first predetermined pressure range.

BRIEF DESCRIPTION OF THE DRAWINGS

Other aspects and advantages of the embodiments disclosed herein will become apparent upon consideration of the following detailed description, wherein similar or identical structures have similar or identical reference numerals.

DETAILED DESCRIPTION

A lightweight pressure measuring device configured to measure a pressure during pressure adjustment or during operation of a bicycle is advantageous. A pressure measuring device for a bicycle may be configured to address these needs. Integrating a pressure measuring device with a component of a vehicle can facilitate easier operation, monitoring, and/or maintenance. Particularly on a bicycle, an integrated pressure sensor or a component including a pressure sensor should be lightweight and compact to minimize interference with and resistance to riding of the bicycle. Providing a sufficiently small and lightweight pressure measuring device configured to interface with a tire assembly of a bicycle may benefit a rider by eliminating the need for a non-integrated pressure gauge and by facilitating display of pressure information to a rider while the bicycle is being ridden.

Additionally, it is possible to configure a pressure measuring device to interface with a tire assembly of a bicycle in a manner that facilitates adjustment of the tire pressure without removal or disabling of the pressure measuring device. In this way, the tire pressure may be adjusted while the pressure measuring device measures the tire pressure. A system may be configured to allow reading of the tire pressure while the tire pressure is increased or decreased. The system could similarly allow display of the tire pressure to a rider, useful to determine if damage or a defect has caused the tire pressure to decrease while the bicycle is being ridden.

Figure 1:
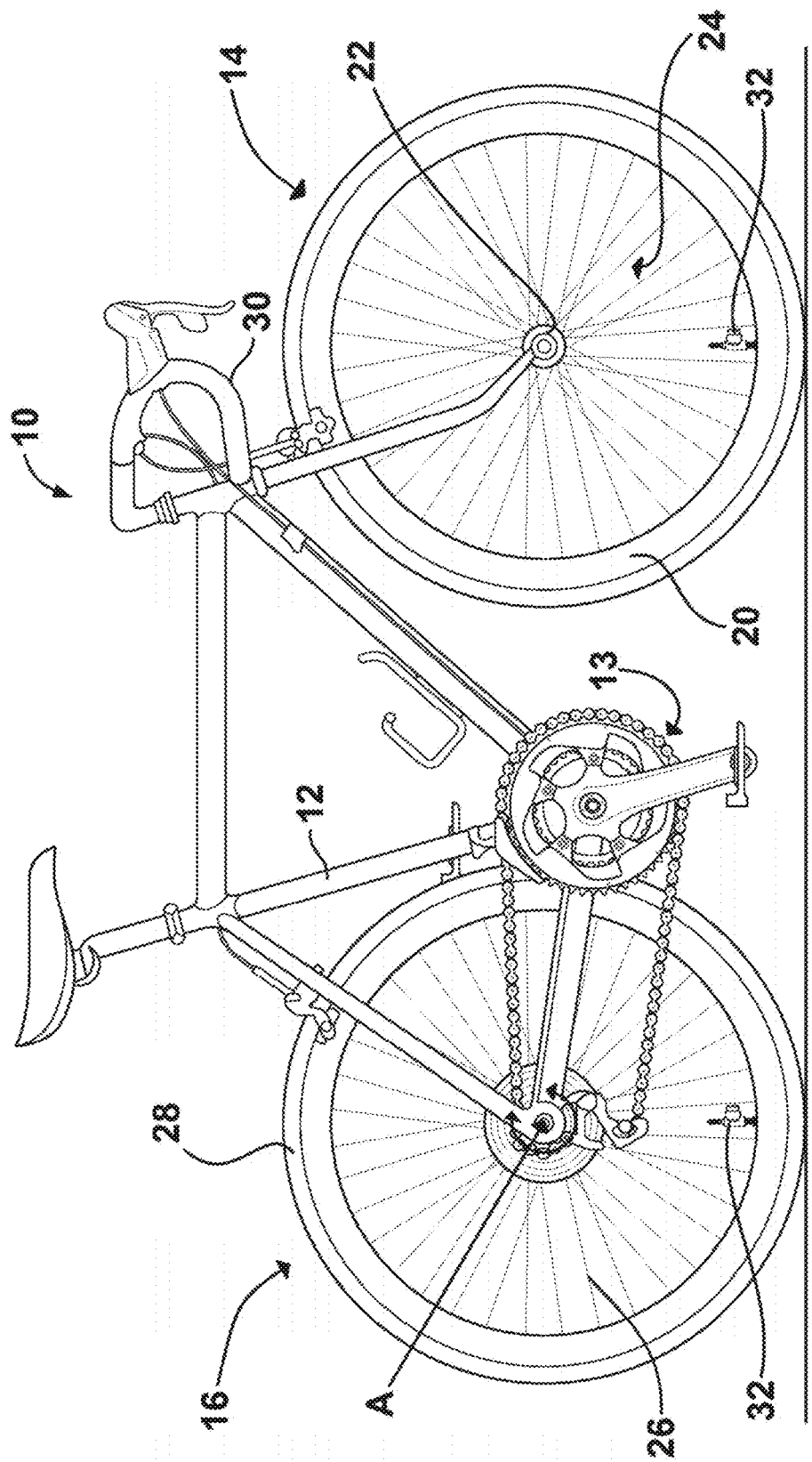
FIG. 1 is a side view of a road type bicycle, which may be used to employ a pressure measuring device.

FIG. 1 generally illustrates a bicycle 10 of a road type with a pressure measuring device 32. The bicycle 10 includes a frame 12, and front and rear wheels 14, 16 rotatably attached to the frame 12. The front and rear wheels 14, 16 each include a rim 20, a hub 22, and a spoke system 24. The pressure measuring device 32 is mounted to each of the front and rear wheels 14, 16. The hub 22 has an axis, "A" running perpendicular to a plane defined by the rotation of the relevant wheel 14, 16. Rotation of the rear wheel 16 may be generated through movement of a drivetrain 13. Use of the referential terms "axial," "radial," "circumferential," "outer" and "inner" will be in reference to axis A unless otherwise noted. The spoke system 24 includes a plurality of spokes 26. The spoke system 24 connects the hub 22 to the rim 20. Mounted to the rim 20 of each of the front and rear wheels 14, 16 is a tire assembly 28.

Figure 2:
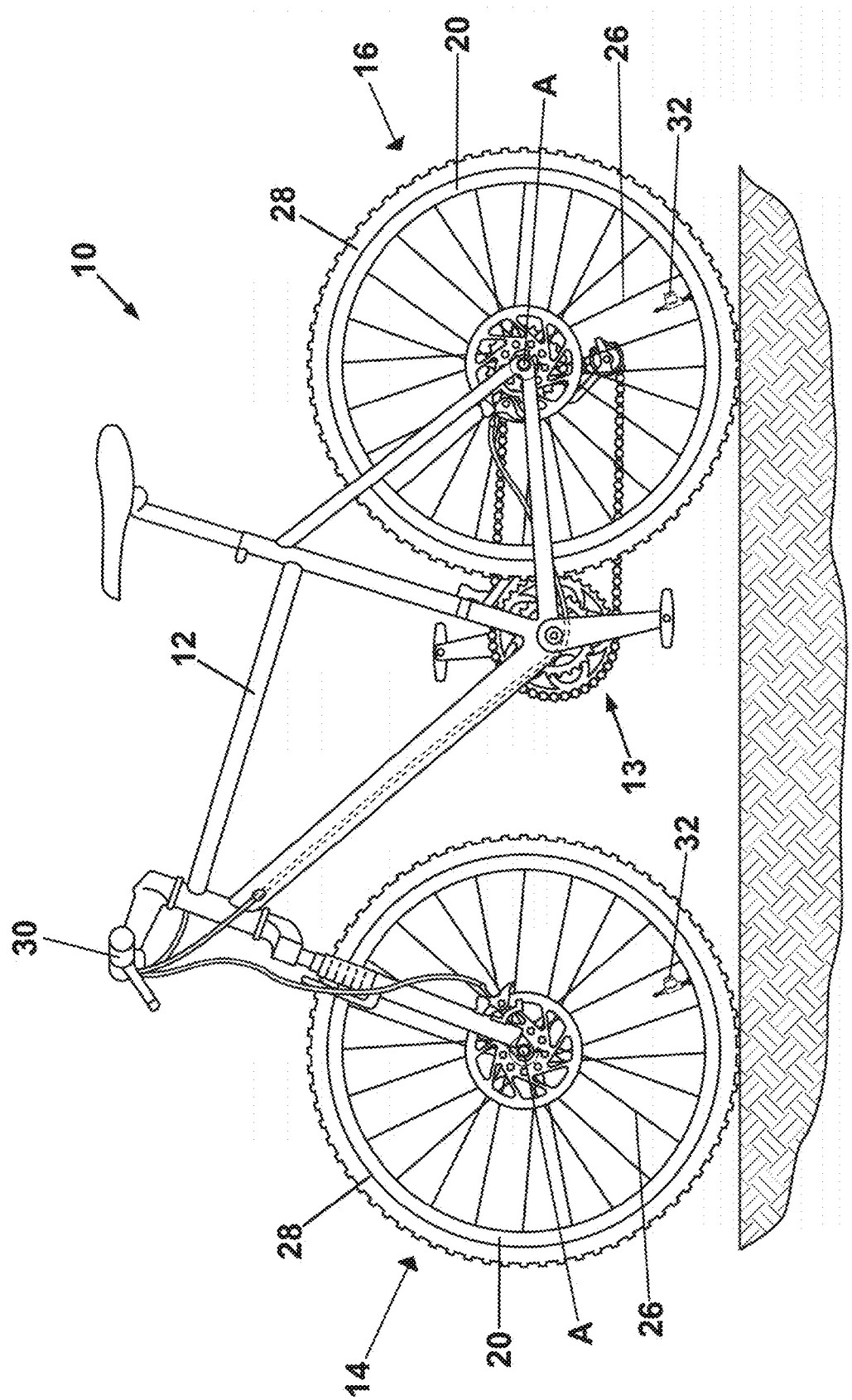
FIG. 2 is a side view of an off road type bicycle, which may be used to employ a pressure measuring device.

FIG. 2 generally illustrates the bicycle 10 of an off road type. The same general configuration of the pressure measuring device 32 mounted to each of the front and rear wheels 14, 16 is shown. While the illustrated bicycle 10 of FIG. 1 represents a road bicycle having a drop-style handlebar 30, and the illustrated bicycle 10 of FIG. 2 represents an off road bicycle, the present invention contemplates application to bicycles of any type, including time trial or triathlon bikes and fully or partially suspensioned mountain bikes. The front and rear wheels 14, 16 of the bicycle may also be configured in various ways, including with either a tensioned or a compression-resistant spoke system 24 or with a unitary assembly of rim 20, hub 22, and spoke system 24 such as in a disc-type wheel. The tire assembly 28 may be of various configurations, including a tubular or sew-up type, or a clincher inner tube- or tubeless-type.

Figure 3:
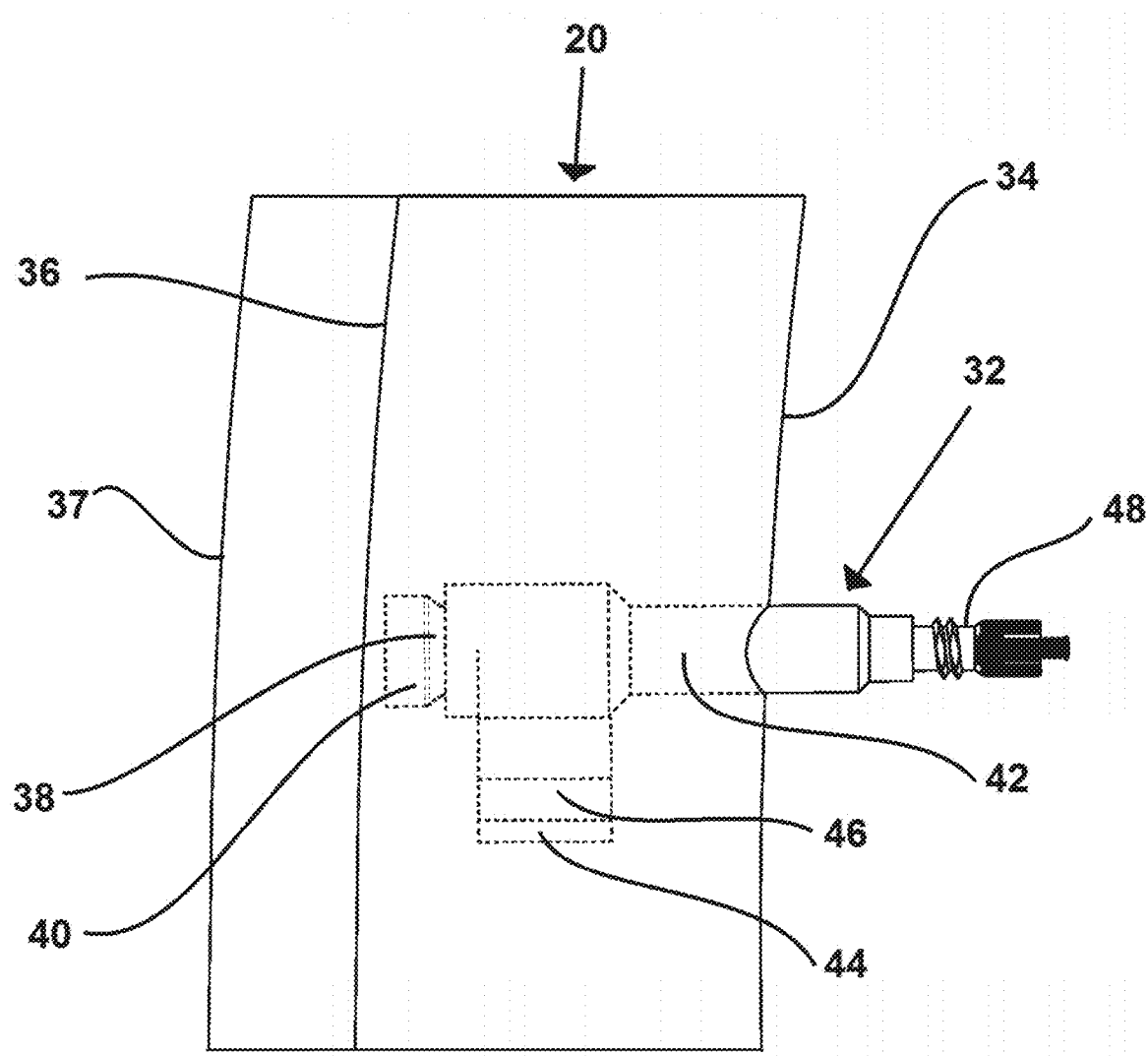
FIG. 3 is a side view of an embodiment having a pressure measuring device disposed at least partially between a spoke bed and a tire assembly bed of a bicycle wheel rim.

FIG. 3 is a side view of an embodiment having the pressure measuring device 32 disposed at least partially between a spoke bed 34 and a tire assembly bed 36 of the rim 20. The spoke bed 34 is configured to facilitate attachment of the spoke system 24 to the rim 20. For instance, the spoke bed 34 may be configured with one or more recesses to accommodate a fixing part of the spoke system 24, which may commonly be known as a spoke nipple, in order to fix the spoke 26 to the rim 20. The tire assembly bed 36 is configured to radially locate the tire assembly 28 by preventing radially inward movement of the tire assembly 28 in an installed state. The rim 20 includes a radially outer tire-engaging portion 37 configured to interface with the tire assembly 28. The radially outer tire-engaging portion 37 includes the most radially outward portion of the rim 20 and may prevent axially outward movement of the tire assembly 28, such as is the case with what is commonly known as a hook and bead installation of a clincher type configuration of the tire assembly 28. The valve stem 38 includes a compressible base 40. The valve stem 38 may be a removable component or configured to be integral to the tire assembly 28. The valve stem 38 interfaces with a housing 42 in a sealing manner. The housing 42 includes a removable power source portion 44 and a removable circuitry portion 46. A valve core 48, such as a traditional bicycle tire valve core unit, is configured to facilitate pressure adjustment and interfaces with the housing 42 in a sealing manner. The valve core 48 is disposed radially inward relative to the spoke bed 34 to facilitate user access.

FIGS. 4-7 are cross-sectional side views of the pressure measuring device 32 disposed at least partially between the spoke bed 34 and the tire assembly bed 36 of the rim 20. The housing 42 includes a pressure chamber 50. The valve stem 38 inserts into the housing 42 in a sealing manner. This sealing manner can be achieved through an interference fit between the compressible base 40 and the housing 42 and/or the use of a base seal 52 configured to seal between a seal surface inner width D (not shown) of the housing 42 and an outer seal width C (not shown) of the valve stem 38. For example, the valve stem 38 may have a threaded stem portion 54 that is threadably engaged with a threaded pressure chamber portion 56 of the pressure chamber 50. The valve core 48 is connected to or otherwise engaged with the pressure chamber 50 in a similar range of manners.

Figure 20:
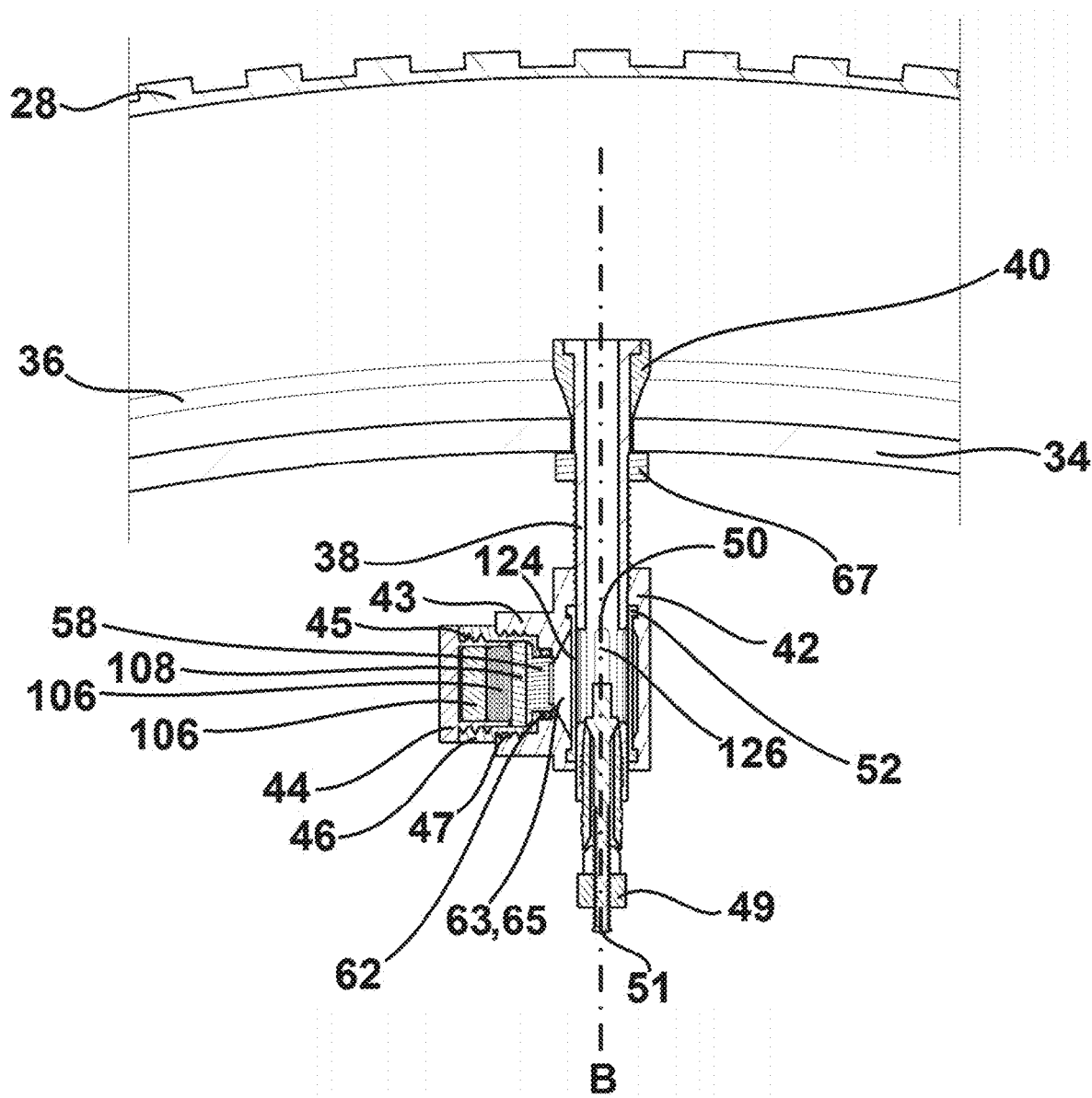
FIG. 20 is a bisected cross-sectional view of the pressure measuring device of FIG. 18.

The engagement of the valve stem 38 and the valve core 48 is configured to facilitate fluid communication between the valve stem 38 and the valve core 48. For example, the thread engagement of the valve stem 38 and the pressure chamber 50 is configured to facilitate fluid communication therethrough. This thread engagement may be configured to facilitate fluid communication through non-sealing mechanical tolerances or through the use other fluid communication techniques like channels or grooves. Alternatively, the valve stem 38 may be configured with one or more communication features (not shown) as in FIG. 20.

A sense element 58 is in fluid communication with the pressure chamber 50. In the illustrated embodiment, the sense element 58 is in fluid communication with the pressure chamber 50 through a sense element opening 60. The sense element opening 60 is shown disposed along the threaded pressure chamber portion 56, but could also be disposed along a non-threaded portion of the pressure chamber 50. For example the sense element opening port 60 may be radially inward of the thread engagement of the valve stem 38 and the pressure chamber 50 such that fluid communication through said thread engagement is unnecessary to achieve fluid communication between the pressure chamber and the sense element opening port 60.

The sense element 58 is configured to measure a pressure within the pressure chamber 50. The sense element 58 may be any type of sensor operable to measure the pressure within the pressure chamber 50. The sense element 58 may be a pressure sensor or an array of sensors. For example, the sense element 58 could be of a force collector type such as piezoresistive, piezoelectric, capacitive, electromagnetic, optical, or potentiometric type. The sense element 58 could also be of another type such as resonant frequency, thermal conductivity, or ionization-sensing type. The sense element 58 is installed into the housing 42 with a sense element seal 62. The sense element seal 62 is configured to prevent flow past the sense element 58 in order to maintain the pressure within the pressure chamber. The valve core 48 may be threadably engaged with a threaded portion of the housing 42 in a sealing manner. The thread engagement between the valve core 48 and the housing 42 may be a sealing thread engagement and/or an elastomeric valve core seal 64 may be used.

The pressure measuring device 32 may be secured to the rim 20 in a number of ways. The rim 20 may be provided with a radial access opening 66 located in the tire assembly bed 36 portion. The radial access opening 66 may be configured to receive the pressure measuring device 32. The valve core 48 in an installed state may be inserted through a valve access opening 68 in order to facilitate user access to the valve core 48 and thus pressure adjustment. In order to provide an adequate circumferential surface to which tire assembly 28 can mount, the radial access opening 66 may be covered.

Figure 4:
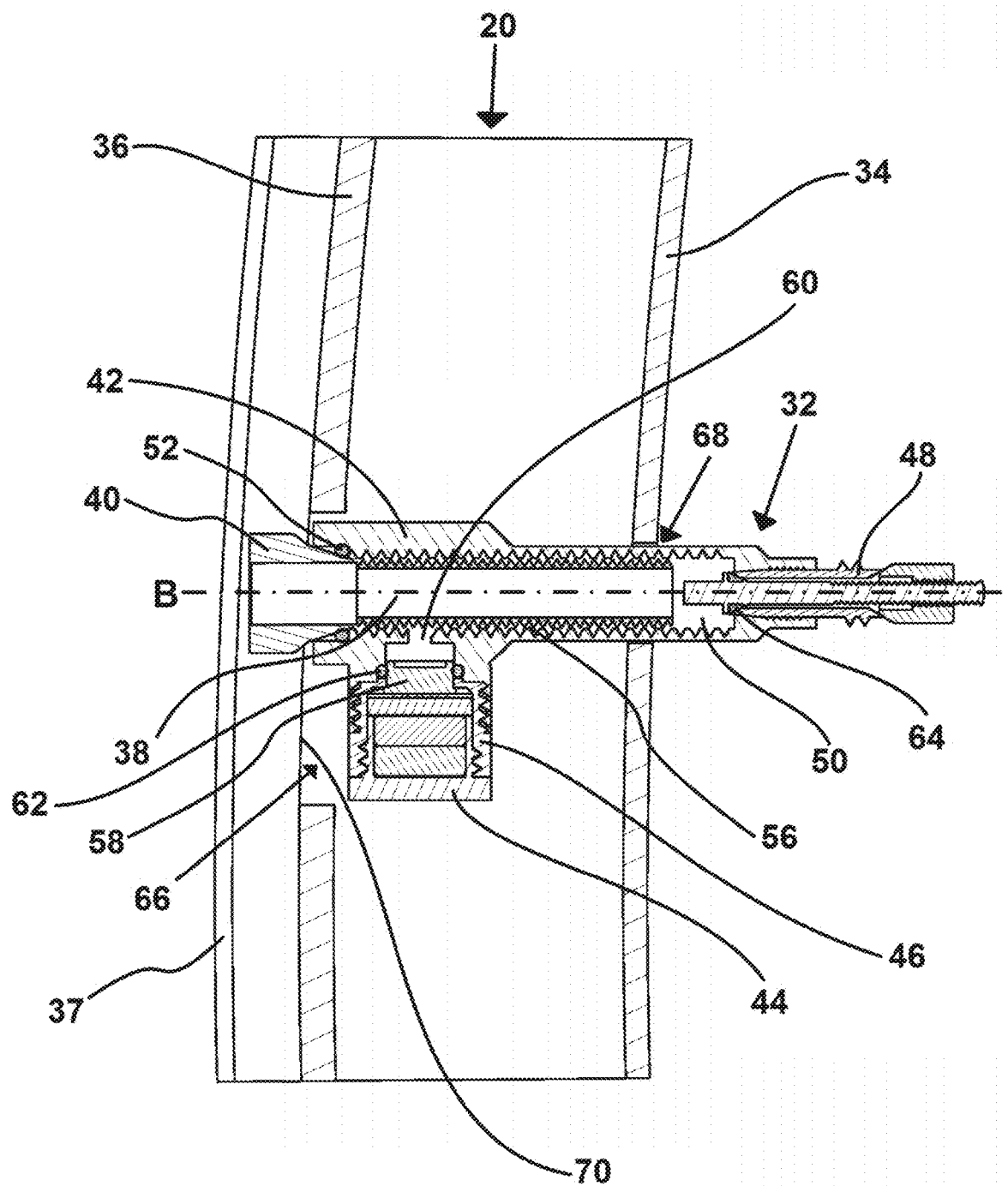
FIG. 4 is a cross-sectional side view of an embodiment of a pressure measuring device disposed at least partially between a spoke bed and a tire assembly bed of a bicycle rim.

Referring to FIG. 4, the radial access opening 66 may be covered with a flexible covering 70 that covers at least a portion of tire assembly bed 36. The flexible covering 70, such as what may be commonly known as rim tape or a rim strip, may be adhesively mounted or physically constrained by the radially outer tire-engaging portion 37 and around the circumference of the rim 20. Additionally, the tire assembly 28 may be further configured with a base covering attached to the tire assembly 28 as is common in tubular or sew-up tire assemblies. The valve stem 38 may then install into the housing 42. The pressure measuring device 32 is thus secured at a radially outer point by the flexible covering 70, the valve stem 38, and/or the tire assembly 28 and secured at a radially inner point by interaction of the housing 42 and/or the valve core 48 with the valve access opening 68.

Figure 5:
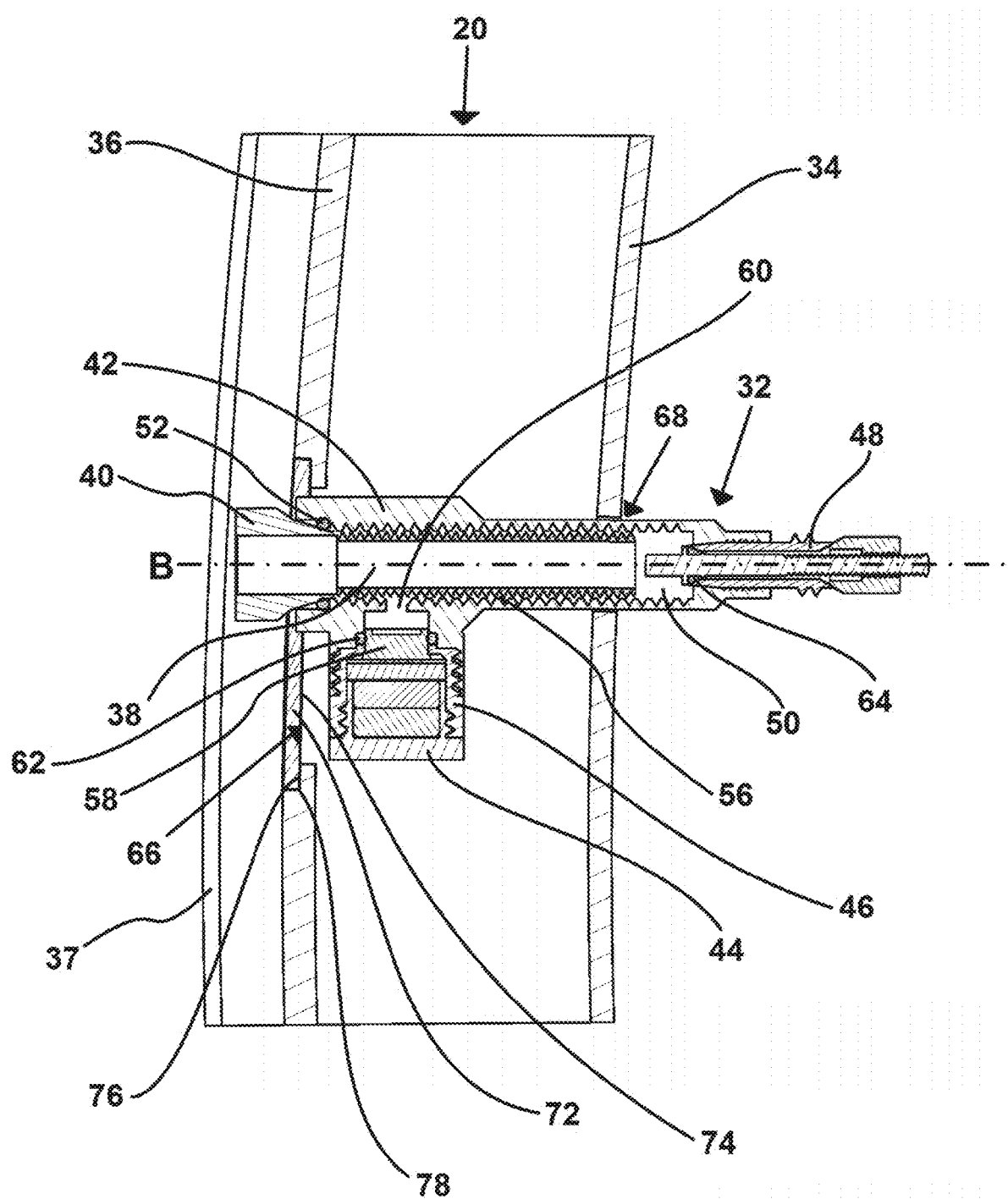
FIG. 5 is a cross-sectional side view of an embodiment of a pressure measuring device disposed at least partially between a spoke bed and a tire assembly bed of a bicycle rim.

Referring to FIG. 5, the pressure measuring device 32 may be secured to the rim 20 with the use of a mounting plate 72. The mounting plate 72 may be rigid in order to provide a more stable mounting of the pressure measuring device 32. The mounting plate 72 may be used in combination with a covering such as the flexible covering 70 or in place of such a covering. The mounting plate 72 may be configured to interface with the tire assembly bed 36. By interfacing with the tire assembly bed 36, the mounting plate 72 can be constrained to a fixed location relative to the tire assembly bed 36 in an installed state. For instance, the mounting plate 72 may be configured with an inner plate face 74 and the tire assembly bed 36 may be configured with an outer bed face 76, where the outer bed face 76 has a recess 78 with a smaller opening dimension in order to create a locating surface. In such a manner, the mounting plate 72 may fit flush with the tire assembly bed 36 while being constrained from further radially inward movement by the smaller opening dimension of the recess 78. The mounting plate 72 may be further constrained by adhesive attachment, mechanical fasteners, or by radially inward force provided by the tire assembly 28.

Figure 6:
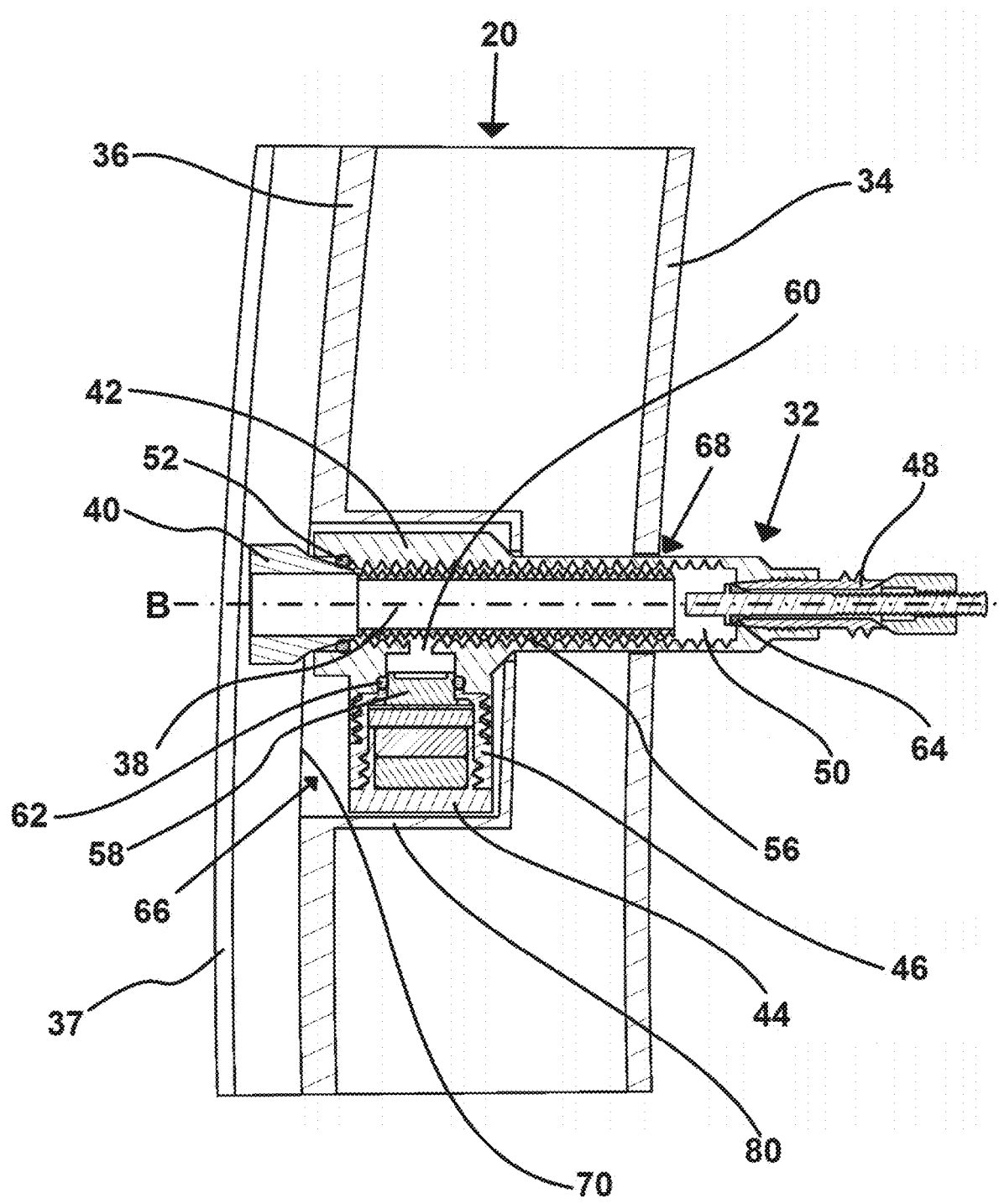
FIG. 6 is a cross-sectional side view of an embodiment of a pressure measuring device disposed at least partially between a spoke bed and a tire assembly bed of a bicycle rim.

Referring to FIG. 6, the rim 20 may further include an internal structure 80. The structure may have radial walls, circumferential walls, and an axial base surface forming a compartment. The internal structure 80 may be configured to house and/or locate the pressure measuring device 32 within the rim 20. The internal structure 80 may be used in combination with or in place of the mounting plate 72 to mount the pressure measuring device 32. For instance, if rigid mounting is desired, such mounting may be achieved through the use of the internal structure 80 and the flexible covering 70 without need for the use of the mounting plate 72. The internal structure may be configured to fit the external dimensions of the housing 42 and/or to be insulated to limit movement within and/or vibration transfer from the rim 20.

Figure 7:
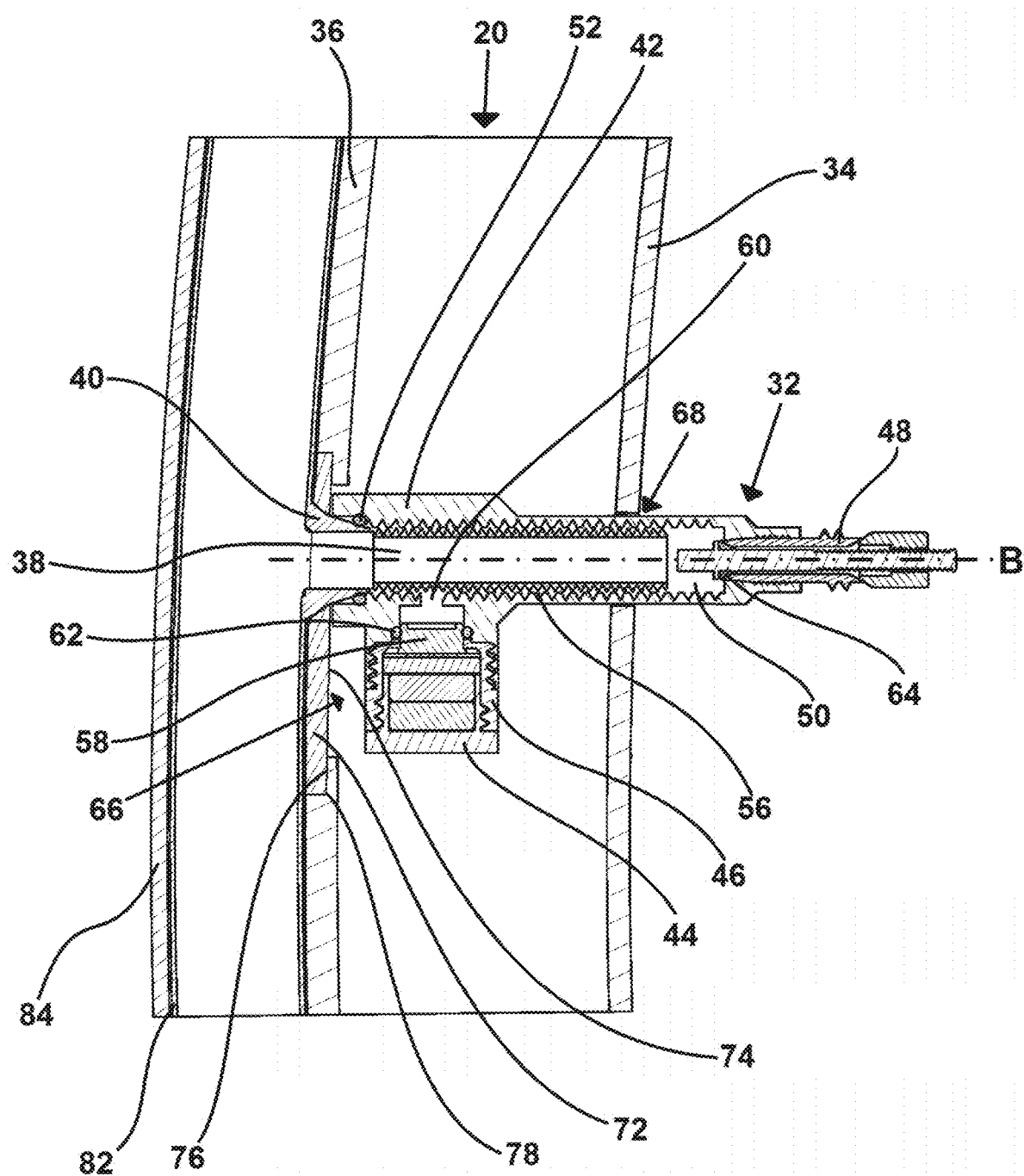
FIG. 7 is a cross-sectional side view of an embodiment of a pressure measuring device disposed at least partially between a spoke bed and a tire assembly bed of a bicycle rim.

FIGS. 4-6 each depict the tire assembly 28 with the valve stem 38, such as is used in tubeless tire assemblies. Referring to FIG. 7, the tire assembly 28 includes the valve stem 38 as an integral component of an inner tube 82. The inner tube 82 may be used in a clincher type configuration similar to tubeless type tire assemblies or may be used in a tubular or sew-up configuration. In this case, the compressible base 40 of the valve stem 38 is a portion of the inner tube 82. The outermost portion of the tire assembly 28 is a tire casing 84. The tire casing 84 may fully encircle the inner tube 82 and adhesively mount to the rim 20 as in a tubular or sew-up configuration or may otherwise interact with the radially outer tire-engaging portion 37 of the rim 20 as in a clincher type configuration. The pressure measuring device 32 may be secured to the rim alone, or additional structure may be included with the rim. For example, the flexible covering 70, the mounting plate 72, the radial access opening 66, the valve access opening 68, the internal structure 80, and/or combinations thereof, may be used.

Figure 8:
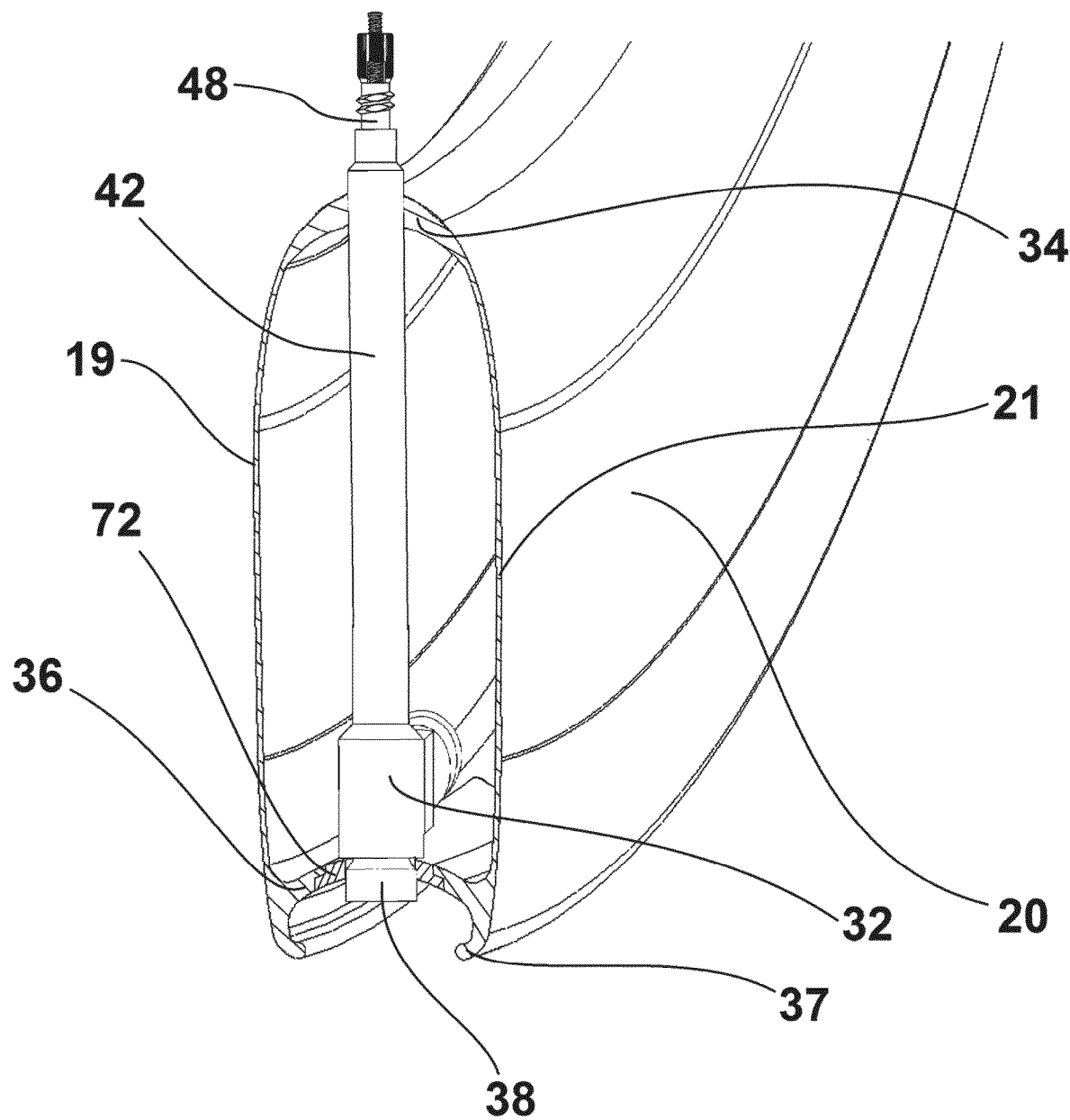
FIG. 8 is a partial sectional perspective view of a bicycle wheel rim with a pressure measuring device and a covering in an installed state.

FIG. 8 is a partial sectional perspective view of the rim 20 with the pressure measuring device 32 shown in a complete perspective view and the mounting plate 72 shown sectioned in an installed state. The rim 20 is shown to include the pressure measuring device displaced axially between a first sidewall portion 19 and a second sidewall portion 21 of the rim 20. The mounting plate 72 may be configured to mount in the radial access opening 66 in only a single orientation to prevent improper installation. Alternatively, the mounting plate 72 may be configured to mount in the radial access opening 66 in various ways in order to facilitate versatile applications. For instance, the mounting plate 72 may be configured to mount in the radial access opening 66 with rotational symmetry in order to position various configurations of the pressure measuring device 32 with the valve access opening 68. Alternatively, the mounting plate 72 may be of various available configurations to facilitate similar radial displacement of the pressure measuring device 32 in variations of the rim 20 with different radial depths.

Figure 9:
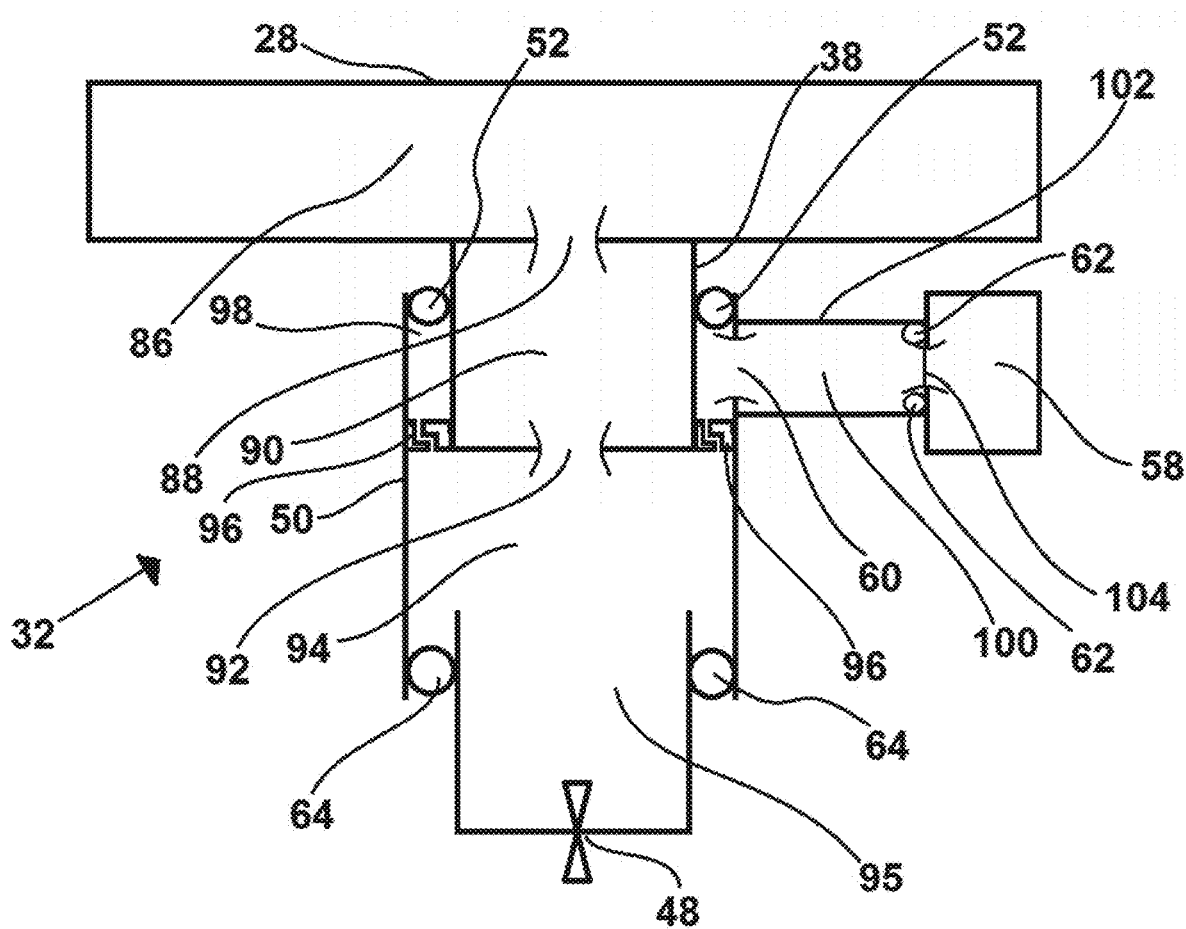
FIG. 9 is a schematic diagram of an embodiment of a pressure measuring device.

FIG. 9 is a schematic diagram illustrating an embodiment of the pressure measuring device 32. A system volume 95 of the pressure measuring device 32 may be contained by various fluidly communicating components. The tire assembly 28 contains a tire assembly volume 86. The tire assembly volume 86 is in fluid communication, through a first stem opening 88, with a valve stem volume 90 of the valve stem 38. The valve stem volume 90 is in fluid communication, through a second stem opening 92, with a pressure chamber volume 94 of the pressure chamber 50. A flow path of fluid communication may be defined between the first stem opening 88 and the second stem opening 92. The flow path may be extended to include flow between the tire assembly volume 86 and the valve core 48, including flow past the valve core 48.

The pressure chamber 50 interfaces with the valve stem 38 through a mechanical connection 96. The mechanical connection 96 may be the threaded pressure chamber portion 56 or may be an alternative connection such as a compression, mortise, or integral connection. The mechanical connection 96 is configured to allow fluid passage into a mechanical connection volume 98 contained with the mechanical connection 96. For instance, the mechanical connection 96 may be a threaded connection having sufficient clearance between the female and male threads in order to allow fluid communication along a length of a continuous thread. The valve stem 38 may include male threads configured to accept installation of the threaded pressure chamber portion 56 having female threads to allow such fluid communication. Alternatively, the mechanical connection 96 may include a channel (not shown) for instance to facilitate fluid communication past a compression fit. In these ways or through another type of the mechanical connection 96, the first stem opening 88 may accept threaded installation of the pressure chamber 50 about a first stem opening axis 89 such that the pressure chamber 50 has a point in its threaded pressure chamber portion 56 coaxial to the first stem opening axis 89.

The mechanical connection volume 98 is in fluid communication through the sense element opening 60 with a sense element chamber volume 100 of a sense element chamber 102. In this manner the sense element 58 is in fluid communication with the pressure chamber while not interrupting the flow path. The sense element chamber 102 attaches to the sense element 58. The sense element 58 is sealingly attached to the sense element chamber 102 with the use of the sense element seal 62. The sense element 58 may be threadably attached to the sense element chamber 102 or may alternatively be attached, for example using a compression fit, an adhesive connection, or an integral attachment. The sense element 58 includes a sensing unit 104 in fluid communication with the sense element chamber volume 100.

The sensing unit 104 may include a membrane or the like sealing the rest of the sense element 58 from fluid communication or there may be sealing means within the sense element 58. In another embodiment, no membrane is included and the sense element 58 is exposed to the fluid volume. The pressure chamber volume 94 is selectively prevented from being exposed to pressures external to the system volume 95 through interaction with the valve core 48 and the valve core seal 64. The valve core 48 facilitates adjustment of pressure through selective opening and closing. The valve core 48 may be a pressure-sealed valve type, such as a Presta valve; a check valve type, such as a Schrader valve; or another type of valve. The mechanical connection volume 98 may be sealed from external fluid communication by the valve stem 38 and the base seal 52. The base seal 52 may be configured to seat in the pressure chamber 50.

Figure 10:
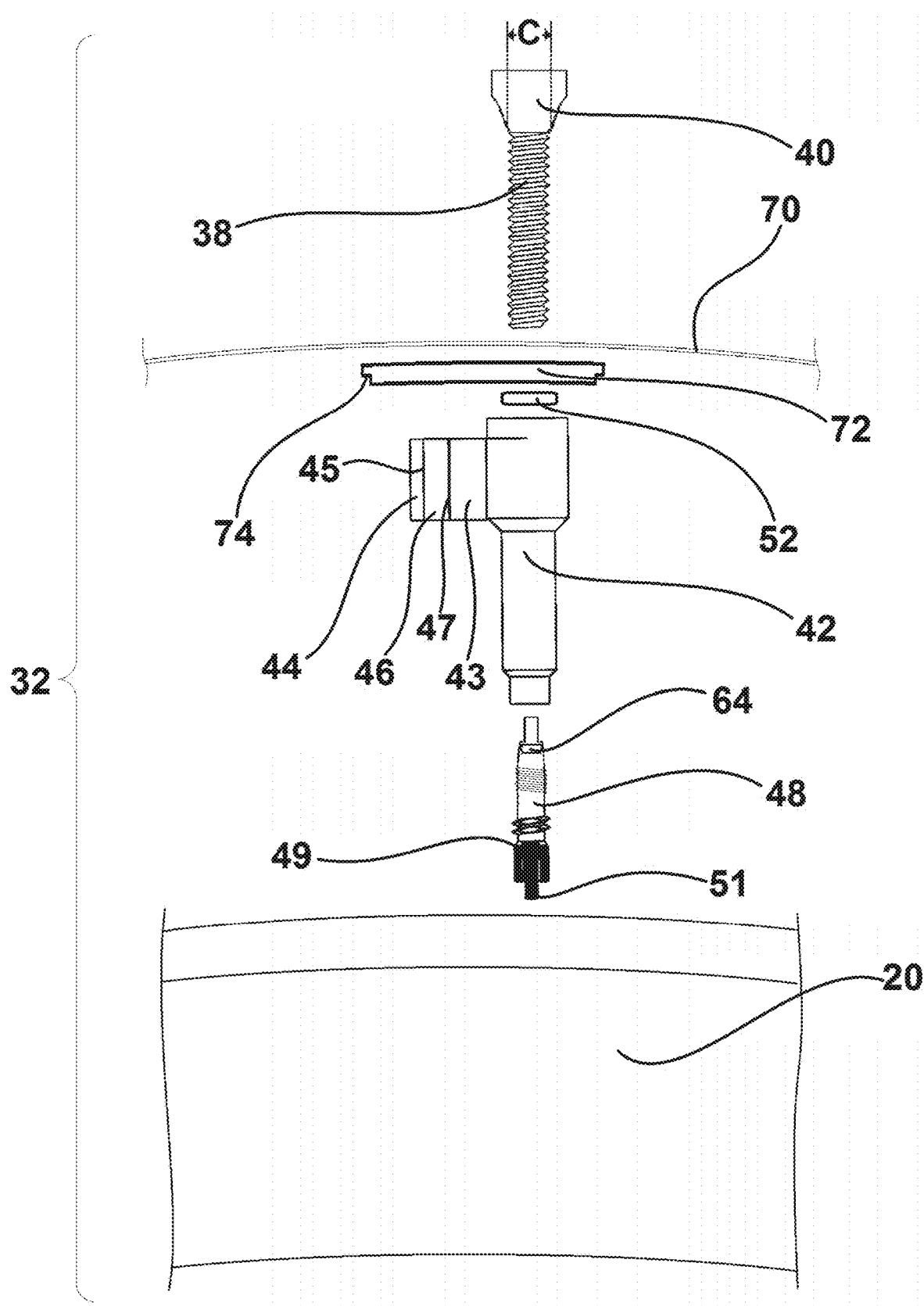
FIG. 10 is an exploded side view of a bicycle wheel rim and a pressure measuring device.

FIG. 10 is an exploded side view of the rim 20 and the pressure measuring device 32 in an uninstalled state. As shown, the mounting plate 72 may be used in conjunction with the flexible covering 70. The combination of the mounting plate 72 and the flexible covering 70 functions to support the housing 42 when installed in the rim 20 and to fluidly seal the tire assembly bed 36. The compressible base 40 of the removable valve stem 38 may seal against either or the combination of the mounting plate 72 and the flexible covering 70 in order to facilitate the tire assembly volume 86 as a closed volume as in a tubeless tire system. The base seal 52 may also seal against either or the combination of the mounting plate 72 and the flexible covering 70. The compressible base 40 may also seal directly against the base seal 52, alone or in conjunction with any of the above sealing arrangements.

In order to facilitate such sealing arrangements, the compressible base 40 is shown having the outer seal width C, which may be a diameter in a generally cylindrical embodiment of the valve stem 38. The outer seal width C may be a range of widths in which contact between the compressible base 40 and the housing 42 is made in an installed state. The housing 42 is also configured to accept installation of the valve core 48. The valve core 48 may also include a valve core nut 49 and a valve core actuator 51. The valve core nut 49 is threadably installed onto the valve core actuator 51 and functions to lock the valve core actuator 51 in place. When the valve core nut 49 is backed off of a fully installed or locked position the valve core actuator 51 may be depressed to move the valve core seal 64 and selectively allow fluid communication through the valve core 48 and into or out of the housing 42.

Figure 11:
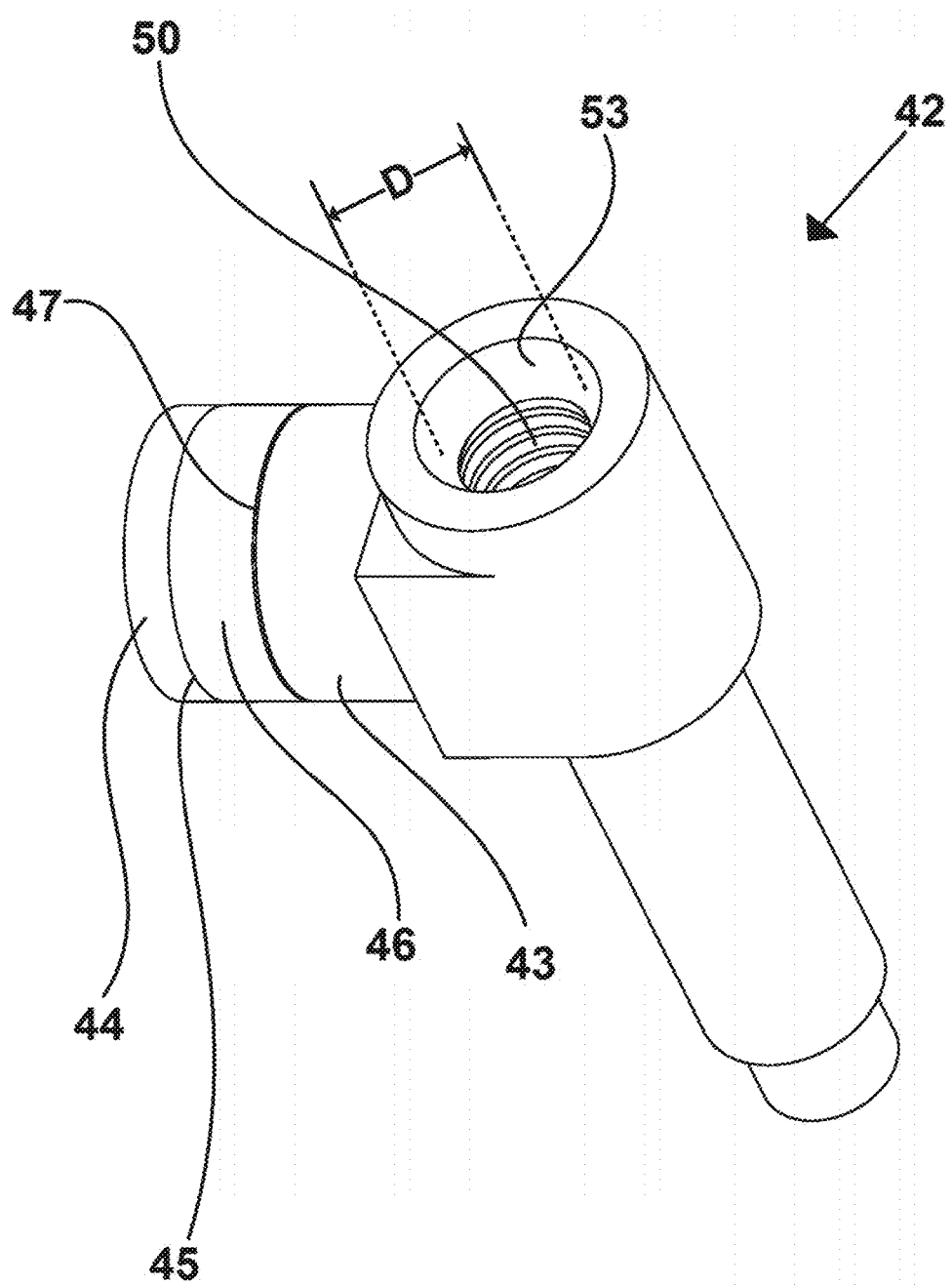
FIG. 11 is a perspective view of a housing for a pressure measuring device.

FIG. 11 is a perspective view of the housing 42 of the pressure measuring device 32. The housing 42 shows the pressure chamber 50 exposed. The pressure chamber 50 further comprises a base seal surface 53 sized and shaped to interact with the base seal 52. The base seal surface 53 of the pressure chamber 50 is shown with a beveled configuration adjacent to the threaded pressure chamber portion 56. The base seal surface 53 may be described as having the seal surface inner width D. The seal surface inner width describes the maximum constrained width of the base seal 52 when in an installed state. The threaded pressure chamber portion 56 facilitates the mechanical connection 96. In this configuration of the base seal surface 53, a frustoconical configuration of the base seal 52 may be used to maximize contact area and minimize deformation between the base seal surface 53 and the base seal 52. In this configuration, the seal surface inner width D would be measured at a radially outward location to capture the maximum constrained width of the frustoconical configuration of the base seal 52.

The base seal surface 53 could also be shaped in various ways in order to contain alternative configurations of the base seal 52. For instance, the base seal surface 53 may be concave in order to accept a rounded configuration of the base seal 52 with a greater contact area for the same deformation between the base seal 52 and the base seal surface 53. In this configuration, the seal surface inner width D would be measured at a radially inward location relative to the above frustoconical configuration in order to capture the maximum constrained width of the rounded configuration of the base seal 52. Alternatively, the base seal 52 could be the compressible base 40 in order to seal against the shown beveled configuration. Through this sealing connection, a relationship between the outer seal width C of FIG. 10 and the seal surface inner width D may be determined. For instance, the outer seal width C may be configured to be larger, at least in some portion if a range, than the seal surface inner width D such that one or both of the compressible base 40 and the base seal surface 53 must deform to facilitate sealing installation.

The removable power source portion 44 and the removable circuitry portion 46 are shown in installed states. The removable power source portion 44 interfaces with the removable circuitry portion 46 through a first removable portion connection 45. The removable circuitry portion 46 interfaces with a body portion 43 of the housing 42 through a second removable portion connection 47. Installation and removal of the removable power source portion 44 and/or the removable circuitry portion 46 may be facilitated by surface features such as texturing, knurling, or tool-receiving surface features.

Figure 12:
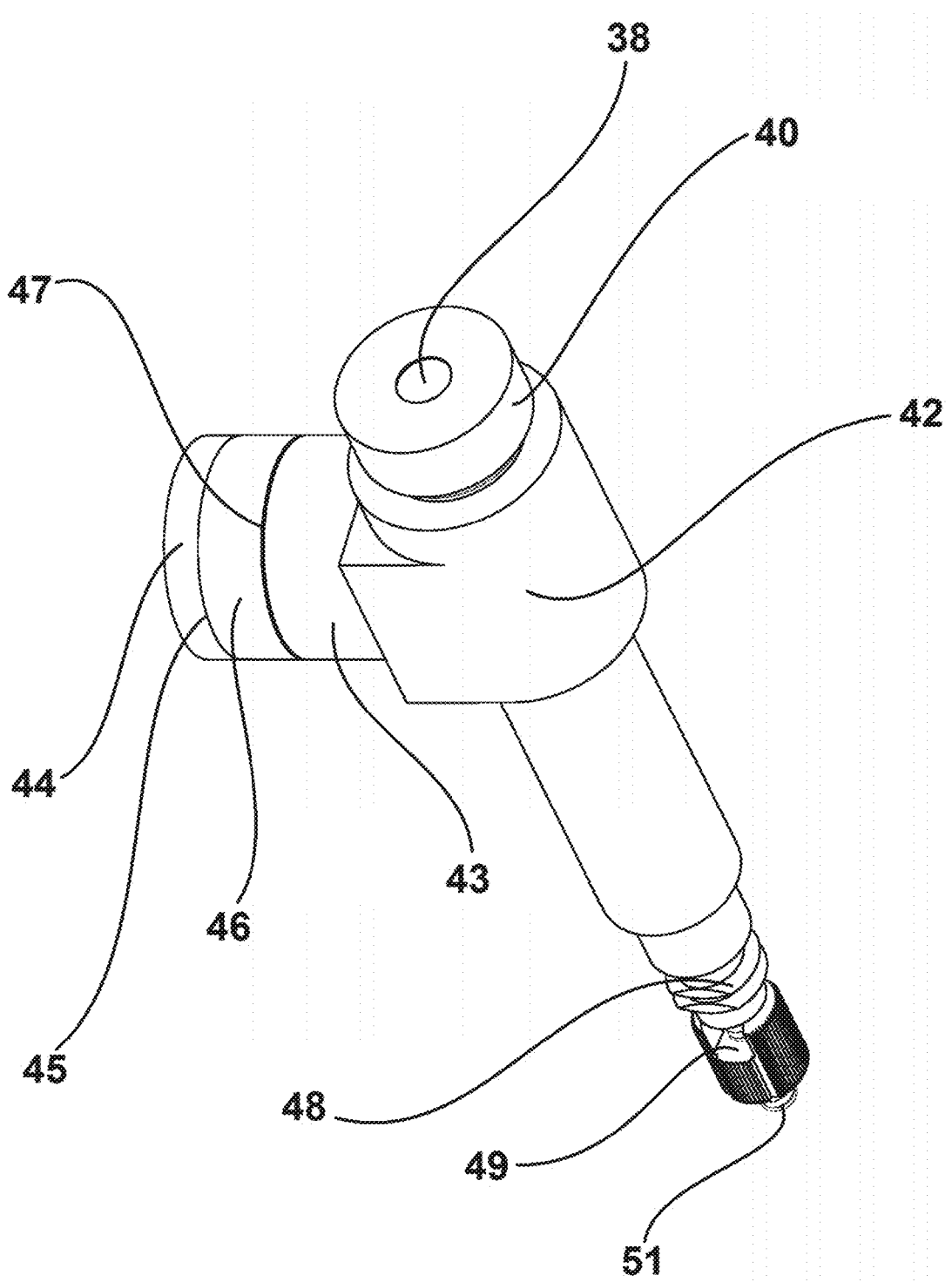
FIG. 12 is a perspective view of the housing for the pressure measuring device of FIG. 11, with a valve and a valve stem in an installed state.

FIG. 12 is a perspective view of the housing 42 for the pressure measuring device 32, as in FIG. 11, further including the valve core 48 and the valve stem 38 installed in the housing 42. The installation of the valve stem 38 may or may not include the base seal 52.

Figure 13:
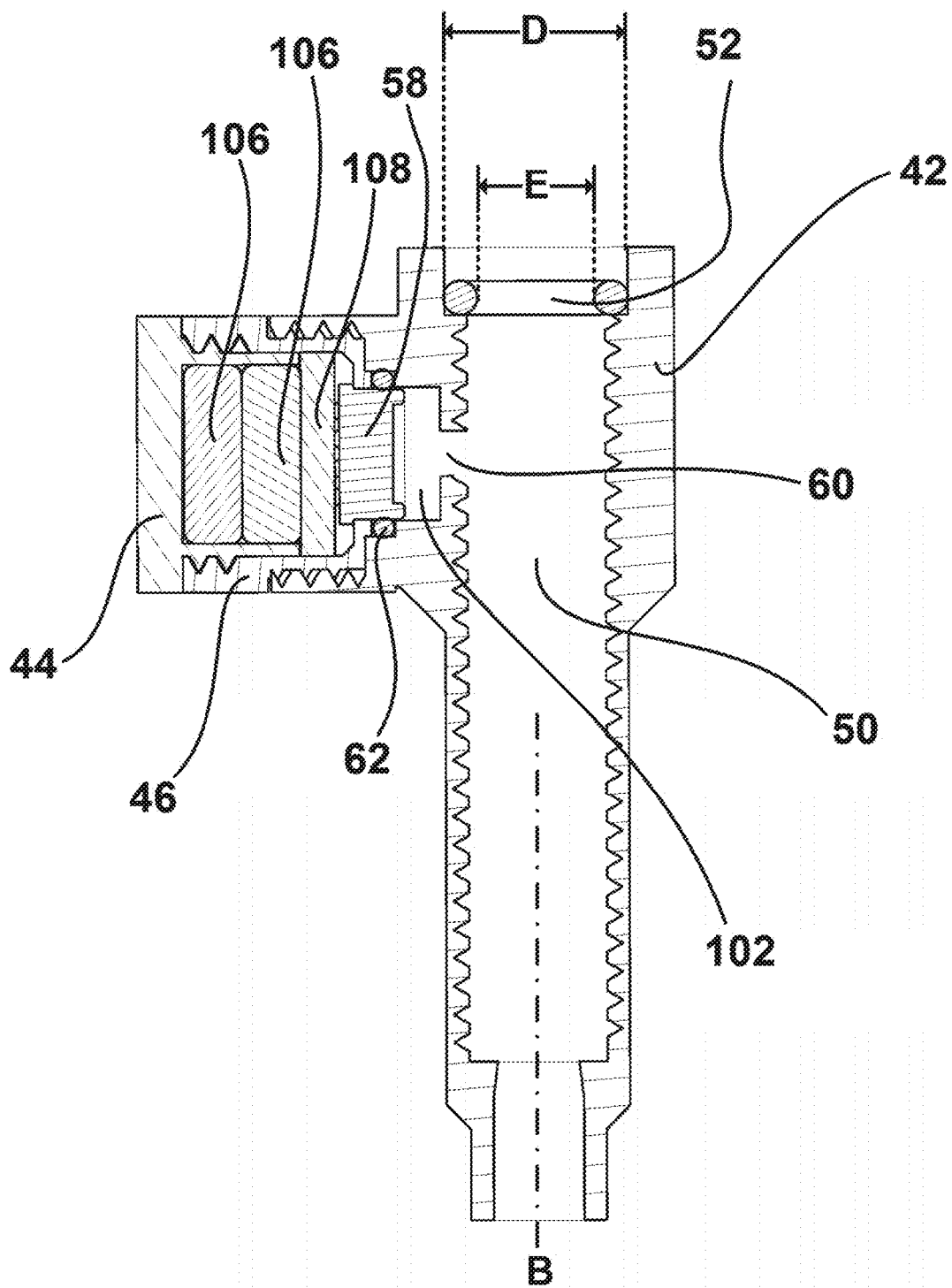
FIG. 13 is a bisected cross-sectional view of an embodiment of a pressure measuring device.

FIG. 13 is a bisected cross-sectional view of the housing 42 of the pressure measuring device 32 showing components internal to the housing 42. The housing 42 includes the removable power source portion 44 and the removable circuitry portion 46 in installed states. The removable power source portion 44 contains a power source 106. The power source 106 may be a single piece or may have multiple components such as a pair of coin cell batteries. The removable power source portion 44 and/or the removable circuitry portion 46 may be configured to conduct electrical current from the power source 106 to a circuitry unit 108. The circuitry unit is in electrical communication with the sense element 58. The housing is also shown to contain a generally toroidal embodiment of the base seal 52 having a base seal installed inner diameter E. The base seal 52 may also be described as having an installed outer diameter, constrained by the seal surface inner width D.

Figure 14:
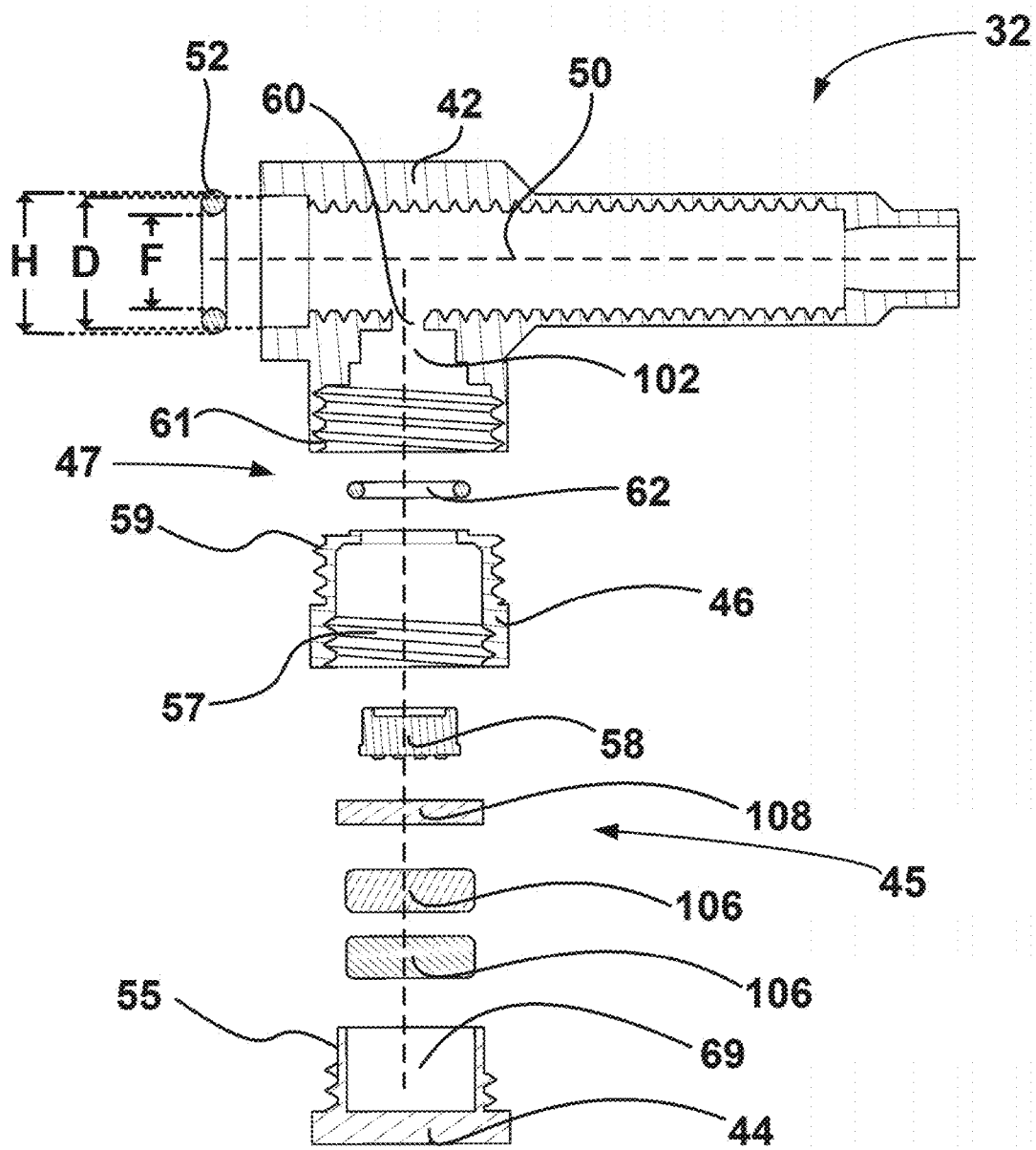
FIG. 14 illustrates an exploded view of the pressure measuring device of FIG. 13.

FIG. 14 illustrates a bisected cross-sectional exploded view of the housing 42 of the pressure measuring device 32 of FIG. 13. The base seal 52 may be removable from the housing 42 to facilitate replacement or installation. For instance, the base seal 52 may have a base seal free outer diameter H that is larger than the seal surface inner width D into which the base seal 52 fits. The base seal free outer diameter H may be configured to be larger than the seal surface inner width D such that at least one of the base seal 52 and the base seal surface 53 must deform to facilitate sealing installation.

The base seal 52 may also be stretched and/or installed on the valve stem 38 before installation in the housing 42 in order to avoid frictional wear that could occur from installation of the valve stem 38 with the base seal 52 in a non-stretched state, especially if the valve stem 38 is of a threaded configuration. The base seal 52 may also be described as having a base seal free inner diameter F. As an example, the pressure measuring device 32 may be configured such that the base seal free inner diameter F is greater than the base seal installed inner diameter E in order to achieve an interference fit between the base seal 52 and the base seal surface 53 and to facilitate sealing installation.

The removable power source portion 44 may be configured to connect with the removable circuitry portion 46 as shown. The removable power source portion 44 may have a power source connection portion 55 configured to connect to a circuitry receiving portion 57 of the removable circuitry portion 46 forming the first removable portion connection 45. The removable circuitry portion 46 may have a circuitry connection portion 59 configured to connect to a body receiving portion 61 of the body portion 43 forming the second removable portion connection 47. The connections may be threaded or otherwise fit to facilitate removal and installation. For example, the power source connection portion 55 may have male threads configured to interact with female threads of the circuitry receiving portion 57 and the circuitry connection portion 59 may have male threads configured to interact with female threads of the body receiving portion 61. When in an installed state, the removable power source portion 44 and the removable circuitry portion 46 contain the power source 106, the circuitry unit 108, and the sense element 58. In order to achieve this containment, the removable power source portion 44 may include a power source portion chamber 69 configured to house at least a portion of the power source 106, the circuitry unit 108, and/or the sense element 58.

To facilitate servicing, the removable power source portion 44 may be configured to facilitate removal of the power source 106 while allowing the circuitry unit 108 and the sense element 58 to remain in installed states. For instance, the removable circuitry portion 46 may include the sense element 58 and the circuitry unit 108 as permanent installations. The removable circuitry portion 46 may also include a wireless communicator 120 and thus may also be referred to as a wireless communication portion.

To facilitate transmission and/or receiving of signals, the removable circuitry portion 46 may be constructed of a radio frequency transparent material. For instance, the removable circuitry portion 46 may be constructed of ceramic, glass, or plastic materials or may be constructed out of an otherwise radio frequency opaque material with cut outs or other configurations to facilitate radio frequency transparency.

If either the sense element 58 or the circuitry unit 108 become damaged or are otherwise made non-functional, group replacement of the removable circuitry portion 46 including a pre-installed configuration of the sense element 58 and circuitry unit 108 may be facilitated through the use of new circuitry portion 46 and/or sense element 58 parts. The removable circuitry portion 46 may also be configured to facilitate individual replacement of circuitry components such as the wireless communicator 120, the sense element 58, or the circuitry unit 108. The removable circuitry portion 46 may be threadably installed with the body portion 43 of the housing 42 as shown. The sense element seal 62 interacts with the body portion 43, the removable circuitry portion 46, and/or the sense element 58 in an installed state.

Figure 15:
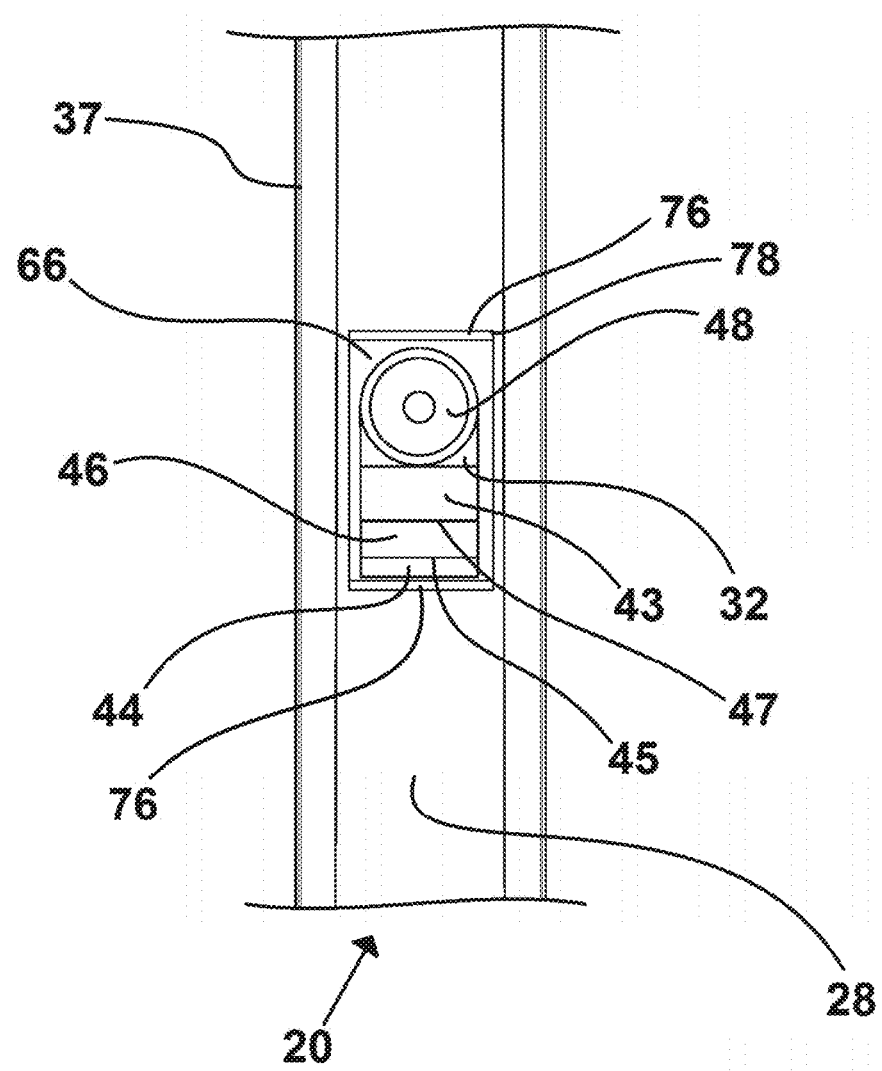
FIG. 15 is a top view of a bicycle wheel rim including a pressure measuring device.

FIG. 15 is a top view of the rim 20 and the pressure measuring device 32 in an installed state. The radial access opening 66 receives the pressure measuring device 32 for installation. The radial access opening 66 includes the recess 78 having outer bed face 76. The recess 78 and the outer bed face 76 may be configured to receive the mounting plate 72. The radially outer tire-engaging portion 37 of the rim 20 is shown to create outer boundaries of the tire assembly bed 36 in radial directions in order to facilitate installation of the flexible covering 70 and/or the tire assembly 28.

Figure 16:
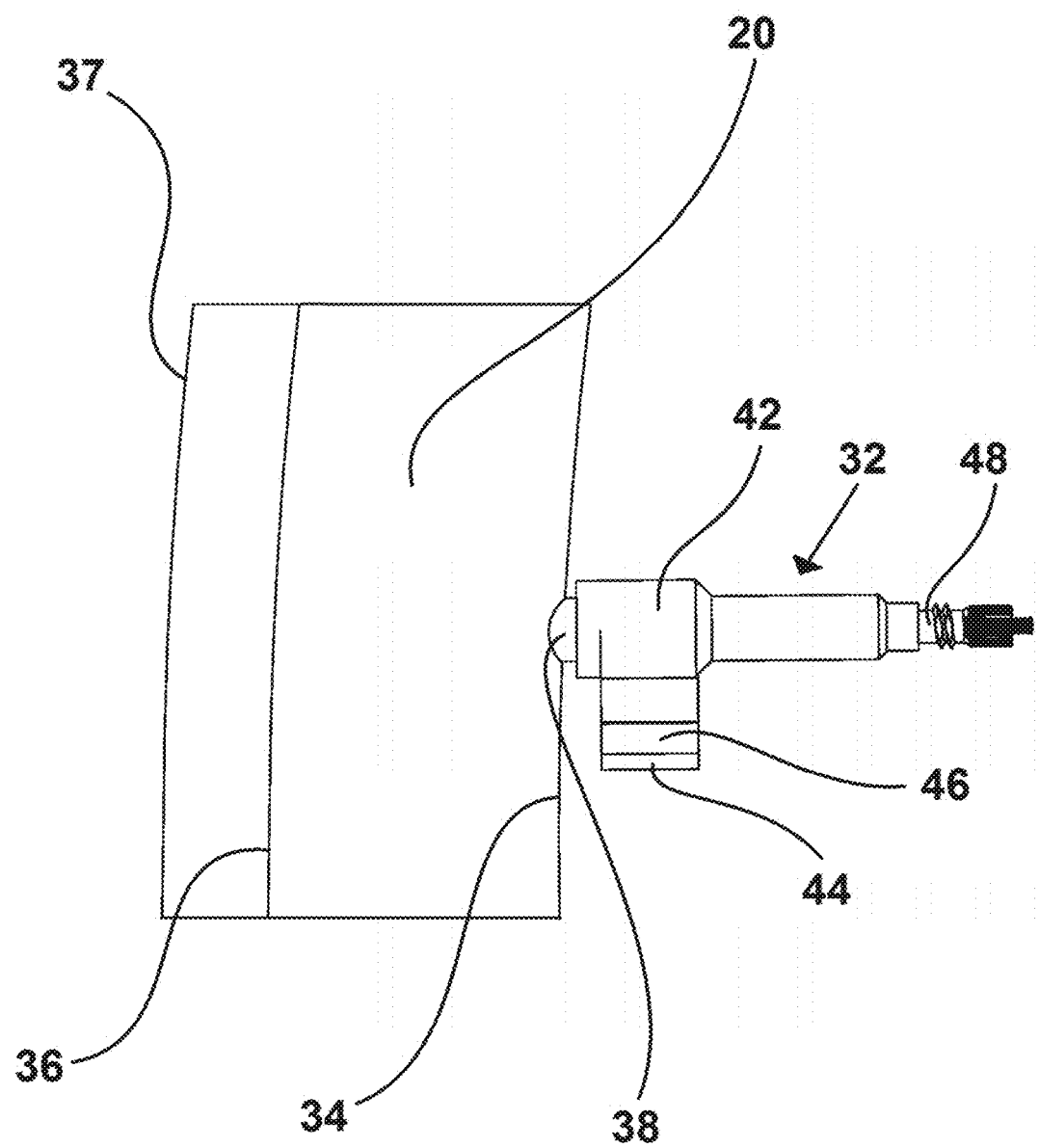
FIG. 16 is a side view of a bicycle wheel rim with a pressure measuring device.
Figure 17:
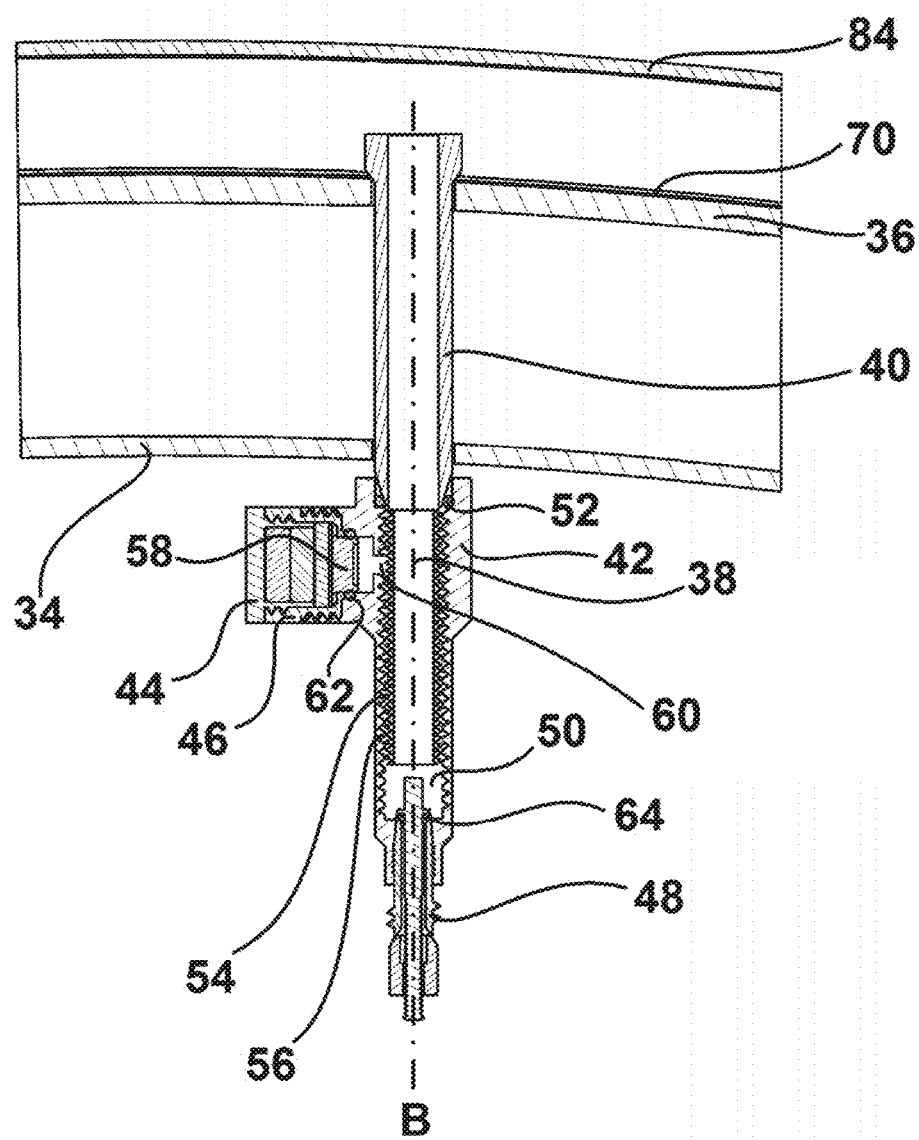
FIG. 17 illustrates a bisected cross-sectional view of a bicycle wheel rim and a pressure measuring device of FIG. 16.
Figure 18:
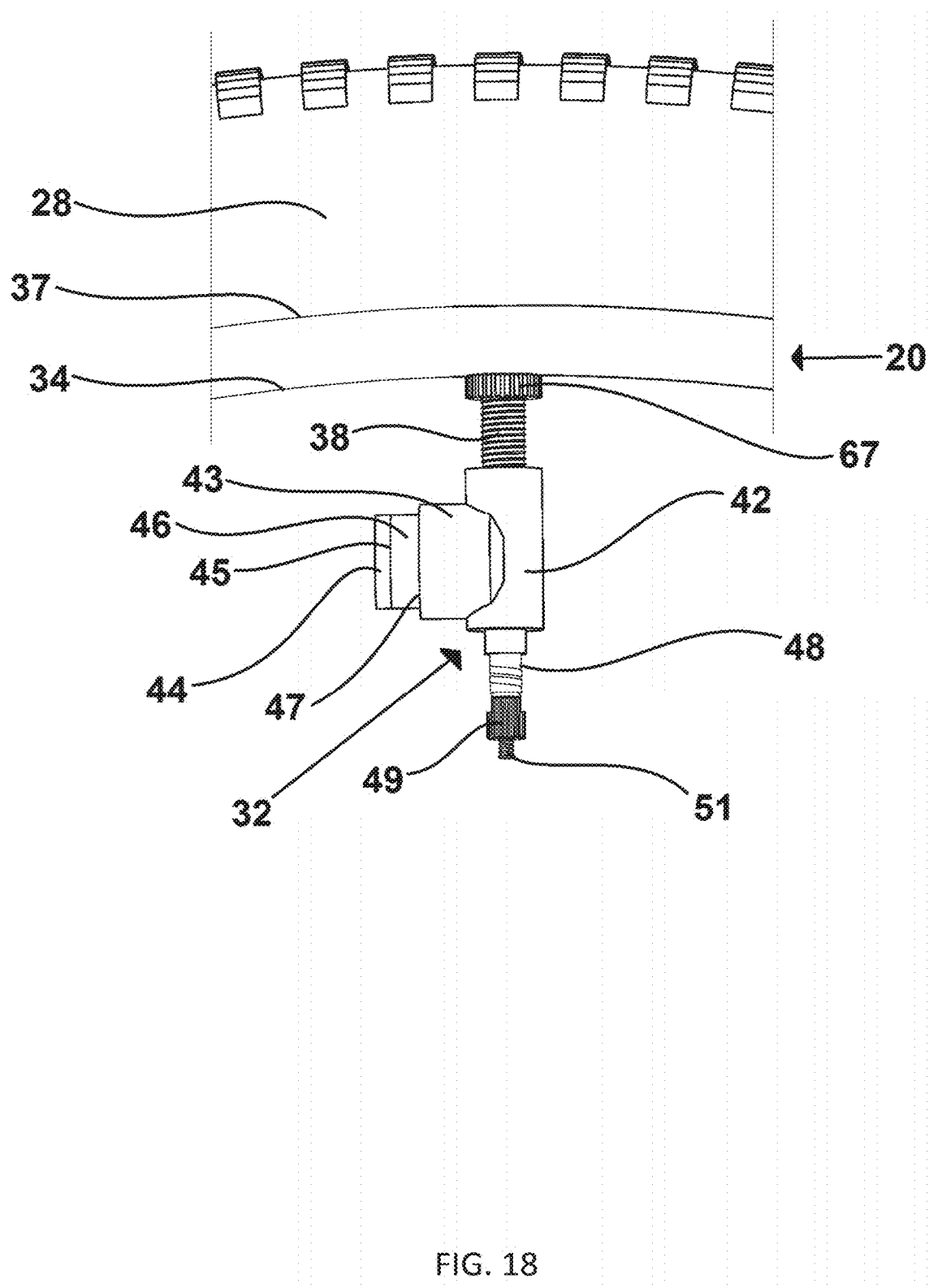
FIG. 18 is a side view of a bicycle wheel rim and tire assembly with a pressure measuring device.
Figure 19:
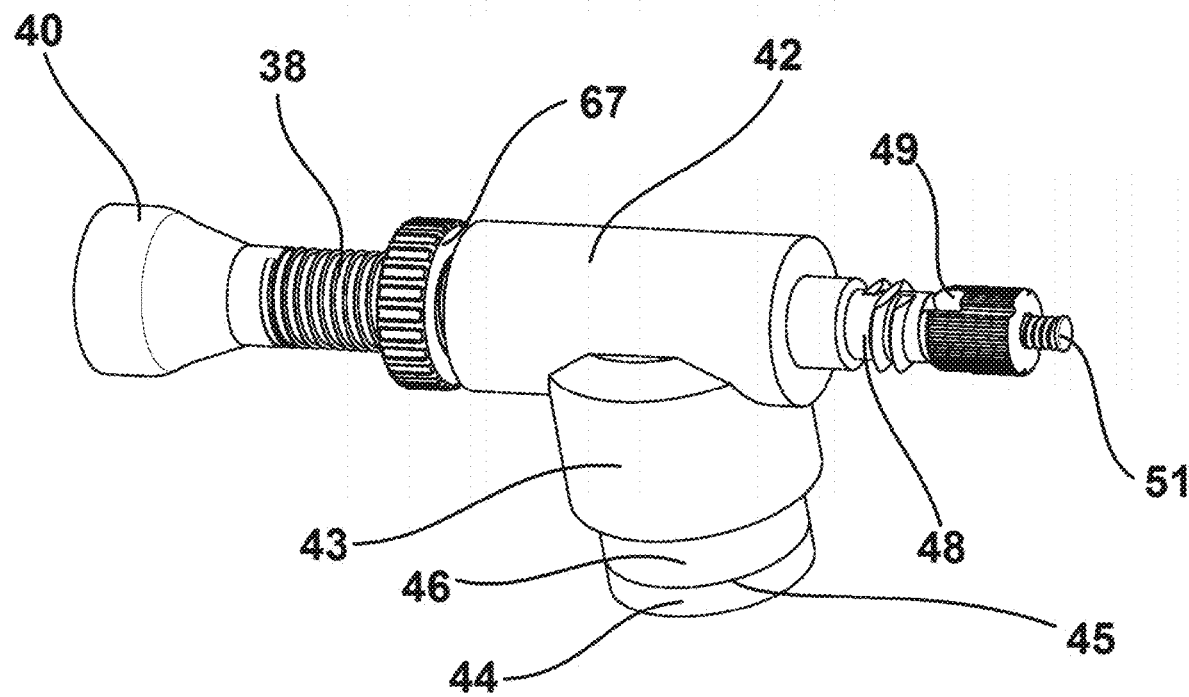
FIG. 19 is a perspective view of the pressure measuring device of FIG. 18.

FIG. 16 is a side view of the rim 20 and the pressure measuring device 32 in an installed state. In this alternative installation, the pressure measuring device 32 is installed entirely radially inward of the spoke bed 34 and external to the rim 20. The housing 42 installs onto the valve stem 38, which protrudes from the rim 20 in a radially inward direction. The rest of the arrangement remains largely unchanged. The sense element 58 is still disposed radially between the tire assembly bed 36 and the valve core 48 as shown in FIG. 17. Neither the tire assembly bed 36 nor any other part of the rim 20 needs to be configured to receive the pressure measuring device 32. The valve stem 38 may be elongated depending on the radial distance between the tire assembly bed 36 and the spoke bed 34 of the specific type of the rim 20 used.

FIG. 17 illustrates a cross-sectional view of the rim 20 and the pressure measuring device 32 of FIG. 16. The tire assembly 28 is shown in a tubeless configuration with the tire casing 84 sealed in conjunction with the flexible covering 70. The valve stem 38 is shown in an elongated configuration. Specifically, the compressible base 40 is extended for the length of the valve stem 38 that is contained radially between the tire assembly bed 36 and the spoke bed 34. In this way, the compressible base 40 may facilitate a sealing connection in two locations. First, the compressible base 40 may be used in conjunction with the tire assembly bed 36, the flexible covering 70, and/or the mounting plate 72 (not shown). Alternatively, the compressible base 40 may be used in conjunction with at least one of the base seal 52 and the housing 42. This same arrangement may occur in the internal assembly shown in previous figures, for instance with less radial distance between the first and second sealing connection locations for the same dimensions of the rim 20.

FIGS. 18-23 illustrate an alternative embodiment. The example of the pressure measuring device 32 shown in FIGS. 18-23 differs from the example shown in FIGS. 3-17 in that the pressure chamber volume 94 is not in fluid communication with the sense element 58. The housing 42 further includes a sense chamber 63 having a sense chamber volume 65. The sense chamber volume 65 may be sealed from fluid communication with the pressure chamber volume 94 by a barrier 124. The barrier 124 is configured to facilitate pressure communication between the pressure chamber volume 94 and the sense chamber volume 65. In order to facilitate such pressure communication, the barrier 124 may be elastomeric or otherwise configured to deflect as a result of pressure differential. The barrier 124 includes a barrier inner surface 125 that may be configured to be in fluid contact with the pressure chamber 50. The sense chamber volume 65 may be a sealed volume containing a pressure-transmitting medium. The pressure-transmitting medium may be a fluid which may be non-compressible. In such a way, the sense element 58 may measure a pressure within the pressure chamber volume 94 through displacement of the pressure-transmitting medium. Assuming a non-compressible fluid is implemented in this manner, deflection of the barrier 124 shown in FIG. 22 will be understood to be exaggerated for demonstrative purposes.

The barrier 124 may be configured to fit a lock-receiving feature 131 of the housing 42. For instance, the barrier 124 may include a barrier lock 130 configured to facilitate fixing of the barrier 124 relative to the lock-receiving feature 131 of the housing 42. The barrier 124 may also be configured to fit a base-receiving feature 133 of the housing 42. For instance, the barrier 124 may include a barrier base 127 configured to facilitate fixing of the barrier relative to the base-receiving feature 133 of the housing 42. The barrier base 127 may also be configured to include the base seal 52.

Figure 21:
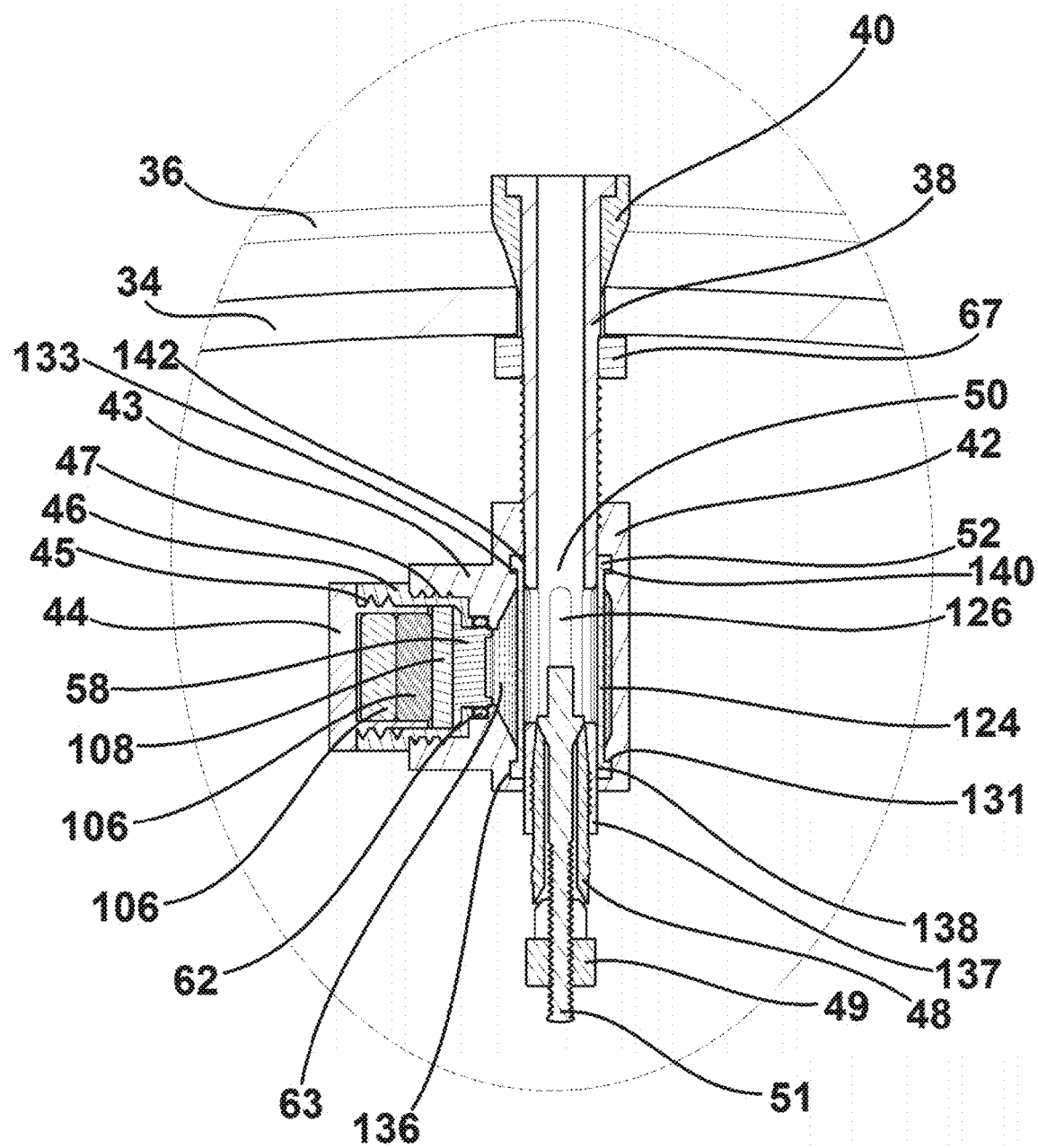
FIG. 21 is the bisected cross-sectional view of the pressure measuring device of FIG. 20 shown enlarged for clarity.
Figure 22:
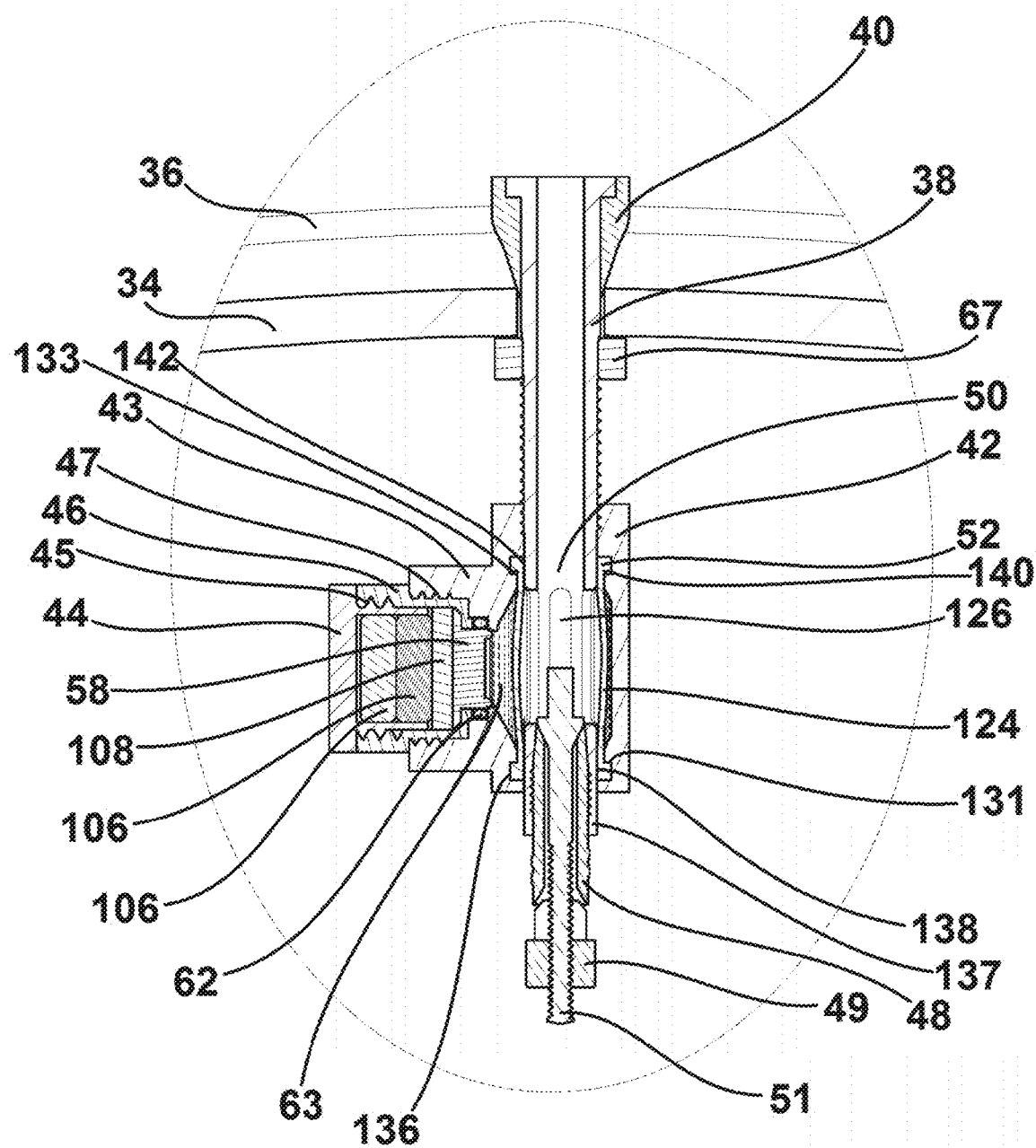
FIG. 22 is the enlarged detail of FIG. 21 showing the pressure measuring device in a higher pressure state.
Figure 23:
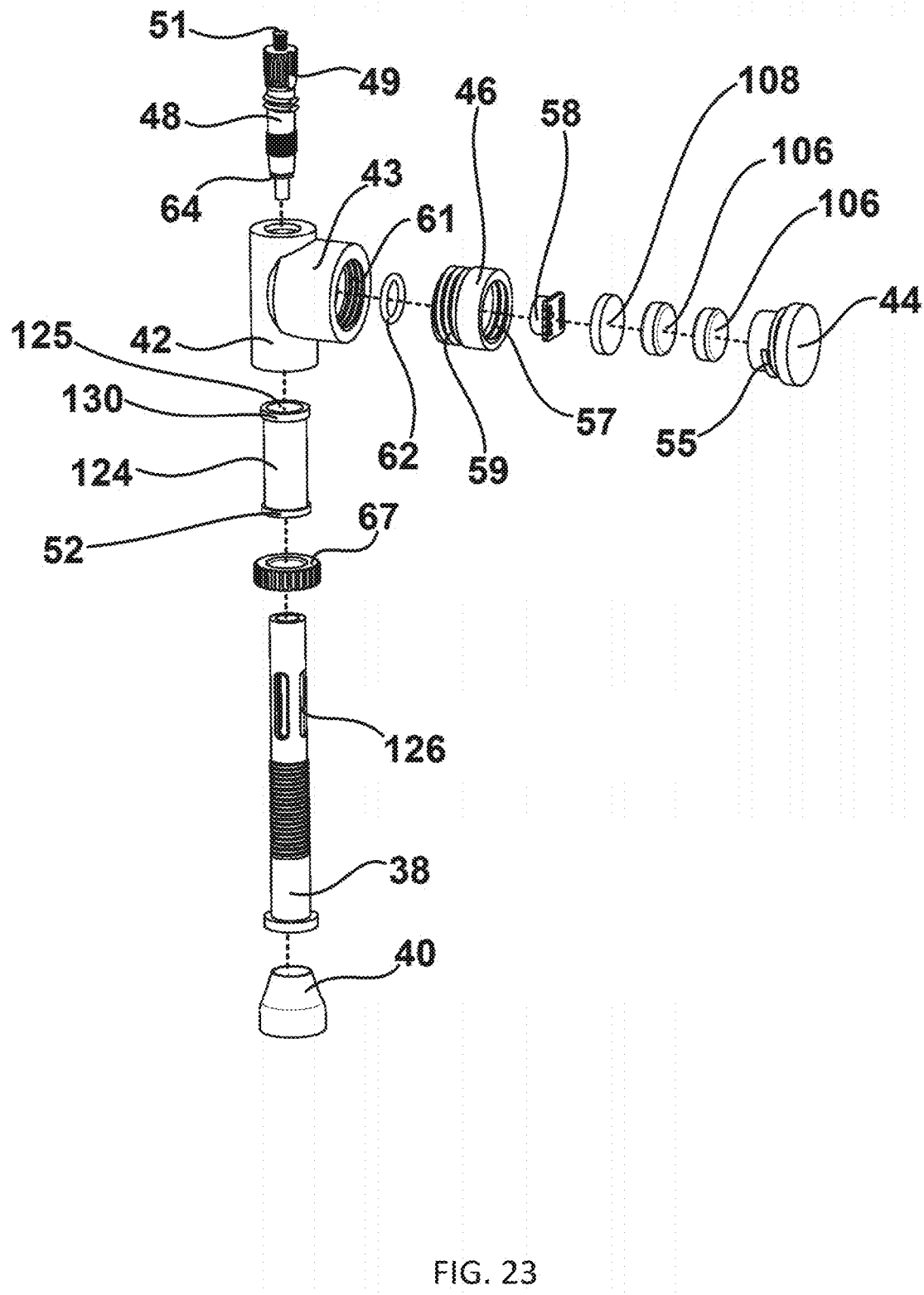
FIG. 23 illustrates an exploded view of the pressure measuring device of FIG. 18.

Referring to FIGS. 21 and 22, the barrier 124 may be configured to seal in various ways with the housing 42, the valve stem 38, and/or the valve core 48 or a core adaptor 137. For instance, the barrier 124 may include an outer core seal 136 and an outer stem seal 140 in order to facilitate sealing with the housing 42. The outer core seal 136 may be configured to facilitate sealing by interaction with the lock-receiving feature 131 of the housing 42 and the outer stem seal 140 may be configured to facilitate sealing by interaction with the base-receiving feature 133 of the housing 42. The barrier 124 may also include an inner stem seal 142 on the barrier inner surface 125 to facilitate sealing with the valve stem 38 and an inner core seal 138 on the barrier inner surface 125 to facilitate sealing with the valve core 48 or the core adaptor 137. The core adaptor 137 may be implemented to facilitate removal and installation of the valve core 48 without directly interfering with the barrier 124. The barrier 124 may also facilitate sealing with any of the housing 42, the valve stem 38, the valve core 48, or the core adaptor 137 through the use of adhesives or sealants. For instance, the barrier 124 may be glued into place inside the housing 42 and/or sealant may be allowed to flow through the system volume 95 such as is common in tubeless type tire usage. The housing 42 may also be configured to be entirely spaced apart from the barrier 124 so as not to limit deflection of the barrier 124.

To achieve fitment of the valve stem 38, the valve core 48, and/or the housing 42, the barrier 124 may be of a hollow cylindrical configuration. The barrier 124 may also be of varied thickness. For instance, the barrier 124 may be of a flanged configuration, such as to facilitate fitting the lock-receiving feature 131 of the housing 42, where the flanged configuration accommodates the barrier lock 130. The flanged configuration of the barrier 124 may also facilitate inclusion of the base seal 52 as part of the barrier 124.

The valve stem 38 is shown to be secured to the rim 20 in a radial direction with a fixing element 67. The fixing element 67, which may be what is commonly known as a lock nut, may be used to create a sealing fit between components such as the compressible base 40, the flexible covering 70 and the rim 20. The valve stem 38 may also be configured to include at least one communication feature 126. The communication feature 126 may be an annular opening, such as the first stem opening 88, in the valve stem 38. The communication feature 126 may also be shaped and sized so as not to be sealed or otherwise blocked by any sealant that may flow through the valve stem 38. The pressure measuring device 32 may also be configured such that the communication feature 126 is disposed at least partially radially outward of the valve core 48 and the core adaptor 137. In this way, clearance between the communication feature 126 and the valve core 48 and/or the core adaptor 137 can be adjusted to balance the resistance to blockage by sealant against the size and weight of the pressure measuring device 32.

Figure 24:
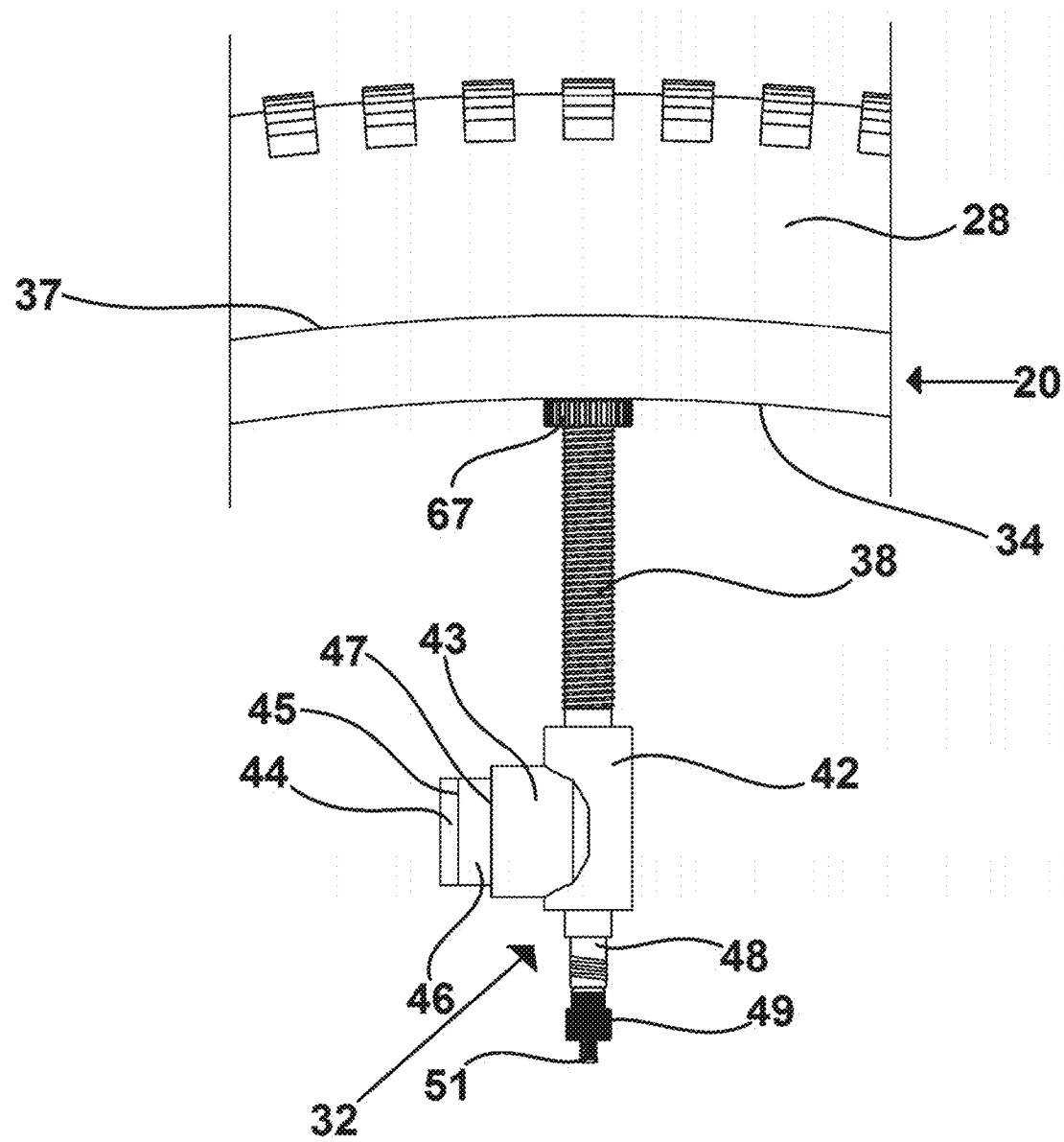
FIG. 24 is a side view of a bicycle wheel rim and tire assembly with a pressure measuring device.
Figure 25:
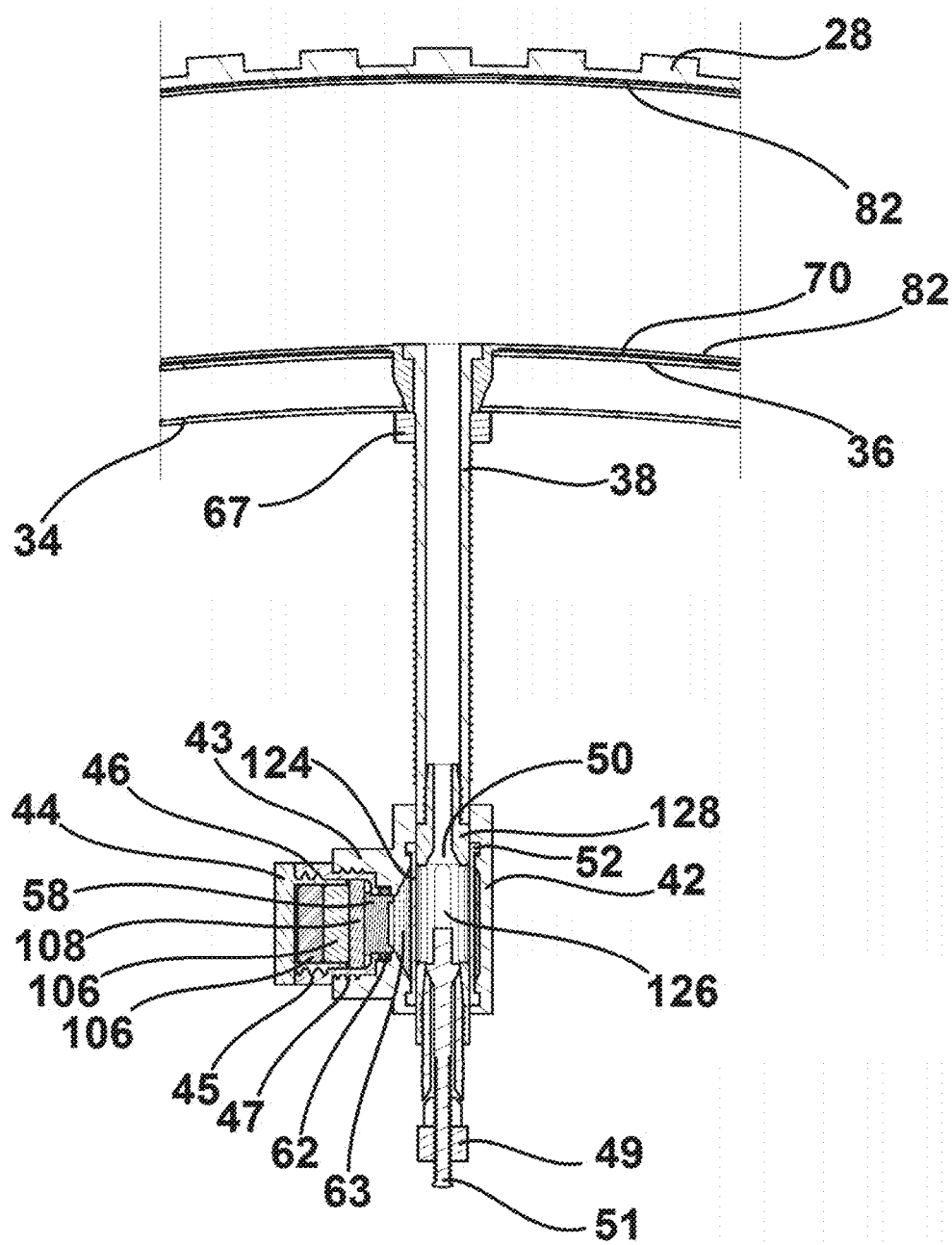
FIG. 25 is a bisected cross-sectional view of the pressure measuring device of FIG. 24.
Figure 26:
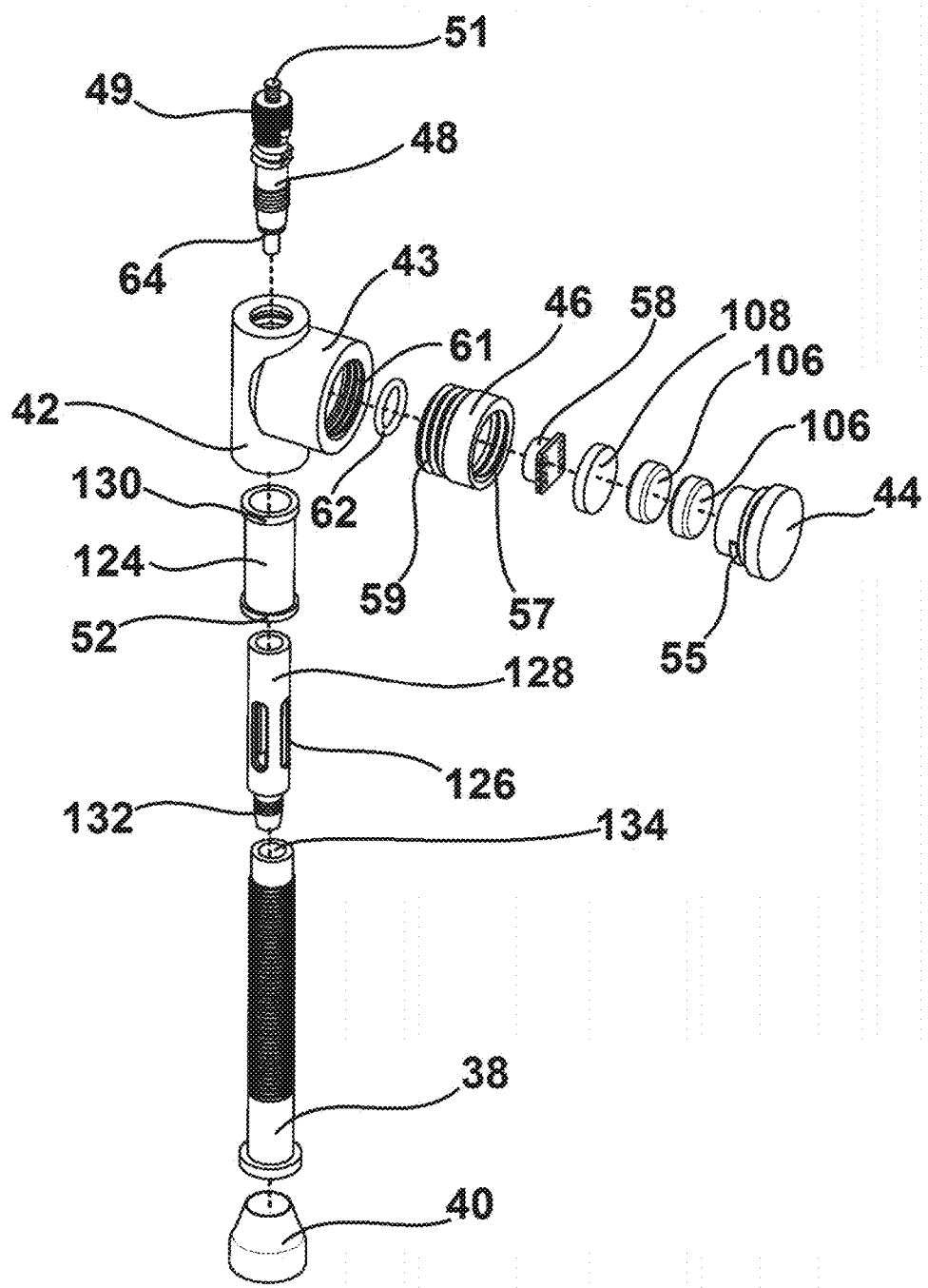
FIG. 26 illustrates an exploded view of the pressure measuring device of FIG. 24.

FIGS. 24-26 illustrate an alternative embodiment. The example of the pressure measuring device 32 shown in FIGS. 24-26 differs from the example shown in FIGS. 18-23 in that the communication feature 126 is not part of the valve stem 38. Instead, the communication feature 126 may be included on a removable communication section 128. The removable communication section 128 may include a removable communication section connection portion 132 configured to connect with the valve stem 38. The valve stem 38 may be further configured with a valve stem receiving portion 134 configured to receive the removable communication section connection portion 132. The removability of the removable connection portion 132 may facilitate the use of various, non-specialty types of the valve stem 38. As an example, a type of the valve stem 38 may come with the valve core 48 installed. The valve core 48 may be removed from the valve stem 38 and then both the valve core 48 and the valve stem 38 may be installed as implemented in this embodiment.

Figure 27:
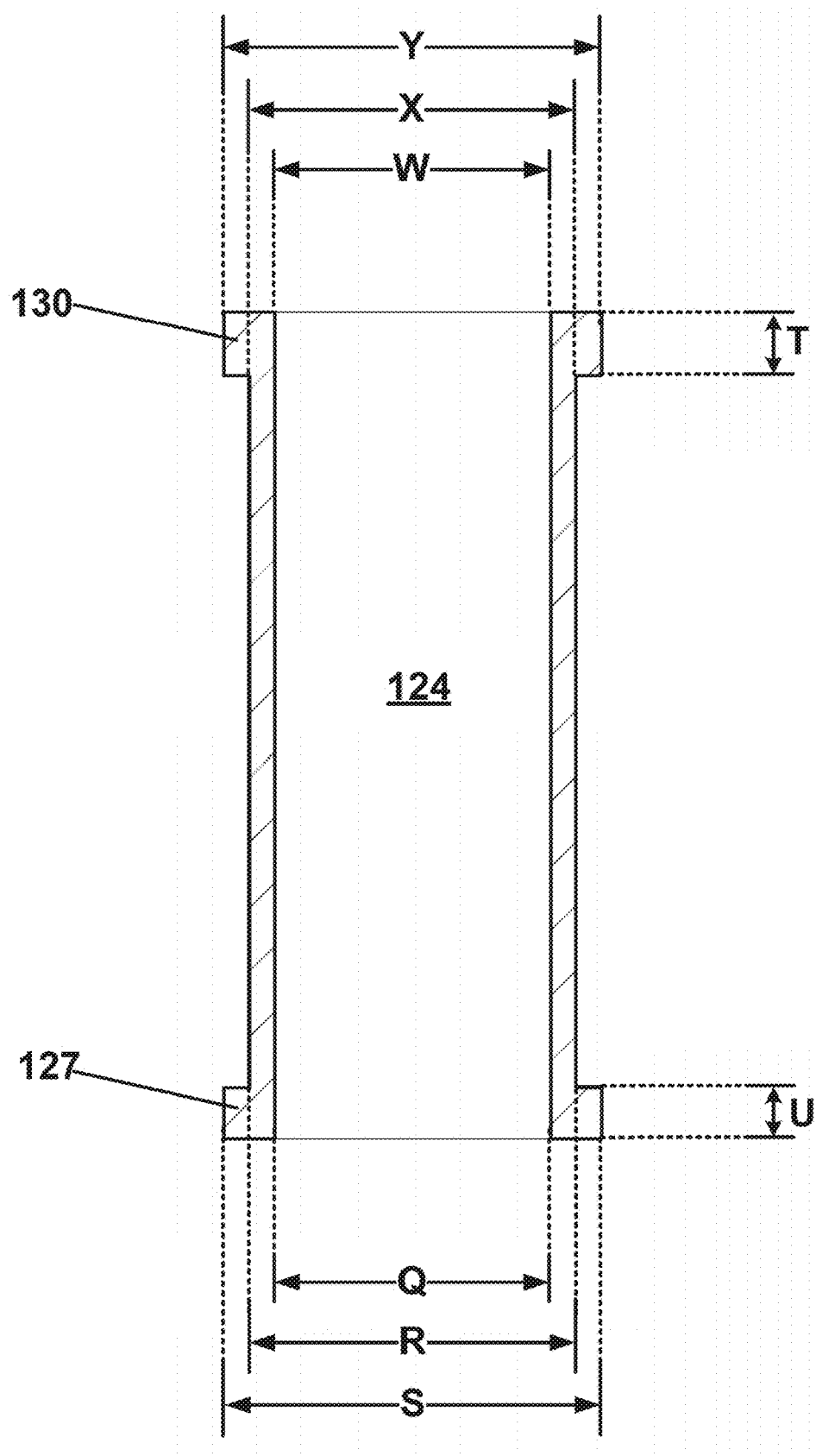
FIG. 27 illustrates possible relative dimensions of a barrier of the pressure measuring devices of FIGS. 18-26.
Figure 28:
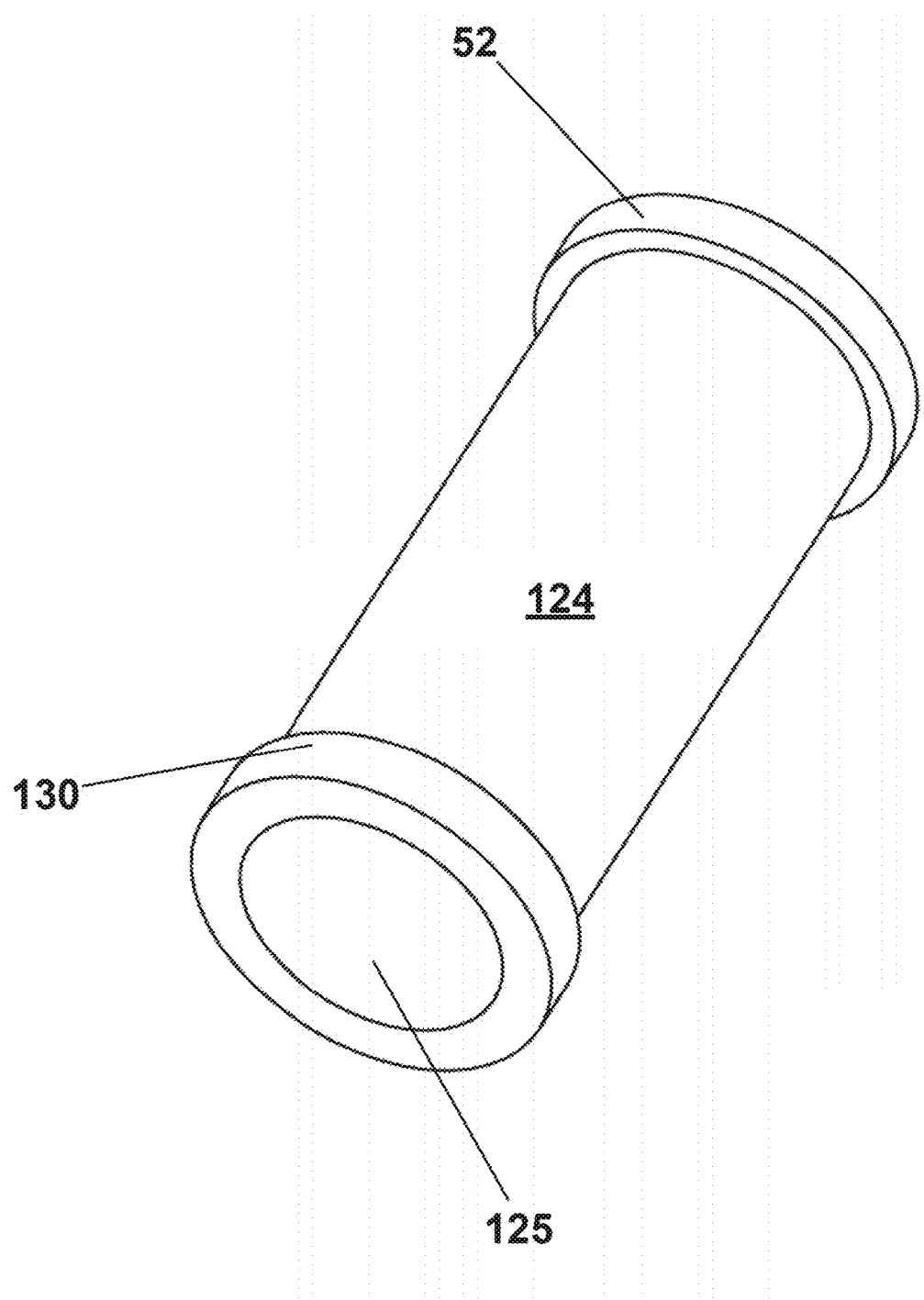
FIG. 28 is an isometric view of the barrier of FIG. 27.

FIGS. 27 and 28 illustrate a possible configuration of the barrier 124. Referring to FIG. 27, the barrier 124 is shown to include the barrier base 127 and the barrier lock 130. The barrier base 127 of the barrier 124 may be described as having a base inner width Q, a base terminal barrier width R, a base outer width S, and a base length U. These dimensions may be adjusted to facilitate locking and sealing with other components of the pressure measuring device 32. For instance, the base length U may be configured to be larger than a corresponding dimension in the base-receiving feature 133 of the housing 42 when the barrier base 127 is in an uncompressed state. Similarly, the base outer width S may be configured to be larger than a corresponding dimension in the base-receiving feature 133 of the housing 42 when the barrier base 127 is in an uncompressed state. In each of these ways, compression of the barrier 124 may facilitate fixing or sealing of the barrier base 127 to other components of the pressure measuring device 32. The barrier base 127 may also be configured such that the base inner width Q is smaller than the outer seal width C of the valve stem 38 such that compression of the outer seal width C or expansion of the base inner width Q may facilitate sealing between the valve stem 38 and the barrier base 127 as through inner stem seal 142. The base terminal barrier width R may be configured as to facilitate sealing interaction between the barrier base 127 and the base-receiving feature 133 by allowing the barrier base 127, at a point of its base outer width S, to move sufficiently radially outward relative to the first stem opening axis B. In a cylindrical configuration of the barrier 124, each of the above widths may be measured as a diameter. If the barrier base 127 functions as the base seal 52, then when the barrier 124 is in an uninstalled state, the base outer width S may be the same as the base seal free outer diameter H and the base inner width Q may be the same as the base seal free inner diameter F.

The barrier lock 130 of the barrier 124 may be described as having a lock inner width W, a lock terminal barrier width X, a lock outer width Y, and a lock length T. These dimensions may be adjusted to facilitate locking and sealing with other components of the pressure measuring device 32. For instance, the lock length T may be configured to be larger than a corresponding dimension in the lock-receiving feature 131 of the housing 42 when the barrier lock 130 is in an uncompressed state. Similarly, the lock outer width Y may be configured to be larger than a corresponding dimension in the lock-receiving feature 131 of the housing 42 when the barrier lock 130 is in an uncompressed state. In each of these ways, compression of the barrier 124 may facilitate fixing or sealing of the barrier lock 130 to other components of the pressure measuring device 32. The barrier lock 130 may also be configured such that the lock inner width W is smaller than a corresponding dimension of the valve core 48 or the core adaptor 137 such that expansion of the lock inner width W may facilitate sealing between the valve core 48 or the core adaptor 137 and the barrier base 127 as through inner core seal 138. The lock terminal barrier width X may be configured as to facilitate sealing interaction between the barrier lock 130 and the lock-receiving feature 131 by allowing the barrier lock 130, at a point of its lock outer width Y, to move sufficiently radially outward relative to the first stem opening axis B. In a cylindrical configuration of the barrier 124, each of the above widths may be measured as a diameter.

Figure 29:
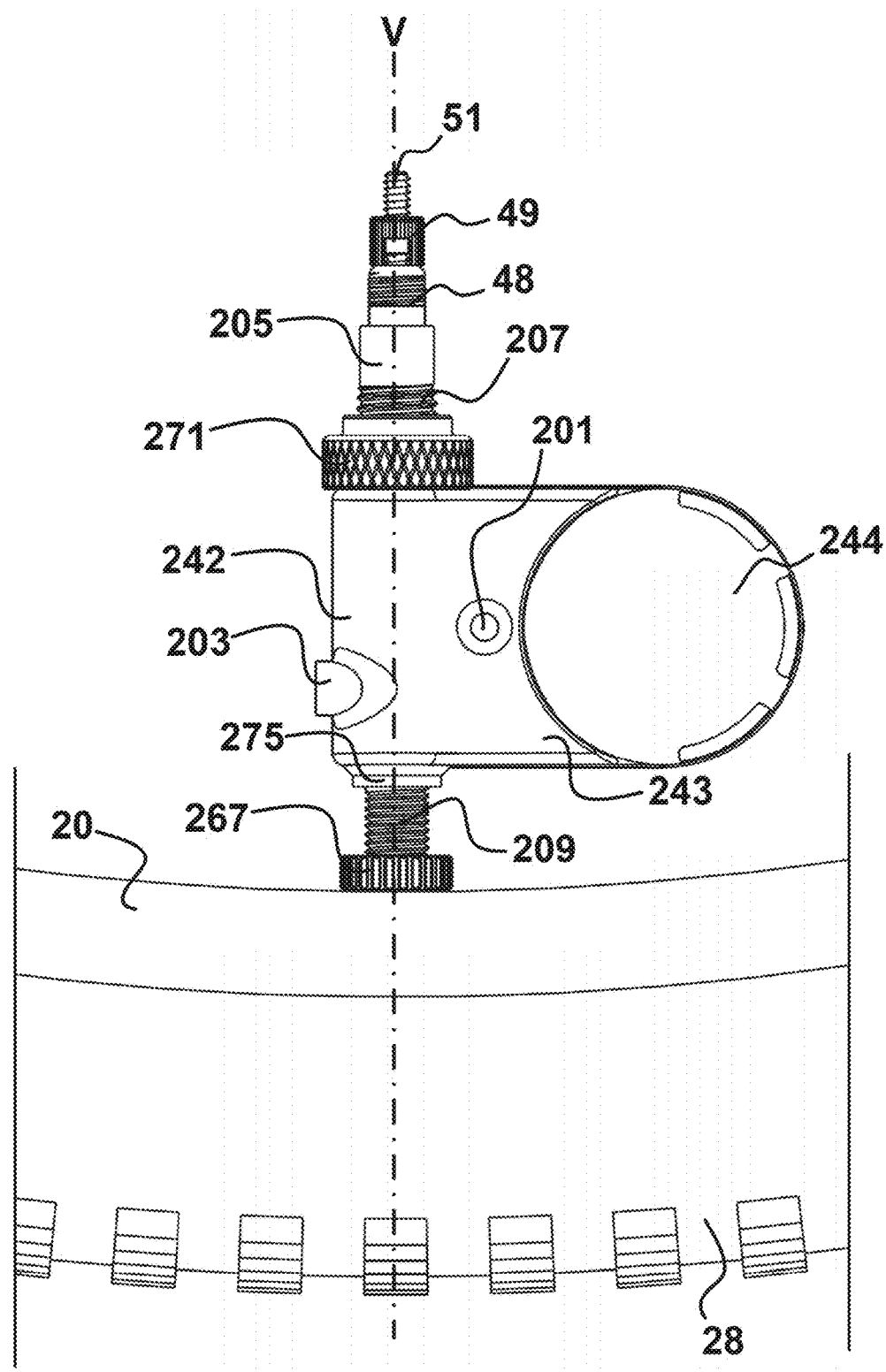
FIG. 29 is a side view of a bicycle wheel rim and tire assembly with a pressure measuring device.

FIG. 29 is a side view of another embodiment of the pressure measuring device 32. The embodiment shown in FIG. 29 includes an indication device 201 disposed on the housing 42. The indication device 201 may also be referred to as an embodiment of a user interface 114. The indication device 201 may be a visual indication device. For example, the indication device 201 may be a light emitting device, such as a bulb or a light emitting diode ("LED"). Alternatively, the indication device 201 may be operable to provide non-visual indications to a rider. For example, the indication device 201 may provide audio or haptic feedback to a rider.

The indication device 201 is configured to provide an indication to a user corresponding to a state, mode, or detectable change in the pressure measuring device 32. In an embodiment, the indication device 201 changes states responsive to changes in pressure of the tire assembly 28 as measured by the pressure measuring device. For example, the indication device 201 may operate in a predetermined mode responsive to pressures measured with the sense element 58.

In an embodiment, the indication device 201 operates in a first display mode if the pressure of the pressure chamber 50 is within a first predetermined pressure range. The first predetermined pressure range may be tunable to represent a desired tire pressure for a given application. The first display mode of the indication device 201 includes a distinguishable output that a user may associate with the pressure being within the first predetermined pressure range. For example, a light may operate to indicate the first display mode. In an embodiment, a light having a specific color such as green may indicate the pressure being within the first predetermined pressure range. A lighted embodiment of the indication device 201 may also indicate the first display mode through a frequency or a specific pattern of lighting, such as alternating short and long durations of lighting.

The indication device 201 may be configured to operate in a second display mode if the pressure of the pressure chamber 50 is outside of the first predetermined pressure range. The second display mode of the indication device 201 may be similarly configured to the first display mode thereof. For example, a light may operate to indicate the second display mode. In an embodiment, a light having a specific color such as red may indicate the pressure being outside of the first predetermined pressure range. In an embodiment, the indication device 201 may also indicate the second display mode through a frequency or a specific pattern of lighting, such as long or constant duration of lighting.

The indication device 201 may be configured to operate in a third display mode if the pressure of the pressure chamber 50 is outside of a second predetermined pressure range. The second predetermined pressure range may be broader than the first predetermined pressure range. For example, the first predetermined pressure range may represent a rider's predetermined range of most efficient pressures, whereas the second predetermined pressure range may represent upper and lower safe limits as defined by component constraints such as tire bead strength and pinch flat resistance. The third display mode of the indication device 201 may be similarly configured to the first and second display modes thereof. For example, a light may operate to indicate the third display mode. In an embodiment, a light having a specific color such as red may indicate the pressure being outside of the first predetermined pressure range. In an embodiment, the indication device 201 may also indicate the second display mode through a frequency or a specific pattern of lighting, such as long or constant duration of lighting. The third display mode of the indication device 201 may alternatively or additionally include an audio indication of a possibly dangerous riding situation.

The predetermined pressure ranges may be tunable. For example, different embodiments of the pressure measuring device 32 may be developed for different on- and off-road configurations of the bicycle 10. In an embodiment, a user may set limits of the predetermined pressure ranges. For example, the user may operate a component of the pressure measuring device 32 to tune limits of the predetermined pressure ranges. Alternatively, the user may operate a connected device, such as a computer or smart device, to adjust the predetermined pressure ranges. The pressure measuring device 32 may be configured with limits to user adjustability. For example, the pressure measuring device 32 may require that the second predetermined pressure range be broader than the first predetermined pressure range by a predetermined margin and/or may require that the limits of the predetermined pressure ranges not exceed safe high pressure limits and not fall below safe low pressure limits.

The display modes of the indication device 201 may be consistent or may be intermittent. For example, the indication device 201 may only operate during certain times. In an embodiment, the indication device 201 operates for a limited duration responsive to a sensor 122 indicative of motion of the bicycle 10. Alternatively, the indication device 201 may remain operational for the duration of operation of the bicycle as detected by the sensor 122. In such an embodiment, it may be advantageous to use a low-power consumption configuration of the indication device 201, such as in a driverless solid-state lighting embodiment.

The embodiment of FIG. 29 also depicts a housing protrusion 202. The housing protrusion 202 may facilitate installation or servicing of the housing 242. For example, the housing protrusion 202 may be sized and shaped to facilitate injection of a fluid into the housing 242 and/or a valve device 205.

The valve device 205 is configured to facilitate pressure communication from the tire assembly 28 to the sense element 258. The valve device 205 may include features from previous embodiments of the valve stem 38, the removable communication section 128, the housing 42, and/or other related components. The valve device 205 is shown with a valve device mounting portion 209 extending into the rim 20. In an embodiment, the valve device mounting portion 209 is secured to the rim using a fixing element 267 and interacts with the valve stem 38 in an interior of the rim 20. Alternatively, the valve stem 38 may be secured on the exterior of the rim using the fixing element 267, for example as described above with reference to the sealing fit between components. The fixing element 267 may also be used to facilitate bracing and/or support of components. For example, fixing element 267 may secure the valve device 205 to the rim 20 and limit movement of the pressure measuring device 32.

The embodiment illustrated in FIG. 29 includes features which are related to features in previously-discussed embodiments. For example, a removable power source portion 244 is shown attached to a body portion 243 of the housing 242. The removable power source portion 244 may be threadably installed or may be installed with another rotational or linear installation or locking method. For example, the removable power source portion 244 may be snap fit or may be rotatable to a locking position.

A first axial securing feature 271 is shown above the housing 242 and a second axial securing feature 275 spaced apart from the first axial securing feature 271 and disposed on an opposing side below the housing 242. The first and second axial securing features 271, 275 may be configured in various ways to axially locate the housing 242 along an alignment axis V. For example, the first and second axial securing features 271, 275 may be fixed to or removable from the valve device 205. In an embodiment, the second axial securing feature 275 is formed as part of the valve device 205 and the first axial securing feature 271 is threadably installable about the alignment axis V onto a threaded valve device portion 207 of the valve device 205.

Figure 30:
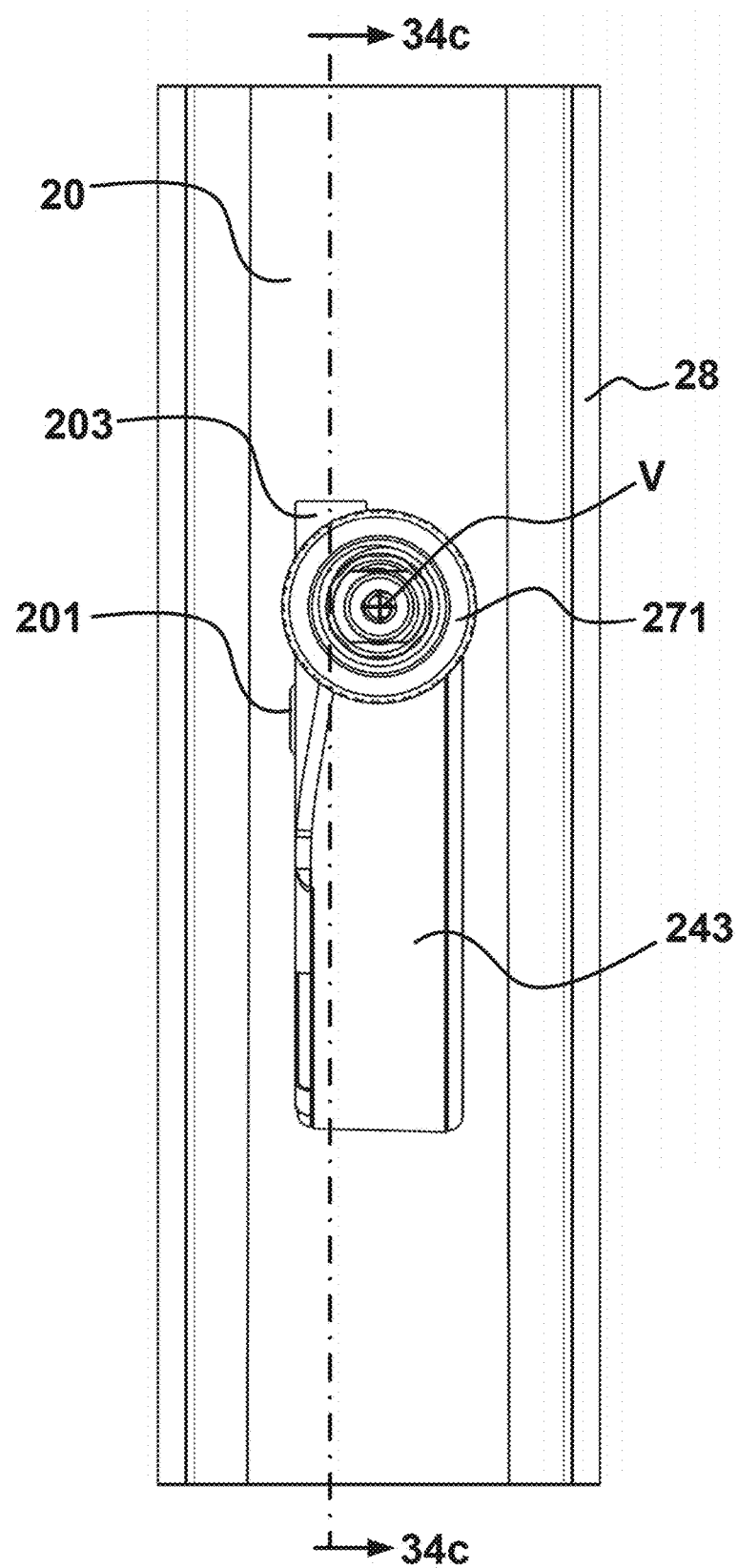
FIG. 30 is a top view of the bicycle wheel rim and tire assembly with the pressure measuring device of FIG. 29.

FIG. 30 depicts a top view of the embodiment shown in FIG. 29. The view in FIG. 30 depicts how the body portion 243 of the pressure measuring device 32 may be aligned with the rim 20. Specific alignment of the body portion 243 may facilitate decreased aerodynamic drag and/or reduced interference with other components of the bicycle 10. For example, specific alignment of the body portion 243 may discourage or prevent the pressure measuring device 32 from contacting the frame 12 of the bicycle 10 during operation.

Figure 31:
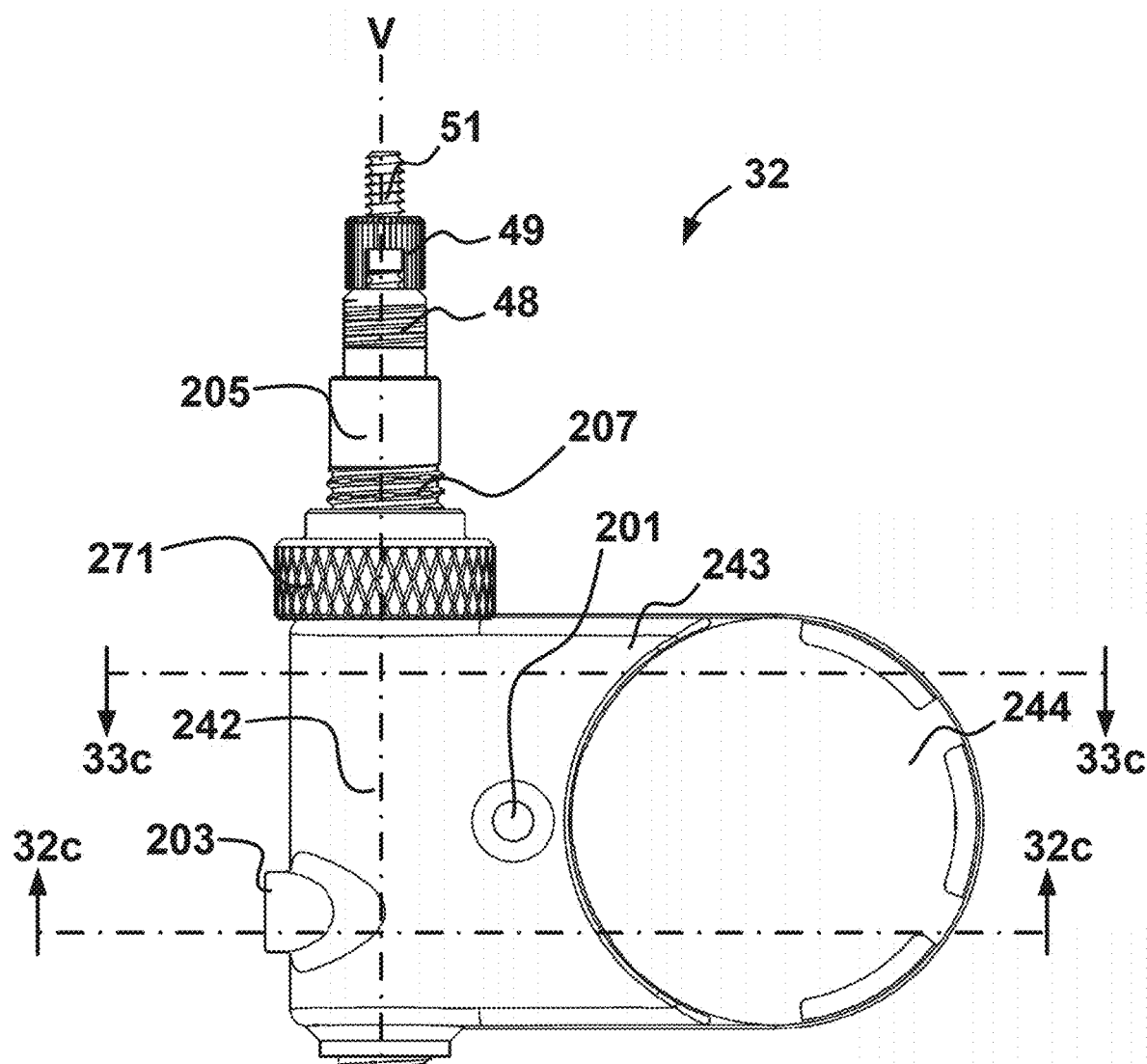
FIG. 31 is a side view of the pressure measuring device of FIG. 29.

FIG. 31 depicts a side view of the embodiment of the pressure measuring device 32 shown in FIG. 29, detached from the tire assembly 28. FIG. 31 depicts the valve device mounting portion 209 as having a valve device mounting portion seal 211. The valve device mounting portion seal 211 may be configured to interface with the valve stem 38, for instance the valve stem receiving portion 134 as described above. Alternatively, the valve device mounting portion seal 211 may be configured to seal with the rim 20 or other components as described with respect to the compressible base 40. The valve device mounting portion seal 211 may be compressible to form a seal, may be configured to compress the valve stem 38, may include a supplemental sealing feature (not shown), and/or may use adhesive or mechanical sealant. Interaction of the valve device mounting portion seal 211 and the valve stem receiving portion 134 may be configured to facilitate tightening or loosening of a threaded interaction while maintaining a sealing interaction therebetween. In an embodiment, up to twenty (20) degrees of rotation about the alignment axis V in clockwise and/or anti-clockwise directions while maintaining a sealing interaction is facilitated. This variable sealing arrangement may be facilitated with elastomeric and/or multiple sealing devices and may facilitate fine adjustment of alignment of the housing 242.

Figure 32:
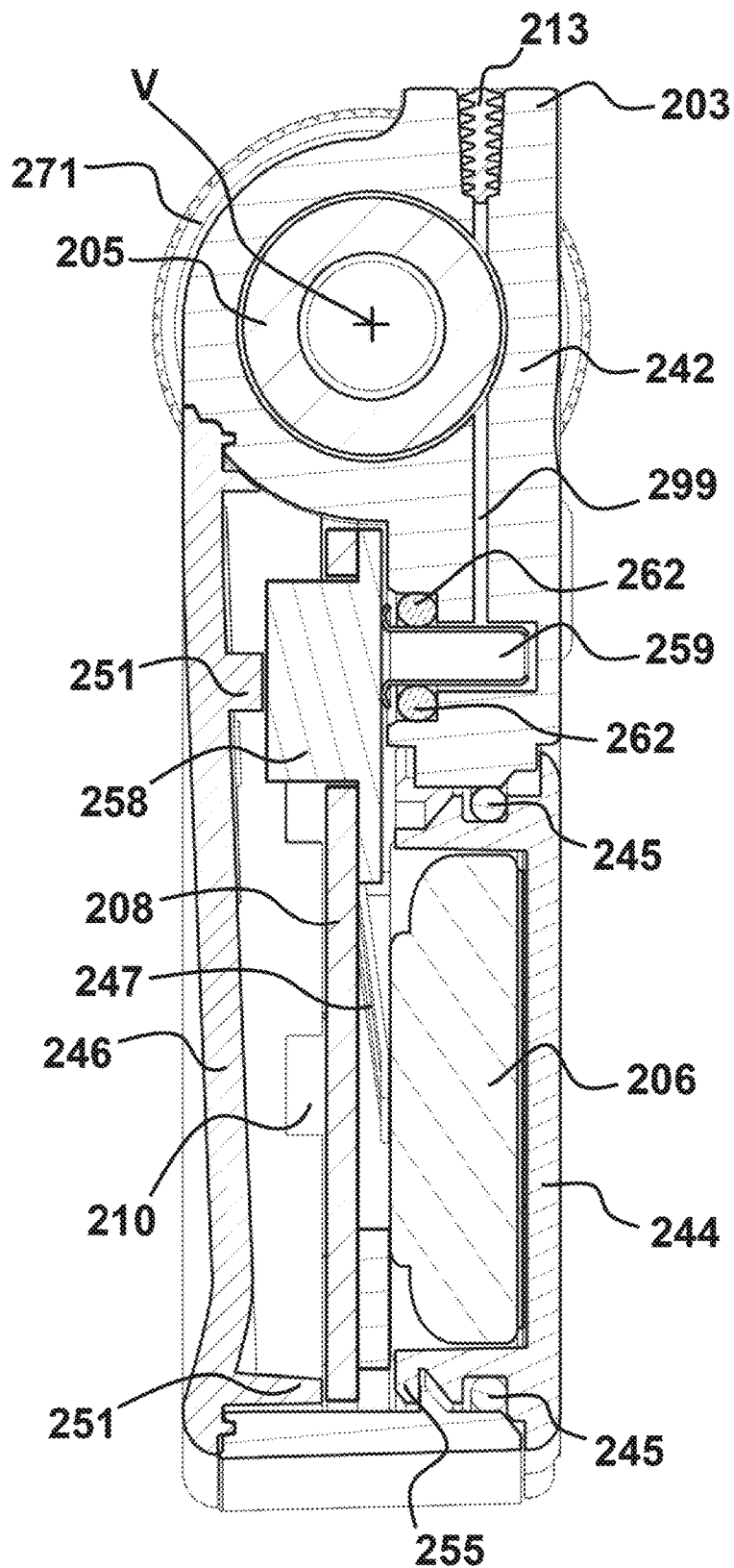
FIG. 32 is a sectional view of the pressure measuring device of FIG. 31 taken along cut line 32c-32c.

FIG. 32 is a sectional view of the embodiment of the pressure measuring device 32 shown in FIG. 31, taken along cut line 32c-32c. The internal structure of the pressure measuring device 32 may share features of previously-discussed embodiments and may include various differences. For example, the removable power source portion 244 may be rotatably secured to contain a power source 206. A power source seal 245 may be included to seal the interior of the pressure measuring device. A power source connection portion 255 may be provided for securing the removable power source portion 244 to the housing 242.

A housing support structure 251 may be provided. The housing support structure 251 may increase rigidity of the housing 242. For example, the housing support structure 251 may support, locate, and/or position components within the housing 242 on one or more surfaces. In an embodiment, the housing support structure 251 locates a circuitry unit 208 within the housing 242. The housing support structure may also support and/or locate a sense element 258 within the housing 242.

Support of the circuitry unit 208 may be configured to provide rigidity and/or isolation. For example, the housing support structure 251 may be configured to allow controlled and/or damped movement of the circuitry unit 208 and/or other components within the housing 242. The housing support structure 251 may include elastomeric and/or adhesive components. The circuitry unit 208 may be shaped and sized to fit within contours of the housing 242. For example, the circuitry unit may be non-rectangular and may contain one or more curved portions.

FIG. 32 depicts a power source contact 247 for transmitting power from the power source 206. The power source contact 247 is in electrical communication with the power source 206 and the circuitry unit 208. The power source contact 247 may be a single contact or may be a plurality of contacts. For example, the power source contact 247 may be a pair of negative and positive contacts or may be a positive contact where the housing 242 or another component facilitates completion of the circuit as through a common ground.

The housing protrusion 203 is shown sealed with a housing protrusion seal element 213. The housing protrusion seal element 213 may be threadably installed into the housing protrusion 203 as shown, or may be adhesively mounted, press-fit, or installed through other appropriate methods. In an embodiment, the housing protrusion seal element 213 is formed from an epoxy. For example, the housing protrusion seal element 213 may be an adhesive and/or structural compound injected into the housing protrusion 203 and cured to seal the sense element path 299. The housing protrusion seal element 213 may facilitate sealing of the interior of the housing 242 and may be used to keep installed fluids internal to the housing 242.

Figure 34:
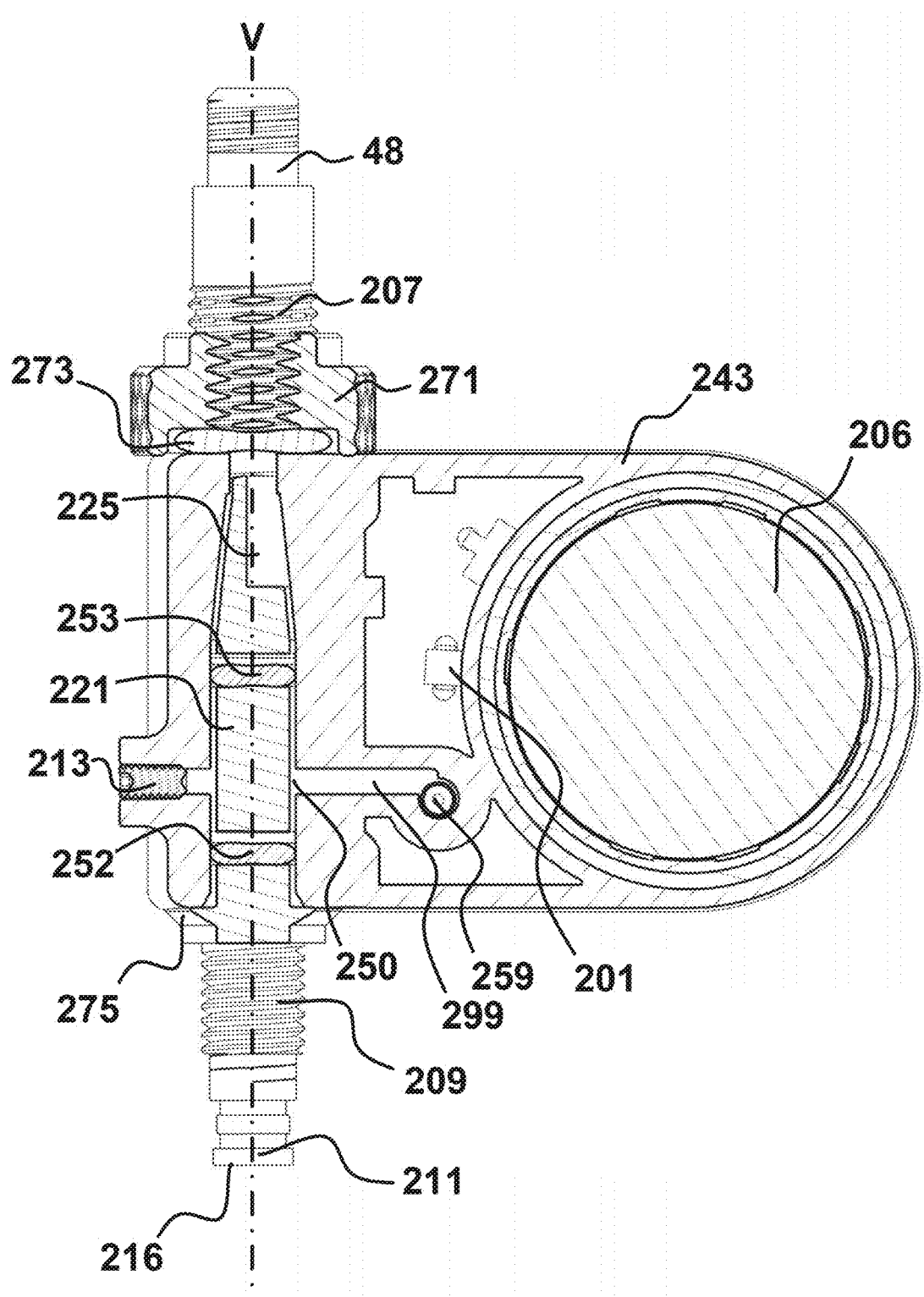
FIG. 34 is a sectional view of the pressure measuring device of FIG. 30 taken along cut line 34c-34c.

The housing protrusion 203 provides an opening to a sense element path 299 and the housing protrusion seal element 213 facilitates sealing of the sense element path 299. The sense element path 299 facilitates pressure communication between a pressure chamber 250 (as shown in FIG. 34) and the sense element 258. The sense element path 299 may provide for fluid communication therebetween or may only provide pressure communication. For example, a barrier as those used in previously-described embodiments may be employed. Additionally or alternatively, the sense element path 299 may contain a relatively high density fluid. The relatively high density fluid may be chosen and/or configured for operation with a relatively low density fluid, such as atmospheric air, nitrogen, or other fluids used for inflating the tire assembly 28. For example, the sense element path 299 may contain grease installed through the housing protrusion 203 preceding installation of the housing protrusion seal element 213. Limiting fluid communication from the tire assembly 28 to the sense element 258 may facilitate protection of the sense element 258 from adhesive contents of the tire assembly 28, for example tire sealant compounds. For example, selective fluid communication of relatively low density fluid such as atmospheric air or nitrogen but not relatively high density fluid such as tire sealant compound fluids may protect components such as the sense element 258 from interference and/or blockages.

The sense element 258 may include structure to facilitate its operation. For example, the sense element 258 may include a sense element protrusion 259. The sense element protrusion 259 may contain functional elements of the sense element 258 and/or may facilitate pressure communication of the sense element 258 with the sense element path 299. For example, the sense element protrusion 259 may house a diaphragm configuration of a capacitive pressure sensor.

The sense element protrusion 259 may be secured to the sense element 258 or may be attached or adjacently located with other arrangements. The sense element 258 and/or the sense element protrusion 259 may interact with one or more other components to seal interior portions of the housing from pressure and/or fluid communication with the tire assembly 28 and/or the external environment. A sense element seal 262 may be provided. In an embodiment, the sense element seal 262 forms a seal with the housing 242, the sense element protrusion 259, and/or the sense element 258. The sense element seal 262 may be an elastomeric seal such as an O-ring, may be an adhesive compound, and/or may be of a substantially non-compressible sealing configuration.

Figure 33:
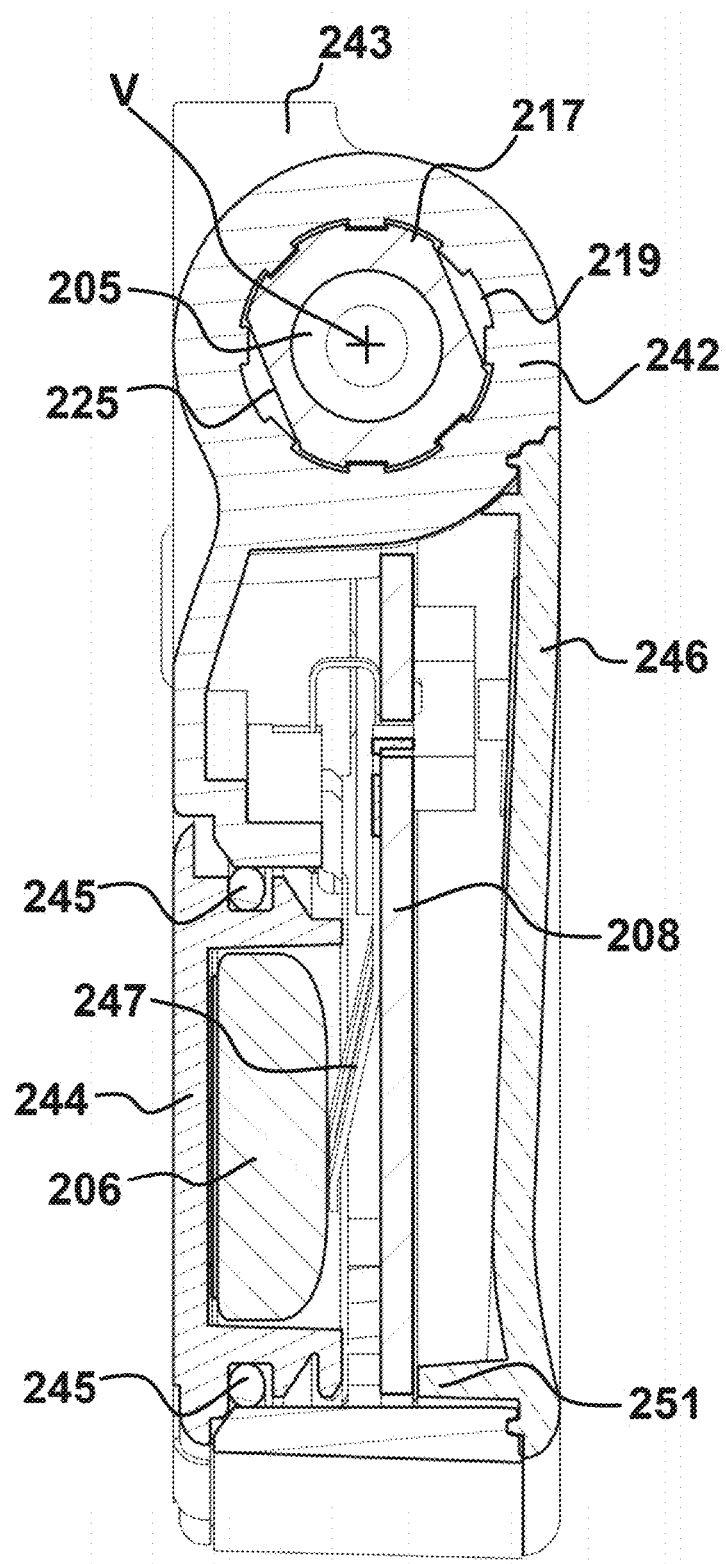
FIG. 33 is a sectional view of the pressure measuring device of FIG. 31 taken along cut line 33c-33c.

FIG. 33 is a sectional view of the embodiment of the pressure measuring device 32 shown in FIG. 31, taken along cut line 33c-33c. FIG. 33 depicts alignment features of the pressure measuring device 32. Alignment features may be included on various components of the pressure measuring device 32. For example, the valve device 205 may include a valve device alignment feature 217 and/or the housing may include a housing alignment feature 219. In an embodiment, the valve device alignment feature 217 and the housing alignment feature 219 are sized and shaped to interact with each other. For example, the housing alignment feature 219 may be configured to set a relative position with the valve device alignment feature 217 about the alignment axis V. The alignment features 217, 219 may be splined, keyed, or otherwise sized and shaped to set alignment between the housing 242 and the valve device 205.

FIG. 34 is a sectional view of the embodiment of the pressure measuring device 32 shown in FIG. 30 taken along cut line 34c-34c. FIG. 34 depicts the pressure chamber 250 disposed between the valve device first seal 252 and the valve device second seal 253. The pressure chamber 250 may be configured for pressure communication with a barrier or dense fluid as discussed with reference to this embodiment and previously-described embodiments above. The pressure chamber 250 may also be an atmospheric chamber comprising similar contents to the tire assembly 28 in proportion to relative volumes therebetween. As shown, the pressure chamber 250 is in communication with the sense element 258. For example, the pressure chamber 250 may be in pressure communication with the sense element 258 through the sense element path 299 and the sense element protrusion 259.

Figure 35:
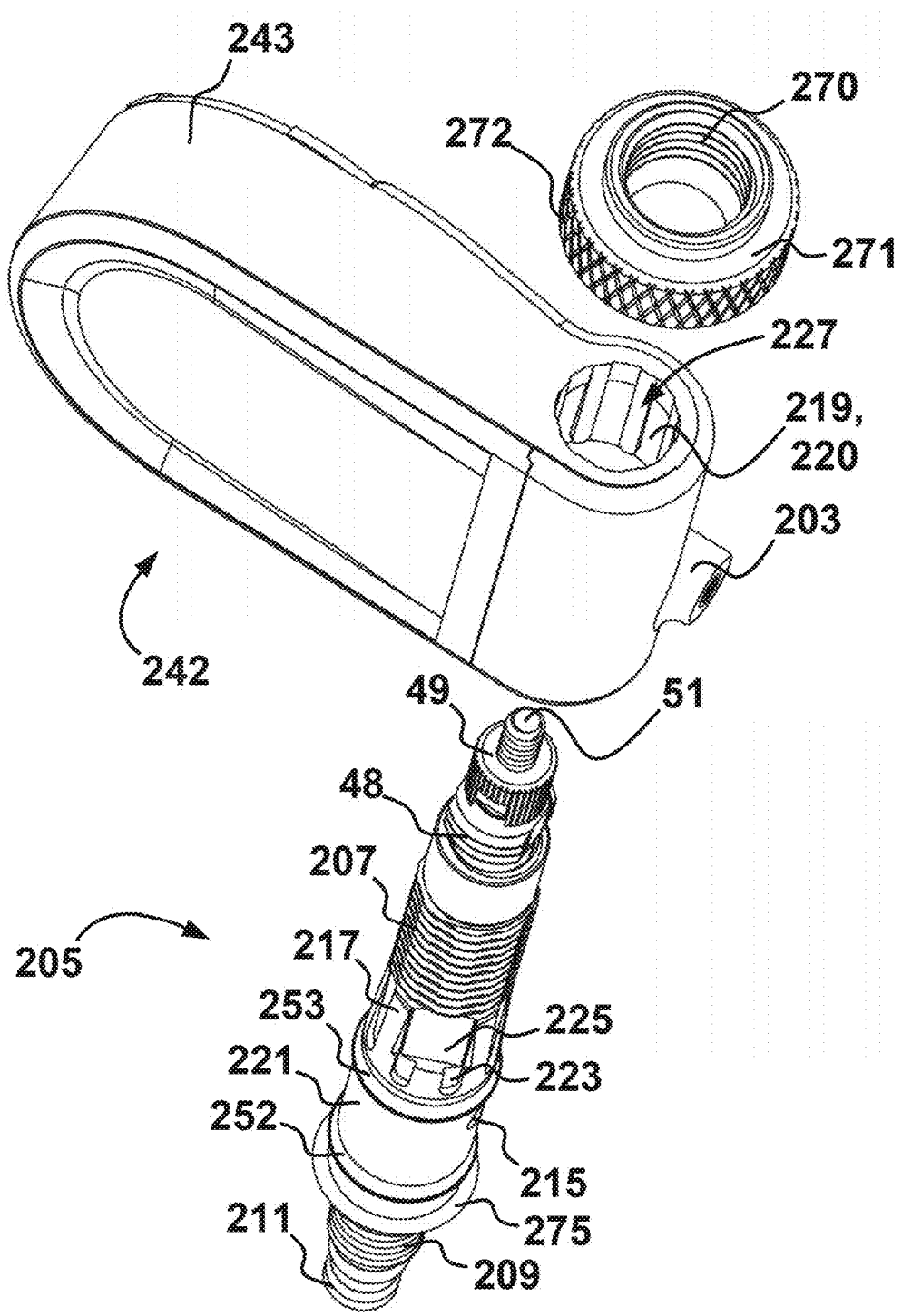
FIG. 35 is an exploded view of the pressure measuring device of FIG. 29.

FIG. 35 is an exploded view of the embodiment of the pressure measuring device 32 of FIG. 29. The valve device 205 is shown to include a valve device sealed portion 221 disposed between the valve device first seal 252 and the valve device second seal 253. The valve device sealed portion 221 may form portions of the pressure chamber 250.

The valve device sealed portion 221 is shown to include a valve device first communication opening 215 in communication with the tire assembly 28. In an embodiment, the valve device first communication opening 215 is in fluid communication with the tire assembly 28. Alternatively, the valve device first communication opening 215 may be separated from fluid communication with the tire assembly with a pressure-transmitting barrier as discussed with reference to previously-described embodiments.

The housing 242 is shown securable to the valve device 205 with the first axial securing feature 275. In an embodiment, the first axial securing feature 275 locates the housing 242 on the second axial securing feature by threadably attaching to the threaded valve device portion 207. To facilitate installation, the first axial securing feature 271 may include a securing feature thread 270 configured to engage the threaded valve device portion 207 and/or a securing feature installation portion 272 configured to facilitate manual or tooled installation. In an embodiment, the securing feature installation portion 272 is a knurling formed in the first axial securing feature.

The housing 242 may include a housing bore 227. For example, the housing bore 227 may be a portion of the housing 242 configured to receive the valve device 205. The housing bore 227 may also include the housing alignment feature 219. For example, the housing bore 227 may include a splined housing portion 220 sized and shaped to interact with a splined valve portion 223. An outer seal member 273, for example as shown in FIG. 34, may be included to seal the housing bore 227. The outer seal member 273 may be a secondary seal of the pressure chamber 250 beyond the valve device second seal 253, or alternatively may be a primary seal of the pressure chamber 250.

The valve device 205 may include a valve device installation feature 225. In an embodiment, the valve device installation feature 225 is configured to accept a tool for securing the valve device 205 to another component such as the valve stem 38. The valve device installation feature 225 may also be configured for tooless installation, for instance with texturing or knurling. As shown, the valve device installation feature 225 is covered by the housing 242 when the valve device 32 is in an installed state. However, the valve device installation feature 225 may be located outside of the housing 242 for adjustment while the valve device 32 is in the installed state.

Figure 36:
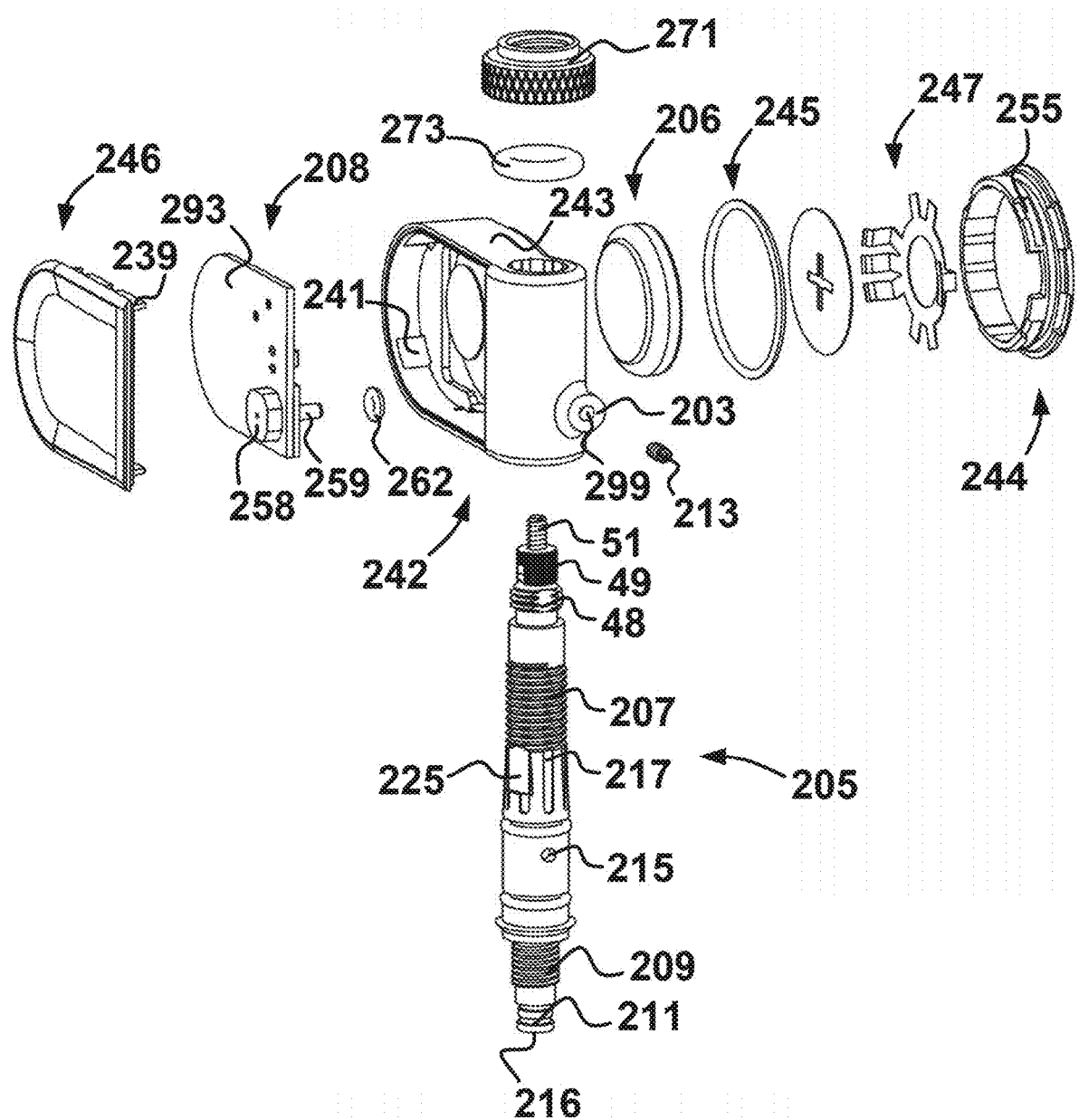
FIG. 36 is a further exploded view of the pressure measuring device of FIG. 29.

FIG. 36 is a further exploded view of the embodiment of the valve device 32 of FIG. 29. FIG. 36 depicts a valve device second communication opening 216 in communication with the valve device first communication opening 215. As described above, communication between the tire assembly 28 and the pressure chamber 250 may be achieved in multiple ways through the valve device communication openings 215, 216. For example, the valve device 205 may be sized and shaped to facilitate unobstructed fluid communication between the valve device first communication opening 215 and the valve device second communication opening 216.

FIG. 36 also depicts the housing 242 having a circuitry portion 246. The circuitry portion 246 may be removable or may be configured for permanent installation, such as with certain adhesives or bonding techniques. The circuitry portion 246 is shown to include a circuitry portion fastening element 239 configured for installation with a body fastening element 241 of the housing 242. The fastening elements 239, 241 may facilitate sealing interaction between the circuitry portion 246 and the body portion 243.

Figure 37A:
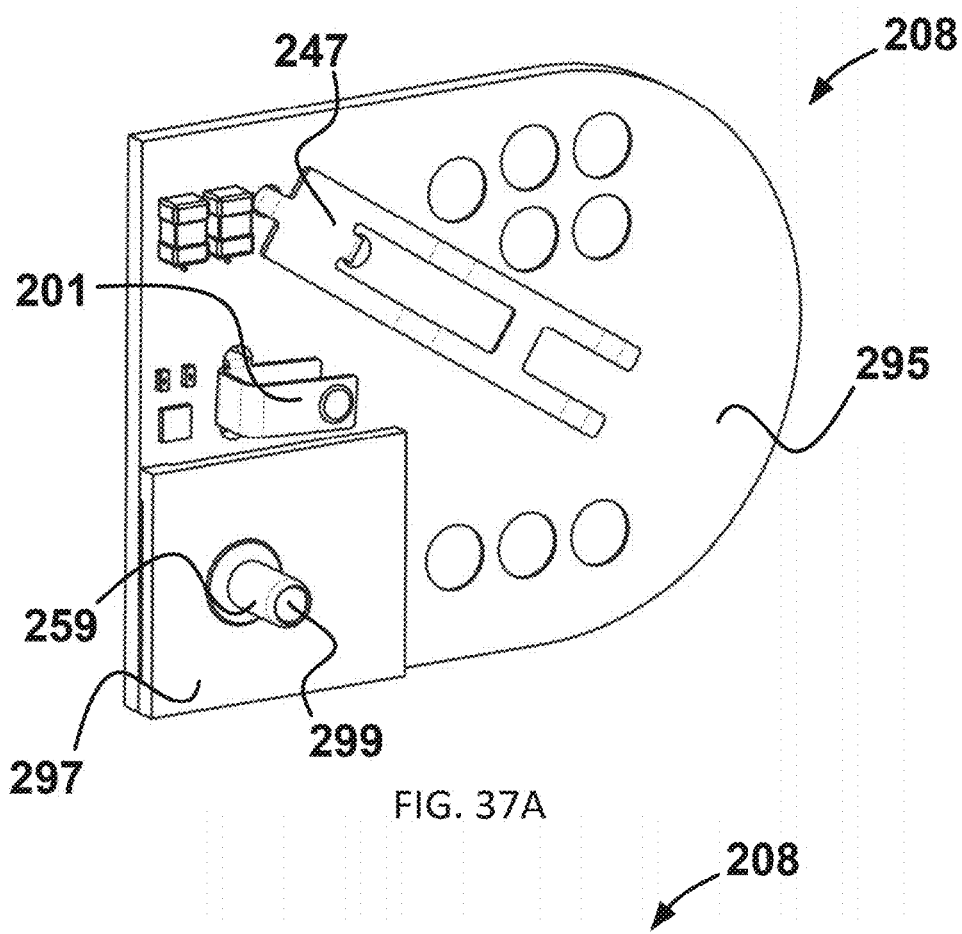
FIG. 37A is a perspective view of a component of the pressure measuring device of FIG. 29.

FIG. 37A depicts a first board surface 295 of the circuitry unit 208. The indication device 201 is shown disposed on the first board surface 295. In an embodiment, the indication device 201 is an LED as described above. The indication device 201 may be disposed partially outside the housing 242. For example, the indication device 201 may include a lens such as made from a translucent or transparent material forming part of the housing 242. The housing 242 may also be configured to facilitate operation of an embodiment of the indication device 201 disposed entirely within the housing 242. For example, the housing 242 may be partially or completely transparent or translucent to facilitate reading of the indication device 201.

The sense element 258 may be configured with various structure, for example configurations of sense elements discussed above with reference to previously-described embodiments. The sense element 258 shown in FIG. 37A includes the sense element protrusion 259. The sense element protrusion 259 may be of a hollow configuration, for example to contain a diaphragm, such that the sense element path 299 continues into the sense element protrusion.

FIG. 37A also depicts the power source contact 247 disposed on the first board surface 295. The power source contact 247 may be flexible to accommodate movement of the power source 206 and/or variations in size of the power source 206. The power source contact 247 may bias the power source 206 against the removable power source portion 244. This bias may facilitate installation and removal of the power source 206.

Figure 37B:
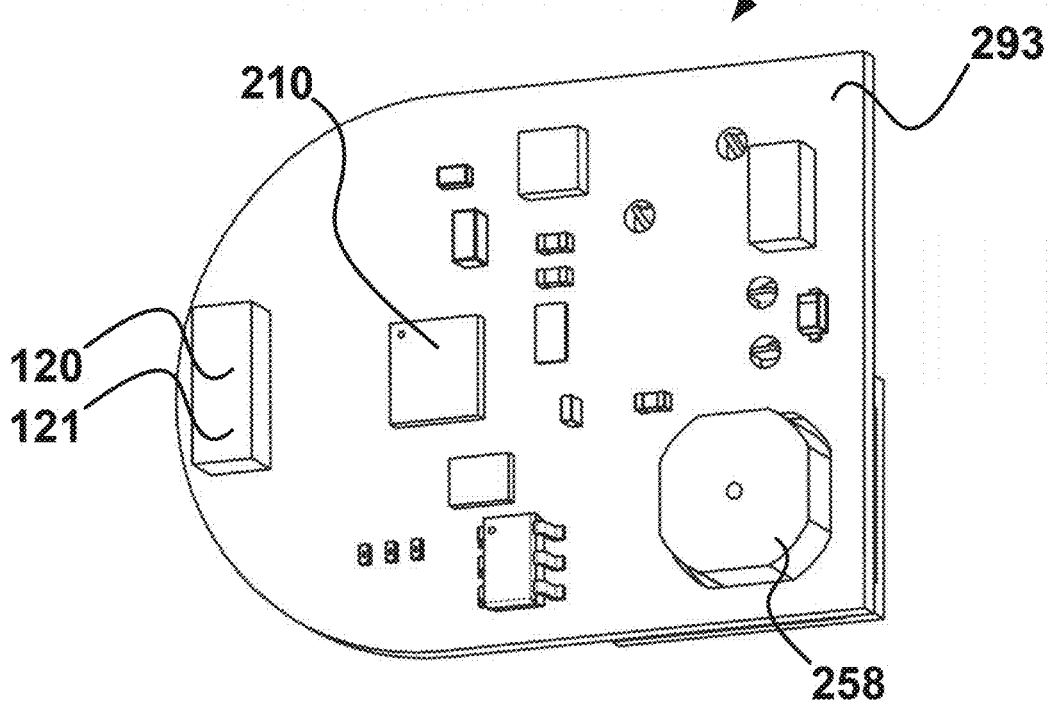
FIG. 37B is another perspective view of the component of the pressure measuring device of FIG. 37A.

FIG. 37B depicts the sense element 258 as disposed on a second board surface 293, opposite the first board surface 295. The sense element 258 may pass through the circuitry unit 208, passing from the first board surface 295 through to the second board surface 293. The sense element 258 may be supported with a sense element support structure 297 as shown in FIG. 37A. The sense element support structure 297 may be provided to reinforce the circuitry unit 208 against forces from the tire assembly 28, improve sealing around the sense element 258, and/or increase rigidity of the sense element 258.

The circuitry unit 208 may have only one side on which associated components are disposed. For example, the circuitry unit 208 may be mounted against or formed as an interior wall of the housing 242. The circuitry unit 208 may be rigid or flexible and may be configured to isolate the sense element 258 and/or other components from vibration or shock as described above.

FIG. 37B depicts a processor 210 disposed on the second board surface 293. The processor 210 may be configured as described above and below. For example, the processor 210 may be configured for controlling one or more of the wireless communicator 120, the power source 206, the sense element 258, and the indication device 201. In an embodiment, the processor 210 is configured to regulate a measurement frequency of the sense element 258. The measurement frequency represents how often the sense element 258 takes a pressure reading of the pressure chamber 250. In an embodiment, the measurement frequency is between 0.05 hertz and 0.15 hertz. In an embodiment, the power source 206 is disposed on an opposite side of the circuitry unit 208 from the processor 210, the wireless communicator 120, and/or the sense element 258.

The modes of the indication device 201 described above may be controlled by the processor 210. For example, the processor 210 may be configurable to adjust timing and pressure limits and functions of the first, second, and third display modes. Similarly, the processor may be operable to control the first and second predetermined pressure ranges.

FIG. 37B also shows the wireless communicator 120. The wireless communicator 120 may be configured as described above and below. In an embodiment, the wireless communicator 120 includes, multiple communication devices. For example, the wireless communicator may include a first transmission radio (not shown) spaced apart from a second transmission radio (not shown). The wireless communicator 120 may be operable to send and/or receive signals for the processor 210. Transmission of signals from the wireless communicator 120 may be tunable to optimize battery consumption and system latency. For example, a frequency of transmission may be set. In an embodiment, the frequency of transmission is between 1 hertz and 4 hertz and may be referred to as a communication frequency.

Figure 38:
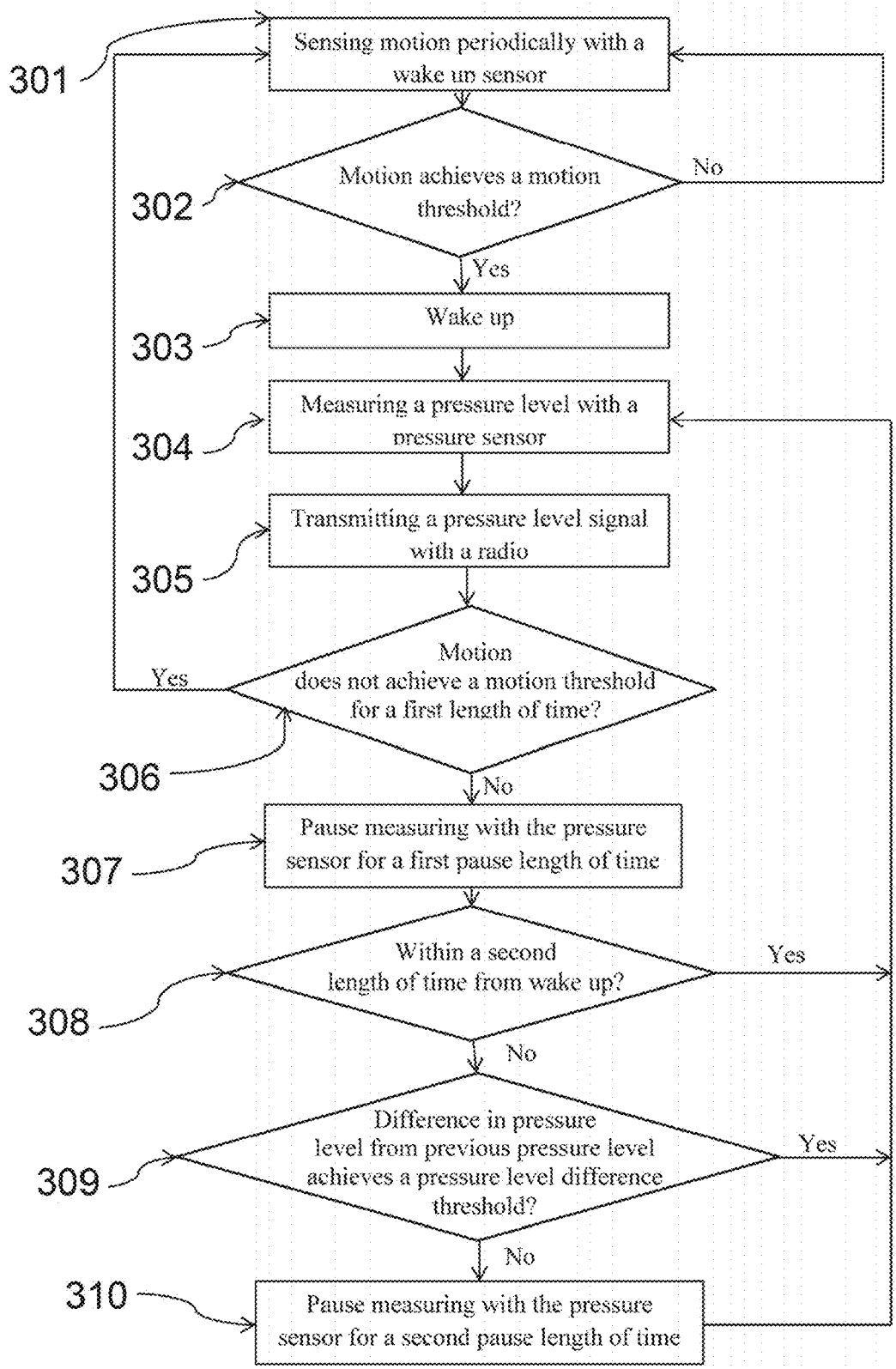
FIG. 38 is a flow chart diagram demonstrating a method for measuring a pressure within a tire assembly.

FIG. 38 is a flow chart demonstrating a method for measuring a pressure within the tire assembly 28. As presented in the following paragraphs, the acts may be performed using any combination of the components indicated in FIG. 39, described below. For example, the following acts may be performed by at least one of the wireless communicator 120, a processor 110, a memory 112, a pressure measuring device interface 116, and the circuitry unit 108, as well as additional or other components. Additional, different, or fewer acts may be provided. For example, Act 301 may be omitted. The acts are performed in the order shown or in other orders. The acts may also be repeated.

The method may include sensing motion periodically (Act 301). The motion sensing may be performed with a wake up sensor configured to detect motion, such as an accelerometer and/or gyroscope. The sensing may be performed by one or more of the sensors 122. The sensing may include a determination of motion made for instance by the processor 110 from input not directly measuring motion. For example, the processor 110 may determine from a change in proximity of a magnetic field measured by a Hall Effect type of the sensor 122 that there has been motion.

In Act 302 it is determined whether motion achieves a motion threshold, for example the motion detected in Act 301. The motion sensed, directly or indirectly, in Act 301 must achieve the motion threshold in order to result in a positive determination in the present Act. The motion threshold may be a tunable within a range of values relating to movement of the bicycle 10 or a component thereof. For instance, the motion threshold may be a value corresponding to an acceleration value. In one embodiment, only a motion sensed corresponding to an acceleration greater than 0.003 g (~0.0294 m/s$^2$) will achieve the motion threshold. In such a way, this requirement provides a useful method of excluding false or minimal motion information.

If in Act 302 it is determined that the motion sensed in Act 301 has achieved the motion threshold, then the method enters a wake up state. If it is determined that the motion sensed in Act 301 has not achieved the motion threshold, then the sensing motion (Act 303) is repeated periodically. The wake up state may activate functionality in other components such as the circuitry unit 108. Alternatively, the wake up state may increase a rate of sensing and thus a possible rate of transmission. For example, the circuitry unit 108 may be provided operable power when the threshold is achieved.

The method further includes measuring a pressure level with a sense element (Act 304). The sense element may be the sense element 58. The sense element may only provide a component of the measurement and may work in conjunction with other components such as the processor 110 in order to measure the pressure level.

The method further includes transmitting a pressure level signal with the wireless communicator 120, such as a radio (Act 305). The transmission may be configured for communication with a component of a bicycle, such as the user interface 114 or may be configured to communicate with another device such as a mobile phone or Global Positioning Service unit. Facilitation of the communication may be done through a pairing process through which the wireless communicator 120 establishes a connection with such a device.

In Act 306 it is determined if the motion periodically sensed in Act 301 has not achieved the motion level threshold determined in Act 302 for a first length of time. The periodic nature of the motion sensing provides useful information regarding the state of a bicycle and/or bicycle components. For instance, a determination of no motion detected on the rim 20 of a bicycle may indicate that the bicycle is no longer in use and pressure information is unnecessary. As such, if it is determined that the sensed motion does not achieve the motion threshold for the first length of time, the method will exit the wake-up state but continue to periodically sense motion. Exiting the wake-up state may entail withholding operable power from one or more components of the pressure measuring device 32 for an extended time interval. Limiting creation of unnecessary pressure information through regulation of operable power supplied to components of the pressure measuring device 32 has the benefit of conserving energy of the power source 106. Conversely, if it is determined that the sensed motion has achieved the motion threshold within the first length of time, the method will proceed in the wake-up state.

The method may also include a pausing of measuring by the sense element for a first pause length of time (Act 307). The pausing of measuring is a technique of conserving energy for instance from power source 106 and may completely disable measurement functionality or only limit that functionality in order to serve this energy conservation goal. The first pause length of time may be tunable to achieve a balance between regularity of measurement and energy conservation.

In Act 308 it is determined whether a second length of time beginning at the time the method proceeded to the wake-up state has lapsed. This determination serves to adjust measurement frequency relative to the amount time in which the bicycle has been in use. This determination provides a useful measurement adjustment tool as often pressure adjustments are made within a limited time from the first motion of the bicycle, i.e. while a rider is inflating tires just after removing the bicycle from a storage location. As such, if it is determined that the second length of time has not lapsed, then the method will proceed in the wake-up state including pausing measuring for the first pause length of time (Act 307). However, if it is determined that the second length of time has lapsed, the method will proceed further in the wake-up state.

In Act 309 it is determined, once Act 304 has been performed at least once, if a difference in the pressure level measured between subsequent pressure level measurements achieves a pressure level difference threshold. For example, one embodiment provides that a change in subsequent pressure level measurements must be at least 1 lb/in$^2$ (~6.89 kPa) in order to achieve the pressure level difference threshold. This determination provides a useful tool to adjust measurement frequency in the case that sufficiently large pressure changes have occurred. For example, if a significant pressure change between measurements has occurred, it likely means that the pressure level is being adjusted voluntarily by the user or else the tire assembly 28, the rim 20, and/or other components have been damaged. In such a case, it would be advantageous to shift the balance between energy conservation and measurement frequency in the favor of measurement frequency. As such, if it is determined that the difference in pressure level achieves the pressure level difference threshold, then the method proceeds in the wake-up state including pausing measuring for a first pause length of time (Act 307). If a difference of pressure level measurements does not achieve the pressure level difference threshold, then there is likely no reason to expect damage or adjustment. It follows that in such a case where the threshold is not achieved, the method proceeds further in the wake up state.

If the second length of time has not lapsed (Act 308) and the pressure level difference threshold is not achieved (Act 309), then the method further includes pausing measuring with the sense element 58 for a second pause length of time (Act 310). The second pause length of time may be longer, shorter, or the same as the first pause length of time. Each of the first pause length of time and the second pause length of time may correspond with a rest mode of the sense element 58 where the sense element does not measure pressure or otherwise enters an energy-conserving state. Following lapse of the second pause length of time, the method may proceed in the wake up state.

Figure 39:
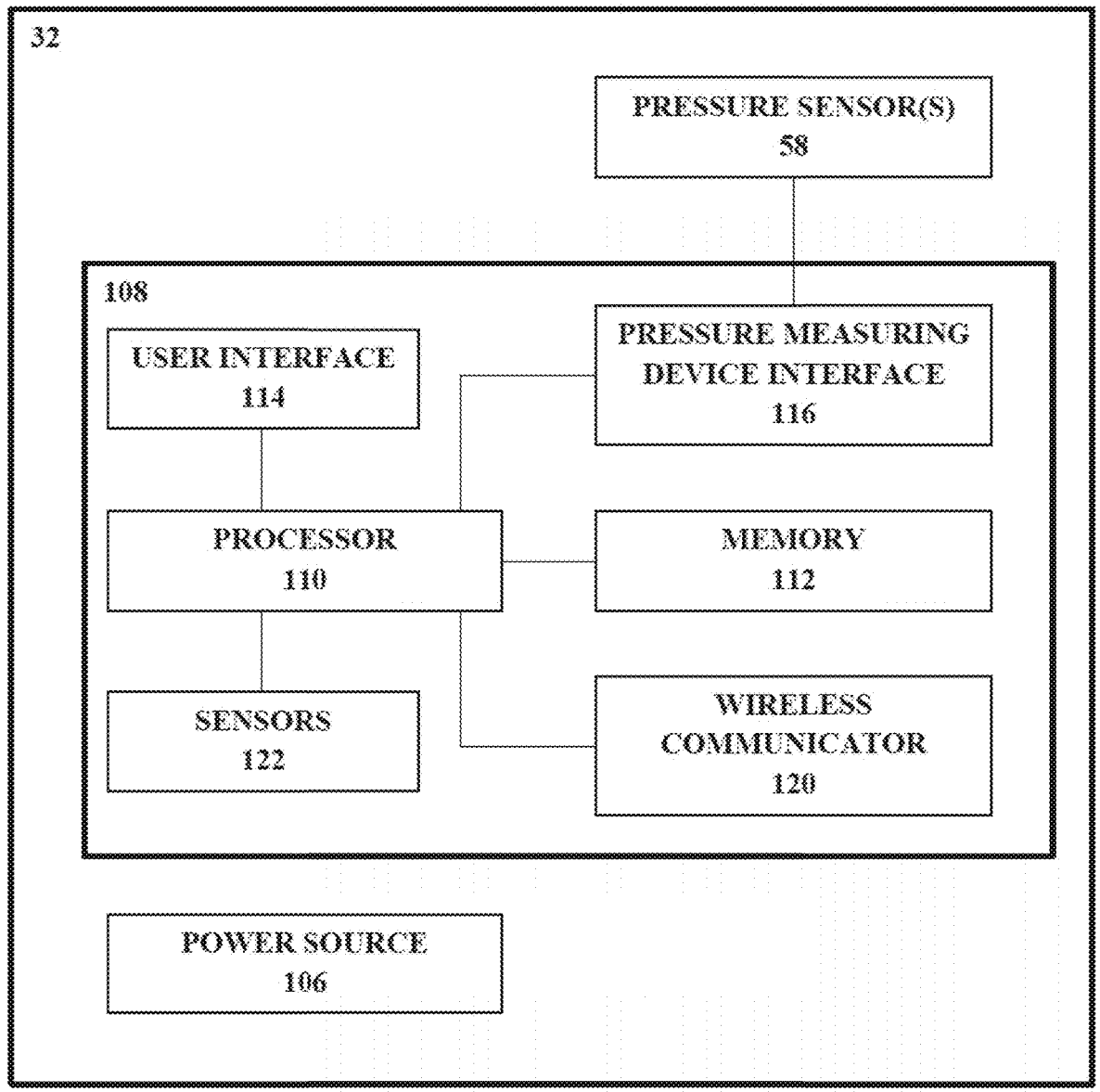
FIG. 39 is a block diagram of an embodiment of a pressure measuring device.

FIG. 39 is a block diagram of an exemplary pressure measuring device 32. The pressure measuring device 32 may be used alone to communicate with and/or control bicycle components or other devices. The pressure measuring device 32 includes the circuitry unit 108 which includes at least one processor 110 and the memory 112. In the illustrated embodiment, the circuitry unit 108 also includes the user interface 114, the pressure measuring device interface 116, and the wireless communicator 120. The circuitry unit 108 may also include component connections and/or electrically connecting materials embedded in a substrate material. The system also includes at least one sense element 58 in communication with the wireless communicator 120. Additional, different, or fewer components are possible for the pressure measuring device 32. For example, the user interface 114 may not be included in the circuitry unit 108 and/or the pressure measuring device 32. Additionally, other sensors 122, such as a wake up sensor may be included. In an exemplary embodiment, an accelerometer, Hall Effect sensor, and/or a gyroscopic sensor may be used to trigger functionality of the pressure measuring device 32. Also, components may be combined.

The processor 110 may include a general processor, digital signal processor, an application specific integrated circuit ("ASIC"), field programmable gate array ("FPGA"), analog circuit, digital circuit, combinations thereof, or other now known or later developed processors. The processor 110 may be a single device or a combination of devices, such as through shared or parallel processing.

The circuitry unit 108 is operable to interpret a signal indicative of pressure from the sense element 58 and determine a corresponding pressure. For example, the signal may be communicated from the sense element 58 to the processor 110 which may apply a conversion technique of a deflection or other input to a pressure. Pressure values to cause amounts of deflection measurable by the sense element 58 may be known from characteristics of the sense element system. For example, these values, or indications of these values, may be stored on a memory 112. The measured deflection values may be matched against these values by the processor 110 to determine a pressure measurement within the tire assembly 28.

The memory 112 may be a volatile memory or a non-volatile memory. The memory 112 may include one or more of a read only memory ("ROM"), random access memory ("RAM"), a flash memory, an electronic erasable program read only memory ("EEPROM"), or other type of memory. The memory 112 may be removable from the pressure measuring device 32, such as a secure digital ("SD") memory card. In a particular non-limiting, exemplary embodiment, a computer-readable medium may include a solid-state memory such as a memory card or other package that houses one or more non-volatile read-only memories. Further, the computer-readable medium can be a RAM or other volatile re-writable memory. Additionally, the computer-readable medium can include a magneto-optical or optical medium, such as a disk or tapes or other storage device. Accordingly, the disclosure is considered to include any one or more of a computer-readable medium and other equivalents and successor media, in which data or instructions may be stored.

The memory 112 is a non-transitory computer-readable medium and is described to be a single medium. However, the term "computer-readable medium" includes a single medium or multiple media, such as a centralized or distributed memory structure, and/or associated caches that are operable to store one or more sets of instructions and other data. The term "computer-readable medium" shall also include any medium that is capable of storing, encoding or carrying a set of instructions for execution by a processor or that causes a computer system to perform any one or more of the methods or operations disclosed herein.

In an alternative embodiment, dedicated hardware implementations, such as ASICs, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an ASIC. Accordingly, the present system encompasses software, firmware, and hardware implementations.

The power source 106 is a portable power source. The power source may involve the generation of electric power, for example using a mechanical power generator, a fuel cell device, photo-voltaic cells, or any of other power generating devices. The power source may include a battery such as a device consisting of two or more electrochemical cells that convert stored chemical energy into electrical energy. The power source 106 may include a combination of multiple batteries or other power providing devices. Specially fitted or configured battery types, or standard battery types such as CR 1025, CR 2016, and/or CR 2032 may be used.

The wireless communicator 120 provides for data and/or signal communication from the pressure measuring device 32 to another component of the bicycle, or an external device such as a mobile phone or other computing device. The wireless communicator 120 communicates the data using any operable connection. An operable connection may be one in which signals, physical communications, and/or logical communications may be sent and/or received. An operable connection may include a physical interface, an electrical interface, and/or a data interface. The wireless communicator 120 may be configured to communicate wirelessly, and as such include one or more of an antenna 121. The antenna 121 may be integral to the wireless communicator 120 or may be a separate component. The wireless communicator 120 provides for wireless communications in any now known or later developed format. Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, or HTTPS) represent examples of the state of the art. Such standards are periodically superseded by faster or more efficient equivalents having essentially the same functions. Bluetooth® and or ANT+™ standards may also, or alternatively, be used. Accordingly, replacement standards and protocols having the same or similar functions as those disclosed herein are considered equivalents thereof. In an embodiment, the wireless communicator 120 may be configured to transmit a signal indicative of a pressure determined from an input to the sense element 58. Further, the determined pressure may be transmitted wirelessly.

The pressure measuring device interface 116 provides for data and/or signal communication from one or more sense element 58 to the circuitry unit 108. The interface 116 communicates using wired and/or wireless communication techniques. For example, the interface 116 may communicate with the sense element(s) 58 using a system bus, or other communication technique. The pressure measuring device interface 116 may include additional electric and/or electronic components, such as an additional processor and/or memory for detecting, communicating with, and/or otherwise processing signals of the sense element 58.

The wake up sensor 122 provides for direct or indirect detection of motion. The wake up sensor 122 may detect motion through sonic, optical, radio, or microwave detection. Alternatively, the wake up sensor 122 may detect motion of the bicycle 10 or a component thereof through the use of a Hall Effect sensor, a reed switch, an accelerometer, or another relative position-detecting or motion-indicative type of sensor.

The wake up sensor 122 may be referred to as a motion element. As above, a motion element may be used to detect motion of the bicycle 10 directly, for instance through the interaction of a reed switch or Hall Effect sensor passing through a magnetic field. Alternatively, the wake up sensor 122 may indirectly detect motion. For example, the wake up sensor 122 may be responsive to changes in pressure measured as a result of deflection of the tire assembly 28 during operation of the bicycle 10.

The user interface 114 may be one or more button, keypad, keyboard, mouse, stylus pen, trackball, rocker switch, touch pad, voice recognition circuit, or other device or component for communicating data between a user and the pressure measuring device 32. For example, the user interface 114 may be or may include the features and/or operations of the indication device 201 as described above. The user interface 114 may be a touch screen, which may be capacitive or resistive. The user interface 114 may include a liquid crystal display ("LCD") panel, LED, LED screen, thin film transistor screen, or another type of display. The user interface 114 may also include audio capabilities, or speakers.

In an embodiment, the user interface 114 includes an LED indicator. The LED indicator lights to indicate input of the commands or other actions of the pressure measuring device 32. The LED indicator may operate as the indication device 201, for example to indicate pressure data to a user as described above.

The wireless communicator 120 is configured to send and/or receive data such as control signals and/or commands to and/or from bicycle components. The wireless communicator 120 communicates the data using any operable connection. An operable connection may be one in which signals, physical communications, and/or logical communications may be sent and/or received.

In accordance with various embodiments of the present disclosure, methods described herein may be implemented with software programs executable by a computer system, such as the circuitry unit 108. Further, in an exemplary, non-limiting embodiment, implementations can include distributed processing, component/object distributed processing, and/or parallel processing. Alternatively, virtual computer system processing can be constructed to implement one or more of the methods or functionality as described herein.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA or an ASIC.

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(-ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware, as well as other electronic components. The term "circuitry" would also cover, for example and if applicable to the particular claim element, a baseband integrated circuit or applications processor integrated circuit for a mobile computing device or a similar integrated circuit in server, a cellular network device, or other network device.

Processors suitable for the execution of a computer program include, by way of example, both general and special purpose microprocessors, and any one or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or is operatively coupled to receive data from and/or transfer data to, one or more mass storage devices for storing data, e.g., magnetic, magneto optical disks, or optical disks. However, a computer need not have such devices. Moreover, a computer can be embedded in another device, e.g., a mobile telephone, a personal digital assistant ("PDA"), a mobile audio player, a Global Positioning System ("GPS") receiver, or the pressure measuring device 32 to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this depiction should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that any described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to fewer than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A pressure measuring device for a bicycle, the pressure measuring device comprising:
   a housing, including a removable power source portion;
   a pressure chamber, the pressure chamber including an inlet, an outlet, and a sense element opening, the pressure chamber configured for passage of fluid therethrough between the inlet and the outlet;
   a sense element configured to sense a pressure in a sense chamber, wherein the sense chamber is in fluid communication with the pressure chamber through the sense element opening;
   a power source disposed in the housing at the removable power source portion, the power source configured to provide power to the sense element; and
   a valve device disposed in the inlet.

2. The pressure measuring device of claim 1, wherein a threaded portion of the valve device engages a threaded portion of the pressure chamber.

3. The pressure measuring device of claim 1, wherein the valve device includes a valve core actuator, wherein the valve core actuator allows for addition or removal of fluid from the housing when the valve core actuator is depressed.

4. The pressure measuring device of claim 1, wherein the power source portion covers the power source.

5. The pressure measuring device of claim 4, wherein the power source portion is configured to facilitate removal and installation of the power source.

6. The pressure measuring device of claim 5, wherein the power source portion includes threads to facilitate removal and installation of the power source portion.

7. The pressure measuring device of claim 1, further comprising circuitry, the power source configured to provide power to the circuitry and the sense element.

8. The pressure measuring device of claim 7, wherein the circuitry is disposed adjacent to the power source.

9. The pressure measuring device of claim 8, wherein the circuitry includes a wireless communicator in operative association with the sense element.

10. The pressure measuring device of claim 9, wherein at least a portion of the housing is constructed of a radio frequency transparent material.

11. The pressure measuring device of claim 9, wherein the wireless communicator is configured to wirelessly transmit a signal indicative of the pressure of a tire assembly.

12. The pressure measuring device of claim 9, wherein the circuitry is removable from the housing.

13. The pressure measuring device of claim 12, wherein the circuitry is located within a removable circuitry portion, the removable circuitry portion being part of the housing adjacent to the removable power source portion.

14. The pressure measuring device of claim 1, wherein the pressure in the sense chamber is equivalent to a pressure chamber pressure.

15. The pressure measuring device of claim 1, wherein the sense element is attached to the sense chamber.

16. The pressure measuring device of claim 1, wherein the power source is disposed inside the power source portion.

17. The pressure measuring device of claim 1, further comprising a sense element seal, wherein the sense element seal is configured to prevent fluid flow past the sense element.

18. The pressure measuring device of claim 1, wherein the pressure measuring device is secured to a bicycle rim.

19. The pressure measuring device of claim 18, further comprising a valve stem, wherein the pressure measuring device is secured to the bicycle rim through the valve stem.

20. The pressure measuring device of claim 19, wherein the valve stem interfacing with the outlet of the pressure chamber.

* * * * *